(12) United States Patent
Chino et al.

(10) Patent No.: US 11,807,738 B2
(45) Date of Patent: Nov. 7, 2023

(54) SILANE COMPOUND AND COMPOSITION THEREOF

(71) Applicant: ENEOS Corporation, Tokyo (JP)

(72) Inventors: Keisuke Chino, Tokyo (JP); Yusuke Matsuo, Tokyo (JP); Makoto Ashiura, Tokyo (JP)

(73) Assignee: ENEOS Corporation, Tokyo (JP)

( * ) Notice: Subject to any disclaimer, the term of this patent is extended or adjusted under 35 U.S.C. 154(b) by 239 days.

(21) Appl. No.: 17/416,668

(22) PCT Filed: Dec. 24, 2019

(86) PCT No.: PCT/JP2019/050560
§ 371 (c)(1),
(2) Date: Jun. 21, 2021

(87) PCT Pub. No.: WO2020/138056
PCT Pub. Date: Jul. 2, 2020

(65) Prior Publication Data
US 2022/0073703 A1   Mar. 10, 2022

(30) Foreign Application Priority Data

Dec. 26, 2018  (JP) ................................ 2018-243380
Feb. 25, 2019  (JP) ................................ 2019-032060
May 31, 2019  (JP) ................................ 2019-103071

(51) Int. Cl.
*C08K 5/548*     (2006.01)
*B60C 1/00*      (2006.01)
(Continued)

(52) U.S. Cl.
CPC ............... *C08K 5/548* (2013.01); *B60C 1/00* (2013.01); *C08K 3/06* (2013.01); *C08K 3/22* (2013.01);
(Continued)

(58) Field of Classification Search
CPC .............. B60C 1/00; C08L 9/06; B60K 5/548
See application file for complete search history.

(56) References Cited

U.S. PATENT DOCUMENTS 5,514,827 A * 5/1996 Petty .................... C08K 5/5419
556/489
5,534,599 A 7/1996 Sandstrom et al.
2013/0245194 A1* 9/2013 Huang ................ C09D 201/10
524/588

FOREIGN PATENT DOCUMENTS

JP   H08-259736 A   10/1996
JP   H11-335381 A   12/1999
(Continued)

OTHER PUBLICATIONS

China National Intellectual Property Administration, Office Action in Chinese Patent Application No. 201980085762.7 (dated Sep. 5, 2022).

(Continued)

*Primary Examiner* — Doris L Lee
(74) *Attorney, Agent, or Firm* — Leydig, Voit & Mayer, Ltd.

(57) ABSTRACT

The invention provides a silane compound for obtaining a cross-linked product which hardly generates poor dispersion or adhesion between an organic polymer material and an inorganic material and exhibits excellent viscoelastic properties or adhesive properties, or a composition comprising the silane compound. In particular, the invention provides a silane compound represented by formula (1):

$$R^1R^2R^3Si-L-\text{[structure]}-R^{15}$$
(1)

wherein $R^1$, $R^2$, and $R^3$ each independently represents a hydrocarbon group optionally containing an oxygen atom or a nitrogen atom, or a hydrogen atom; L represents a hydrocarbon group optionally containing at least one heteroatom (Continued)

selected from the group consisting of nitrogen, oxygen, and sulfur; and the other variables are as defined herein.

20 Claims, 7 Drawing Sheets

(51) Int. Cl.
*C08K 3/06* (2006.01)
*C08K 3/22* (2006.01)
*C08K 3/36* (2006.01)
*C08K 5/00* (2006.01)
*C08K 5/09* (2006.01)
*C08L 9/06* (2006.01)

(52) U.S. Cl.
CPC .............. *C08K 3/36* (2013.01); *C08K 5/0025* (2013.01); *C08K 5/09* (2013.01); *C08L 9/06* (2013.01); *C08K 2003/2296* (2013.01)

(56) References Cited

FOREIGN PATENT DOCUMENTS

| JP | 2002-322185 A | | 11/2002 |
|---|---|---|---|
| JP | 2014-177430 A | | 9/2014 |
| JP | 2014-177432 | * | 9/2014 |
| JP | 2014-177432 A | | 9/2014 |
| JP | 2014-177577 A | | 9/2014 |
| JP | 2014-177578 A | | 9/2014 |
| JP | 2014-177579 A | | 9/2014 |
| JP | 2014-177580 A | | 9/2014 |
| JP | 2017-149824 A | | 8/2017 |
| WO | WO 2016/181679 A1 | | 11/2016 |
| WO | WO 2017/188411 A1 | | 11/2017 |

OTHER PUBLICATIONS

Dixon et al., "Ring Expansion of 5- to 6-member Zirconacycles by Carbenoid Insertion," *Tetrahedron*, 60(6): 1401-1416 (2004).

Pellissier et al., "Titanium Tetrachloride Mediated Addition of 1,8-Bis(trimethylsilyl)-2,6-octadiene to Aldehydes. A One-Step Control of Four Stereogenic Carbon Centers," *J. Org. Chem.*, 59(7): 1709-1713 (1994).

European Patent Office, Extended European Search Report in European Patent Application No. 19901467.1 (dated Aug. 29, 2022).

Japanese Patent Office, International Search Report in International Patent Application No. PCT/JP2019/050560 (dated Mar. 24, 2020).

Japanese Patent Office, International Preliminary Report on Patentability in International Patent Application No. PCT/JP2019/050560 (dated Jun. 16, 2021).

China National Intellectual Property Administration, Second Office Action in Chinese Patent Application No. 201980085762.7 (dated Jun. 30, 2023).

* cited by examiner

SILANE COMPOUND AND COMPOSITION THEREOF

CROSS-REFERENCE TO RELATED APPLICATIONS

This patent application is the U.S. national phase of International Patent Application No. PCT/JP2019/050560, filed Dec. 24, 2019, which claims the benefit of Japanese Patent Application No. 2018-243380, filed on Dec. 26, 2018, Japanese Patent Application No. 2019-032060, filed on Feb. 25, 2019, and Japanese Patent Application No. 2019-103071, filed on May 31, 2019, each of which is incorporated by reference in its entirety herein.

BACKGROUND OF THE INVENTION

Field of the Invention

The present invention relates to a silane compound and a composition comprising thereof.

Background Art

Conventionally, a silane compound having a reactive functional group and a hydrolyzable group has been used as a constituent of a silane coupling agent in a rubber composition in order to improve dispersibility of an organic polymer material such as rubber and an inorganic material such as silica or glass. In addition, such a silane compound has been used as an adhesion aid in a sealing agent or an adhesive in order to improve adhesion to an inorganic material such as silica.

Usually, such a silane compound has a substituent such as a mercapto group, a polysulfide group, an amino group or an epoxy group as a reactive functional group having high reactivity with an organic polymer material such as rubber, and has a substituent such as an alkoxysilyl group as a hydrolyzable group having high reactivity with an inorganic material such as silica. For example, Patent Document 1 discloses a rubber composition containing a polysulfide-based silane coupling agent. Patent document 2 discloses a silane compound having an amino group as a reactive functional group and a methoxy group as a hydrolyzable group.

Patent Documents 3 and 4 disclose a rubber composition containing an organosilane compound having a monosulfide bond.

PRIOR ART DOCUMENT

[Patent Document]
Patent Document 1: Japanese Patent Laid-Open Publication No. H8-259736
Patent Document 2: Japanese Patent Laid-Open Publication No. H11-335381
Patent Document 3: Japanese Patent Laid-Open Publication No. 2014-177432
Patent Document 4: Japanese Patent Laid-Open Publication No. 2014-177580

SUMMARY OF THE INVENTION

Problem to be Solved by the Invention

However, since the reactive functional group of the silane compound described in Patent Documents 1 and 2 has high polarity, affinity with the organic polymer material is low, which tends to cause poor dispersion and mixing. On the other hand, when a conventional silane compound having a reactive functional group with low polarity is added in order to increase affinity with such organic polymer material, reactivity with the organic polymer material was low, and performance as a silane coupling agent or an adhesion aid was insufficient.

The silane compound described in Patent Documents 3 and 4 did not have appropriate reactivity with respect to organic polymer materials.

With respect to the problem of improving affinity and reactivity of a silane coupling agent with an organic polymer material, the present inventors have intensively studied means for solving such problem. As a result, it has been found that blending an alicyclic compound with an alicyclic hydrocarbon moiety containing an olefin structure, and a silyl group, having affinity and appropriate reactivity with the organic polymer material, and the organic polymer material, promotes coupling reaction and improves dispersibility of an inorganic material such as silica when the blended product is a rubber composition, and as a result, it is possible to improve viscoelastic properties of a cross-linked product (rubber product) obtained from the rubber composition or the like. The present inventors have also found that adhesion to an inorganic material is improved when the blended product is a sealant composition. The present invention is based on this finding.

Accordingly, it is an object of the present invention to provide a silane compound for obtaining a cross-linked product which hardly generates poor dispersion or adhesion between an organic polymer material and an inorganic material and exhibits excellent viscoelastic properties or adhesive properties, or a composition containing the silane compound.

Means for Solving the Problem

The present invention encompasses the following invention.
[1] A silane compound represented by formula (1):

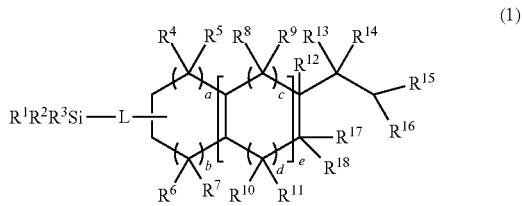

wherein $R^1$, $R^2$, and $R^3$ each independently represents a hydrocarbon group optionally containing an oxygen atom or a nitrogen atom, or a hydrogen atom;
L represents a hydrocarbon group optionally containing at least one heteroatom selected from the group consisting of nitrogen, oxygen, and sulfur;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by $-(CH_2)_f-$, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by $-(CH_2)_g-$, g is an integer from 1 to 5, $R^{16}$ is a hydrogen atom, a methyl group or an alkyl group having 2 to 8 carbons and $R^{17}$ is a hydrogen atom, a methyl group or an alkyl group having 2 to 10 carbons, where $R^{12}$ and $R^{13}$ bond to each other to form a double bond and $R^{14}$, $R^{15}$, and $R^{18}$ are a hydrogen atom, a methyl group or an alkyl group having 2 to 10 carbons, or $R^{14}$ and $R^{15}$ bond to each other to form a double bond and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are a hydrogen atom, a methyl group or an alkyl group having 2 to 10 carbons.

[2] The silane compound according to [1], represented by formula (2):

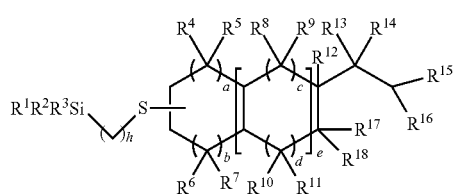

(2)

wherein $R^1$, $R^2$, and $R^3$ each independently represents a hydrocarbon group optionally containing an oxygen atom or a nitrogen atom, or a hydrogen atom;

h is an integer from 1 to 10;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by $-(CH_2)_f-$, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by $-(CH_2)_g-$, g is an integer from 1 to 5, $R^{16}$ is a hydrogen atom, a methyl group or an alkyl group having 2 to 8 carbons, $R^{17}$ is a hydrogen atom, a methyl group or an alkyl group having 2 to 10 carbons; where $R^{12}$ and $R^{13}$ bond to each other to form a double bond and $R^{14}$, $R^{15}$, and $R^{18}$ are a hydrogen atom, a methyl group or an alkyl group having 2 to 10 carbons, or $R^{14}$ and $R^{15}$ bond to each other to form a double bond and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are a hydrogen atom, a methyl group or an alkyl group having 2 to 10 carbons.

[3] The silane compound according to [1] or [2], represented by formula (3):

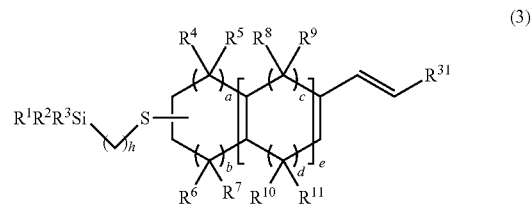

(3)

wherein $R^1$, $R^2$, and $R^3$ each independently represents a hydrocarbon group optionally containing an oxygen atom or a nitrogen atom, or a hydrogen atom;

h is an integer from 1 to 10;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by $-(CH_2)_f-$, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by $-(CH_2)_g-$, g is an integer from 1 to 5, and $R^{31}$ is a hydrogen atom, a methyl group or an alkyl group having 2 to 8 carbons.

[4] The silane compound according to [1] or [2], represented by formula (4):

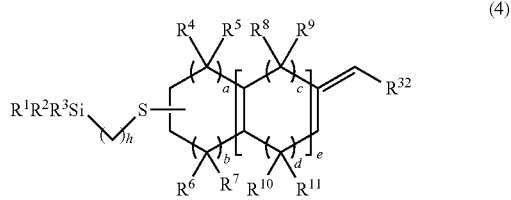

(4)

wherein $R^1$, $R^2$, and $R^3$ each independently represents a hydrocarbon group optionally containing an oxygen atom or a nitrogen atom, or a hydrogen atom;

h is an integer from 1 to 10;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by $-(CH_2)_f-$, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by $-(CH_2)_g-$, g is an integer from 1 to 5, and $R^{32}$ is a hydrogen atom, a methyl group or an alkyl group having 2 to 9 carbons.

[5] The silane compound according to [1] or [2], represented by formula (5):

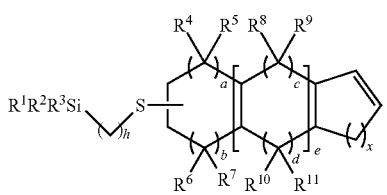

(5)

wherein $R^1$, $R^2$, and $R^3$ each independently represents a hydrocarbon group optionally containing an oxygen atom or a nitrogen atom, or a hydrogen atom;

h is an integer from 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —$(CH_2)_g$—, g is an integer from 1 to 5, and x is an integer from 0 to 5.

[6] The silane compound according to [1] or [2], represented by formula (6):

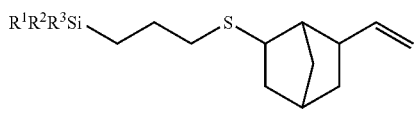

(6)

wherein $R^1$, $R^2$, and $R^3$ each independently represents a hydrocarbon group optionally containing an oxygen atom or a nitrogen atom, or a hydrogen atom; or by formula (7):

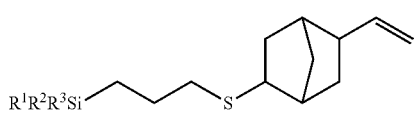

(7)

wherein $R^1$, $R^2$, and $R^3$ each independently represents a hydrocarbon group optionally containing an oxygen atom or a nitrogen atom, or a hydrogen atom; or by formula (8):

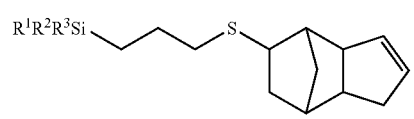

(8)

wherein $R^1$, $R^2$, and $R^3$ each independently represents a hydrocarbon group optionally containing an oxygen atom or a nitrogen atom, or a hydrogen atom; or by formula (9):

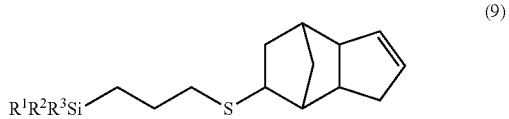

(9)

wherein $R^1$, $R^2$, and $R^3$ each independently represents a hydrocarbon group optionally containing an oxygen atom or a nitrogen atom, or a hydrogen atom.

[7] The silane compound according to any one of [1] to [6], wherein
$R^1R^2R^3Si$ group in the silane compound has a chemical structure of formula (10):

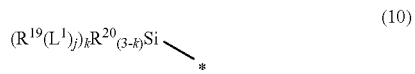

(10)

wherein
$R^{19}$ each independently represents an alkoxy group or an amino group substituted with one or more alkyl groups;
$R^{20}$ each independently represents a hydrogen atom or an alkyl group;
$L^1$ each independently represents a hydrocarbon group optionally including at least one hetero atom selected from the group consisting of nitrogen, oxygen, and sulfur;
j is independently an integer of 0 or 1;
k is an integer of 1 to 3; and
an asterisk (*) indicates a region bonded to a moiety other than a silyl group of the silane compound.

[8] The silane compound according to any one of [1] to [7], wherein
$R^1R^2R^3Si$ group in the silane compound is a triethoxysilyl group.

[9] A composition comprising the silane compound according to any one of [1] to [8] and a polymer that is capable of reacting with the silane compound.

[10] The composition according to [9], wherein
the polymer is an elastomer having a glass transition point of 25° C. or lower and further comprises an inorganic material.

[11] The composition according to [10], wherein
the elastomer having a glass transition point of 25° C. or lower comprises at least one selected from the group consisting of natural rubber, butadiene rubber, nitrile rubber, silicone rubber, isoprene rubber, styrene-butadiene rubber, isoprene-butadiene rubber, styrene-isoprene-butadiene rubber, ethylene-propylene-diene rubber, halogenated butyl rubber, halogenated isoprene rubber, halogenated isobutyrene copolymer, chloroprene rubber, butyl rubber, and halogenated isobutyrene-p-methyl styrene rubber.

[12] The composition according to [10] or [11], wherein
the elastomer having a glass transition point of 25° C. or lower has a double bond in the main chain.

[13] The composition according to any one of [10] to [12], wherein
the elastomer having a glass transition point of 25° C. or lower comprises at least one selected from the group consisting of styrene, butadiene, isoprene, and isobutylene as a monomer unit.

[14] The composition according to any one of [10] to [13], wherein the elastomer having a glass transition point of 25° C. or lower is selected from the group consisting of styrene butadiene rubber, butadiene rubber, isoprene rubber, butyl rubber, nitrile butadiene rubber, and natural rubber.

[15] The composition according to any one of [10] to [14], further comprising a silane compound other than the compound represented by formula (1) above.

[16] The composition according to [15], wherein the silane compound other than the compound represented by formula (1) above is a silane compound represented by formula (11):

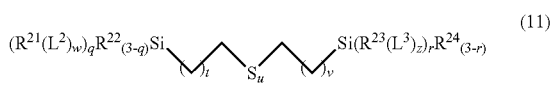

wherein t and v are each independently an integer from 0 to 10;

u is an integer from 2 to 10;

q and r are each independently an integer from 1 to 3;

w and z are each independently an integer of 0 or 1;

$L^2$ and $L^3$ are each independently a hydrocarbon group optionally containing at least one heteroatom selected from the group consisting of nitrogen, oxygen, and sulfur;

$R^{21}$ and $R^{23}$ are each independently an alkoxy group or an amino group substituted with one or more alkyl groups; and $R^{22}$ and $R^{24}$ are each independently a hydrogen atom or an alkyl group.

[17] The composition according to any one of [10] to [16], wherein the total content of the silane compound in the composition is 0.1 to 30 parts by mass with respect to 100 parts by mass of the elastomer.

[18] The composition according to any one of [15] to [17], wherein the proportion of the content of the silane compound other than the compound represented by formula (1) in the composition with respect to the total content of the silane compound in the composition is 0.1 to 0.9 on a mass basis.

[19] A method for producing the composition according to any one of [10] to [18], comprising the step of kneading the silane compound, the elastomer, and the inorganic material.

[20] The method according to [19], further comprising a step of kneading a vulcanizing agent.

[21] A cross-linked product of the composition according to any one of [10] to [18].

[22] A method for producing a cross-linked product, comprising the step of extruding the composition according to any one of [10] to [18], the step of molding the extruded composition, and the step of cross-linking the molded composition.

[23] A tire comprising the cross-linked product according to [21].

[24] The composition according to [9], wherein the polymer is a sealing polymer or an adhesive.

[25] The composition according to [24], wherein the content of the silane compound in the composition is 0.1 to 30 parts by mass with respect to 100 parts by mass of the composition.

[26] A surface treatment method for an inorganic material comprising the step of bringing the silane compound according to any one of [1] to [8] into contact with the surface of the inorganic material.

Effect of the Invention

The present invention is advantageous in respect that it provides a rubber composition for obtaining a cross-linked product exhibiting excellent viscoelastic properties. In addition, the present invention is advantageous in that it can improve tensile properties of the cross-linked product as obtained. In addition, the present invention is advantageous in that it can improve scorch resistance of a rubber composition. In addition, the present invention is advantageous in that it can improve adhesive properties of the obtained cross-linked product.

DETAILED DESCRIPTION OF THE INVENTION

Mode for Carrying Out the Invention

1. Definitions

Figure 1:
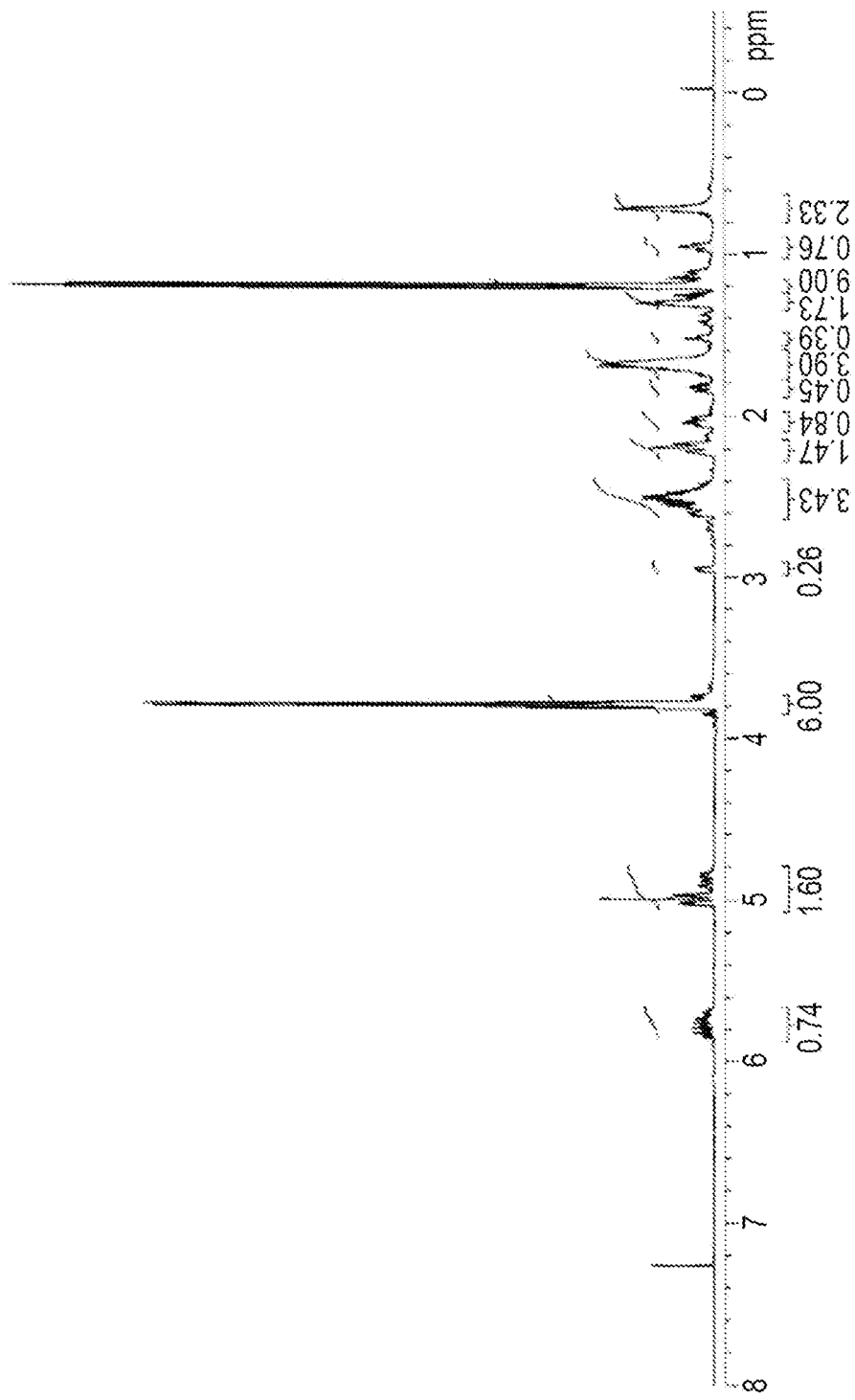
FIG. 1 shows a $^1$H-NMR chart of Silane Compound 1 (C-80) synthesized in Example 1 (1)-1.

In the present specification, "parts", "%", etc., indicating formulations, are based on mass unless otherwise specified.

2. Silane Compound

(1) Chemical Structure of Silane Compound

The silane compound according to the present invention is represented by the following formula (1)

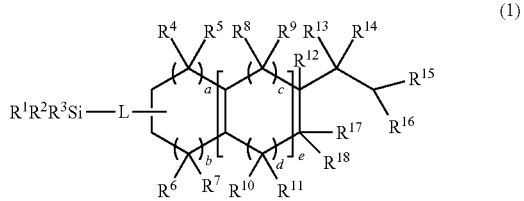

wherein $R^1$, $R^2$, and $R^3$ each independently represents a hydrocarbon group optionally containing an oxygen atom or a nitrogen atom, or a hydrogen atom;

L represents a hydrocarbon group optionally containing at least one heteroatom selected from the group consisting of nitrogen, oxygen, and sulfur;

a is an integer of 0 or 1;
b is an integer of 0 or 1;
c is each independently an integer of 0 or 1;
d is each independently an integer of 0 or 1;
e is an integer from 0 to 5;

$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by $-(CH_2)_f-$, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by $-(CH_2)_g-$, g is an integer from 1 to 5, $R^{16}$ is a hydrogen atom, a methyl group or an alkyl group having 2 to 8 carbons and $R^{17}$ is a hydrogen atom, a methyl group or an alkyl group having 2 to 10 carbons, where $R^{12}$ and $R^{13}$ bond to each other to form a double bond and $R^{14}$, $R^{15}$, and $R^{18}$ are a hydrogen atom, a methyl group or an alkyl group having 2 to 10 carbons, or $R^{14}$ and $R^{15}$ bond to each other to form a double bond and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are a hydrogen atom, a methyl group or an alkyl group having 2 to 10 carbons.

In the above formula (1), a is an integer of 0 or 1, preferably 1.

Further, b is an integer of 0 or 1, preferably 1.

Further, c is each independently an integer of 0 or 1, preferably 1.

Further, d is each independently an integer of 0 or 1, preferably 1.

Further, e is an integer from 0 to 5, preferably an integer from 0 to 3, more preferably an integer from 0 to 2, further preferably an integer of 0 or 1.

Further, $R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by $-(CH_2)_f-$.

Further, f is an integer from 1 to 5, preferably an integer from 1 to 4, more preferably an integer from 1 to 3, further preferably 1.

Further, $R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by $-(CH_2)_g-$.

Further, g is an integer from 1 to 5, preferably an integer from 1 to 4, more preferably an integer from 1 to 3, further preferably 1.

Further, $R^{16}$ is a hydrogen atom, a methyl group or an alkyl group having 2 to 8 carbons, preferably a hydrogen atom, a methyl group or an alkyl group having 2 or 3 carbons, more preferably a hydrogen atom or a methyl group, further more preferably a hydrogen atom, and $R^{17}$ is a hydrogen atom, a methyl group or an alkyl group having 2 to 10 carbons, preferably a hydrogen atom, a methyl group or an alkyl group having 2 or 5 carbons, more preferably a hydrogen atom or a methyl group, further more preferably a hydrogen atom, where $R^{12}$ and $R^{13}$ bond to each other to form a double bond and $R^{14}$, $R^{15}$, and $R^{18}$ are a hydrogen atom, a methyl group or an alkyl group having 2 to 10 carbons, or $R^{14}$ and $R^{15}$ bond to each other to form a double bond and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, preferably a 4 to 7 membered alicyclic hydrocarbon, more preferably a 5 or 6 membered alicyclic hydrocarbon, further preferably a 5 membered alicyclic hydrocarbon, where $R^{14}$ and $R^{15}$ bond to each other to form a double bond and $R^{12}$, $R^{13}$, and $R^{18}$ are a hydrogen atom, a methyl group or an alkyl group having 2 to 10 carbons.

In formula (1) above, $R^1$, $R^2$ and $R^3$ each independently represents a hydrocarbon group optionally containing an oxygen atom or a nitrogen atom, or a hydrogen atom. Examples include an alkyl group, an aralkyl group or an aryl group, and the like. Examples of the hydrocarbon group include an alkyl group, an aralkyl group or an aryl group, and the like.

Examples of the alkyl group include a methyl group, ethyl group, propyl group, butyl group, isopropyl group, tert-butyl group, 2-ethylhexyl group, cyclopentyl group, and cyclohexyl group, and the number of carbons in the alkyl group is preferably 1 to 60, more preferably 1 to 30, and a methyl group or an ethyl group is particularly preferred.

Examples of the aralkyl group include a benzyl group, phenethyl group, naphthylmethyl group, and biphenylmethyl group. The number of carbons in the aralkyl group is preferably from 7 to 60, more preferably from 7 to 20, and further preferably from 7 to 14.

Examples of the aryl group include a phenyl group, biphenyl group, naphthyl group, tolyl group, xylyl group, and the like. The number of carbons in the aryl group is preferably from 6 to 60, more preferably from 6 to 24, and further preferably from 6 to 12.

The hydrocarbon group containing an oxygen atom or a nitrogen atom is a group having a structure in which a carbon atom in the hydrocarbon group is replaced with an oxygen atom or a nitrogen atom.

In a further preferred embodiment of the invention, the hydrocarbon group optionally containing an oxygen atom or a nitrogen atom in $R^1$, $R^2$ and $R^3$ is an alkoxy group, an amino group substituted with one or more alkyl groups, or an alkyl group. More preferably, an alkoxy group having 1 to 30 carbons, further preferably an alkoxy group having 1 to 20 carbons, more preferably an amino group substituted with one or more alkyl groups having 1 to 30 carbons, further preferably an amino group substituted with one or more alkyl groups having 1 to 20 carbons, or more preferably an alkyl group having 1 to 30 carbons, further preferably an alkyl group having 1 to 20 carbons. Examples of the alkoxy group include a methoxy group, ethoxy group, propoxy group, isopropoxy group, butoxy group and isobutoxy group, and a methoxy group or an ethoxy group is particularly preferable. Examples of the amino group substituted with one or more alkyl groups include an N-methylamino group, N,N-dimethylamino group, N-ethylamino group, N,N-diethylamino group, and N-isopropylamino group, and an N-methylamino group or an N-ethylamino group is particularly preferable. Examples of the alkyl group include a methyl group, ethyl group, propyl group, isopropyl group, butyl group, isobutyl group, tert-butyl group, pentyl group, cyclopentyl group, hexyl group, and a cyclohexyl group, among which a methyl group and an ethyl group are preferable.

In formula (1) above, L is a hydrocarbon group which may contain at least one hetero atom selected from the group consisting of nitrogen, oxygen and sulfur, and preferably a hydrocarbon group having 1 to 30 carbons which may contain at least one hetero atom selected from the group consisting of nitrogen, oxygen and sulfur, more preferably a hydrocarbon group having 1 to 20 carbons which may contain at least one hetero atom selected from the group consisting of nitrogen, oxygen and sulfur, and further preferably a hydrocarbon group having 1 to 10 carbon atoms which may contain at least one hetero atom selected from the group consisting of nitrogen, oxygen and sulfur. Among them, L is particularly preferably a hydrocarbon group containing sulfur. The length of the straight chain portion connecting the silyl group and the alicyclic hydrocarbon portion in such hydrocarbon group is preferably from 3 to 8, more preferably from 4 to 7, and even more preferably from 4 to 6 as a total sum of number of atoms of carbon, nitrogen, oxygen, or sulfur.

The silane compound of the present invention is preferably a sulfur-containing silane compound.

The compound represented by formula (1) of the present invention is preferably a compound represented by formula (2):

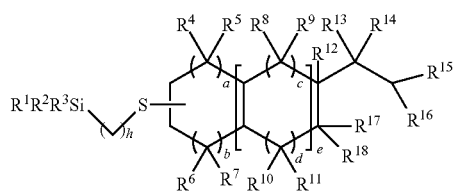

wherein
$R^1$, $R^2$, and $R^3$ each independently represents a hydrocarbon group optionally containing an oxygen atom or a nitrogen atom, or a hydrogen atom;
h is an integer from 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —$(CH_2)_f$—, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —$(CH_2)_g$—, g is an integer from 1 to 5, $R^{16}$ is a hydrogen atom, a methyl group or an alkyl group having 2 to 8 carbons, $R^{17}$ is a hydrogen atom, a methyl group or an alkyl group having 2 to 10 carbons; where $R^{12}$ and $R^{13}$ bond to each other to form a double bond and $R^{14}$, $R^{15}$, and $R^{18}$ are a hydrogen atom, a methyl group or an alkyl group having 2 to 10 carbons, or $R^{14}$ and $R^{15}$ bond to each other to form a double bond and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are a hydrogen atom, a methyl group or an alkyl group having 2 to 10 carbons.

h in the compound represented by formula (2) above is an integer of 1 to 10, preferably 1 to 8, more preferably 2 to 7, further preferably 3 to 6, further more preferably 3 to 5, and particularly preferably 3. Also, a to g and $R^1$ to $R^{18}$ are as described in formula (1) above.

The compound represented by formula (1) of the present invention is more preferably a compound represented by formula (3):

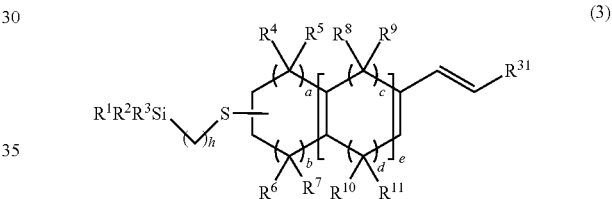

wherein
$R^1$, $R^2$, and $R^3$ each independently represents a hydrocarbon group optionally containing an oxygen atom or a nitrogen atom, or a hydrogen atom;
h is an integer from 1 to 10;
a is an integer of 0 or 1;
b is an integer of 0 or 1;
c is independently an integer of 0 or 1;
d is independently an integer of 0 or 1;
e is an integer from 0 to 5;
$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —$(CH_2)_g$—, g is an integer from 1 to 5, and $R^{31}$ is a hydrogen atom, a methyl group or an alkyl group having 2 to 8 carbons.

Among the compounds represented by formula (3), a to g and $R^1$ to $R^{11}$ are as described in formula (1) above, and h is as described in formula (2) above.

$R^{31}$ in formula (3) is a hydrogen atom, a methyl group or an alkyl group having 2 to 8 carbons, preferably a hydrogen atom, a methyl group or an alkyl group having 2 to 5 carbons, more preferably a hydrogen atom, a methyl group or an alkyl group having 1 or 2 carbons, and further preferably a hydrogen atom.

The compound represented by formula (1) of the present invention is more preferably a compound represented by formula (4):

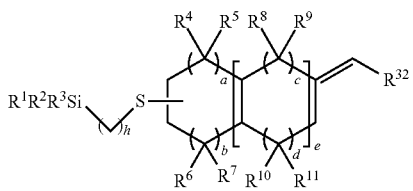
(4)

wherein
$R^1$, $R^2$, and $R^3$ each independently represents a hydrocarbon group optionally containing an oxygen atom or a nitrogen atom, or a hydrogen atom;
h is an integer from 1 to 10;
a is an integer of 0 or 1;
b is an integer of 0 or 1;
c is independently an integer of 0 or 1;
d is independently an integer of 0 or 1;
e is an integer from 0 to 5;
$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —$(CH_2)_g$—, g is an integer from 1 to 5, and $R^{32}$ is a hydrogen atom, a methyl group or an alkyl group having 2 to 9 carbons.

Among the compounds represented by formula (4) above, a to g and $R^1$ to $R^{11}$ are as described in formula (1) above, and h is as described in formula (2) above.

In formula (4), $R^{32}$ is a methyl group or an alkyl group having 2 to 9 carbons, preferably a methyl group or an alkyl group having 2 to 5 carbons, more preferably a methyl group or an alkyl group having 1 or 2 carbons, and further preferably a methyl group.

The compound represented by formula (1) of the present invention is more preferably a compound represented by formula (5):

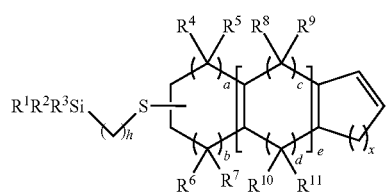
(5)

wherein
$R^1$, $R^2$, and $R^3$ each independently represents a hydrocarbon group optionally containing an oxygen atom or a nitrogen atom, or a hydrogen atom;
h is an integer from 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —$(CH_2)_g$—, g is an integer from 1 to 5, and x is an integer from 0 to 5.

Among the compounds represented by Formula (5), a to g and $R^1$ to $R^{11}$ are as described in formula (1) above, and h is as described in formula (2) above.

x in formula (5) is an integer of 0 to 5, preferably an integer of 0 to 3, more preferably 1 or 2, and further preferably 1.

The compound represented by formula (1) of the present invention is more preferably a compound represented by formula (6):

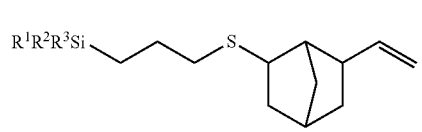
(6)

wherein $R^1$, $R^2$, and $R^3$ each independently represents a hydrocarbon group optionally containing an oxygen atom or a nitrogen atom, or a hydrogen atom; or by formula (7):

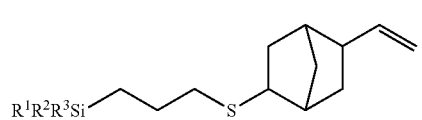
(7)

wherein $R^1$, $R^2$, and $R^3$ each independently represents a hydrocarbon group optionally containing an oxygen atom or a nitrogen atom, or a hydrogen atom; or by formula (8):

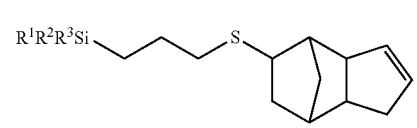
(8)

wherein $R^1$, $R^2$, and $R^3$ each independently represents a hydrocarbon group optionally containing an oxygen atom or a nitrogen atom, or a hydrogen atom; or by formula (9):

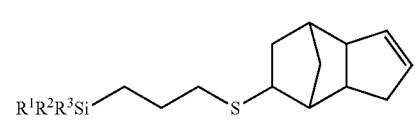
(9)

wherein $R^1$, $R^2$, and $R^3$ each independently represents a hydrocarbon group optionally containing an oxygen atom or a nitrogen atom, or a hydrogen atom.

In the compounds represented by formulae (6) to (9) above, $R^1$ to $R^3$ are as described in formula (1) above.

Another further preferred embodiment of the compound of formula (1) of the present invention includes the compounds of formulae (12) to (25):

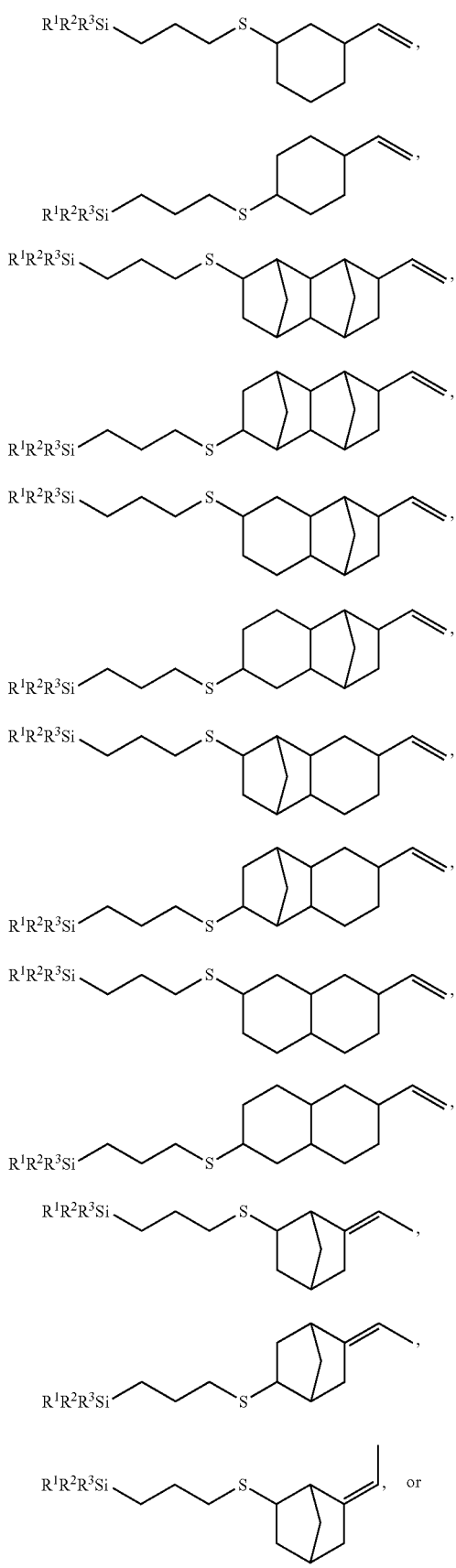

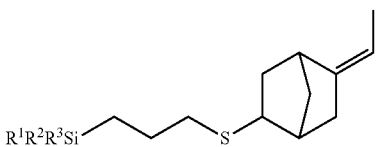

wherein $R^1$, $R^2$, and $R^3$ each independently represents a hydrocarbon group optionally containing an oxygen atom or a nitrogen atom, or a hydrogen atom.

In the compounds represented by formulae (12) to (25), $R_1$ to $R^3$ are as described in formula (1) above.

A more preferable embodiment of the compound represented by formula (1) of the present invention includes a silane compound having the chemical structure in which $R^1R^2R^3Si$ group in the above-mentioned formulae (1) to (9) and formulae (12) to (25) represents formula (10):

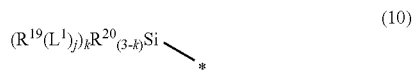

wherein
$R^{19}$ each independently represents an alkoxy group or an amino group substituted with one or more alkyl groups;
$R^{20}$ each independently represents a hydrogen atom or an alkyl group;
$L^1$ each independently represents a hydrocarbon group optionally including at least one hetero atom selected from the group consisting of nitrogen, oxygen, and sulfur;
j is each independently an integer of 0 or 1;
k is an integer of 1 to 3; and
an asterisk (*) indicates a region bonded to a moiety other than a silyl group of the silane compound.

In formula (10) above, $R^{19}$ is each independently an alkoxy group or an amino group substituted with one or more alkyl groups. In one preferred embodiment, $R^{19}$ is each independently a hydrolyzable group, and is an alkoxy group, more preferably an alkoxy group having 1 to 30 carbons, further preferably an alkoxy group having 1 to 20 carbons, or an amino group substituted with one or more alkyl groups, more preferably an amino group substituted with one or more alkyl groups having 1 to 30 carbons, further preferably an amino group substituted with one or more alkyl groups having 1 to 20 carbons. Specifically, examples of the alkoxy group include a methoxy group, ethoxy group, propoxy group, isopropoxy group, butoxy group, and isobutoxy group, which among a methoxy group or an ethoxy group is preferable. Examples of the amino group substituted with one or more alkyl groups include an N-methylamino group, N,N-dimethylamino group, N-ethylamino group, N,N-diethylamino group, and N-isopropylamino group, which among an N-methylamino group or an N-ethylamino group is preferable. Note that, the alkoxy group and the amino group may be bonded with silicon (Si) via a connecting group comprising a hydrocarbon group optionally containing at least one hetero atom selected from the group consisting of nitrogen, oxygen, and sulfur.

$R^{20}$ each independently represents a hydrogen atom or an alkyl group, more preferably an alkyl group having 1 to 30 carbons, and further preferably an alkyl group having 1 to 20 carbons, and specific examples thereof include a methyl group, ethyl group, propyl group, isopropyl group, butyl group, isobutyl group, tert-butyl group, pentyl group, cyclopentyl group, hexyl group and cyclohexyl group, among which a methyl group and an ethyl group are preferable.

In the above formula (10), $L^1$ is each independently a hydrocarbon group optionally containing at least one hetero atom selected from the group consisting of nitrogen, oxygen and sulfur, preferably a hydrocarbon group having 1 to 30 carbons optionally containing at least one hetero atom selected from the group consisting of nitrogen, oxygen and sulfur, more preferably a hydrocarbon group having 1 to 20 carbons optionally containing at least one hetero atom selected from the group consisting of nitrogen, oxygen and sulfur, and further preferably a hydrocarbon group having 1 to 10 carbons which may contain at least one hetero atom selected from the group consisting of nitrogen, oxygen and sulfur.

In the above formula (10), k is an integer of 1 to 3, preferably an integer of 2 to 3, and more preferably 3.

j is independently an integer of 0 or 1, preferably 0.

The compound represented by formula (1) according to the present invention is even preferably a silane compound in which $R^1R^2R^3Si$ group in the above-mentioned formulae (1) to (9) and formulae (12) to (25) represents a triethoxy silyl group or a trimethoxy silyl group, and even more preferably a silane compound in which $R^1R^2R^3Si$ group is a triethoxy silyl group.

A particularly preferred embodiment of the compound represented by formula (1) above of the present invention includes compounds represented by formulae (26) to (43):

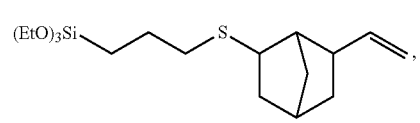
(26)

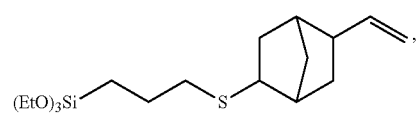
(27)

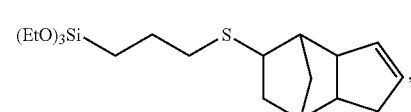
(28)

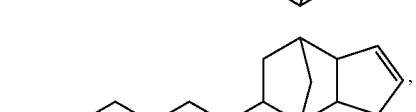
(29)

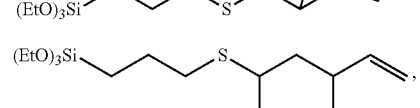
(30)

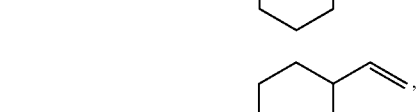
(31)

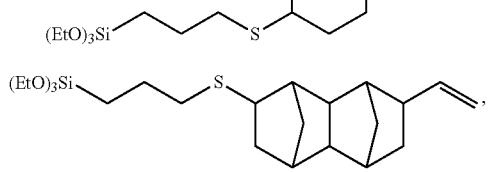
(32)

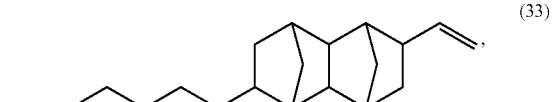
(33)

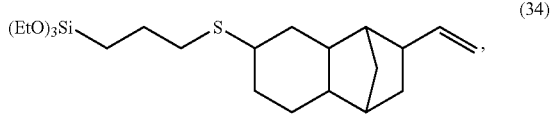
(34)

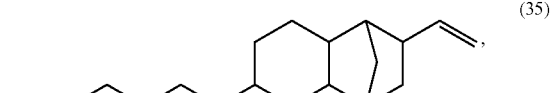
(35)

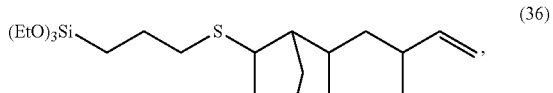
(36)

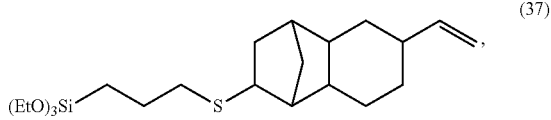
(37)

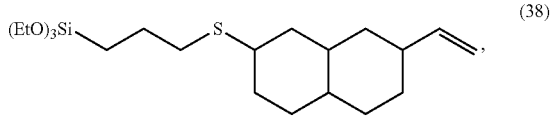
(38)

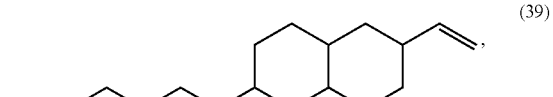
(39)

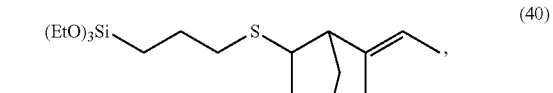
(40)

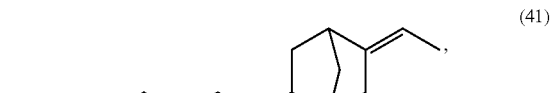
(41)

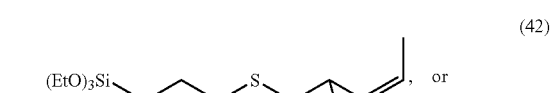
(42)

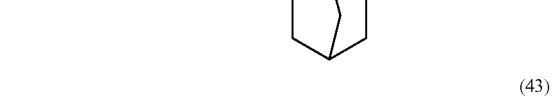

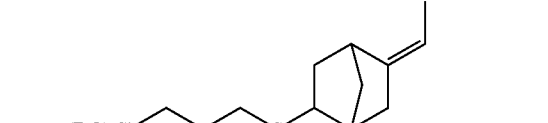
(43)

The compound of formula (1) above of the present invention is preferably a stereoisomer thereof or any mixture of stereoisomers thereof.

(2) Method for Producing Silane Compound

The compound represented by formula (1) can be produced by reacting a compound represented by formula (44):

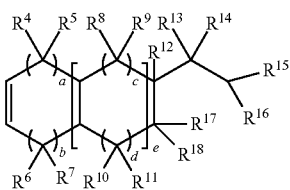

(44)

wherein
a is an integer of 0 or 1;
b is an integer of 0 or 1;
c is each independently an integer of 0 or 1;
d is each independently an integer of 0 or 1;
e is an integer of 0 to 5;
$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —$(CH_2)_g$—, g is an integer from 1 to 5, $R^{16}$ is a hydrogen atom, a methyl group or an alkyl group having 2 to 8 carbons, $R^{17}$ is a hydrogen atom, a methyl group or an alkyl group having 2 to 10 carbons; where $R^{12}$ and $R^{13}$ bond to each other to form a double bond and $R^{14}$, $R^{15}$, and $R^{18}$ are a hydrogen atom, a methyl group or an alkyl group having 2 to 10 carbons, or $R^{14}$ and $R^{15}$ bond to each other to form a double bond and $R^{12}$, $R^{13}$, and $R^{18}$ are a hydrogen atom, a methyl group or an alkyl group having 2 to 10 carbons; or
$R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are a hydrogen atom, a methyl group or an alkyl group having 2 to 10 carbons;
with a compound represented by formula (45):

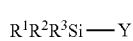

$$R^1R^2R^3Si-Y \qquad (45)$$

wherein
$R^1$, $R^2$, and $R^3$ each independently represents a hydrocarbon group optionally containing an oxygen atom or a nitrogen atom, or a hydrogen atom; and Y is a hydrocarbon group optionally containing at least one hetero atom selected from the group consisting of nitrogen, oxygen, and sulfur.

In formulae (44) and (45) above, $R^1$ to $R^{18}$ and a to g are as described for the compound represented by formula (1).

In formula (45) above, Y is a hydrocarbon group which may contain at least one hetero atom selected from the group consisting of nitrogen, oxygen, and sulfur, preferably a hydrocarbon group optionally containing at least one hetero atom selected from the group consisting of nitrogen, oxygen, and sulfur having 1 to 30 carbons, more preferably a hydrocarbon group optionally containing at least one hetero atom selected from the group consisting of nitrogen, oxygen and sulfur having 1 to 20 carbons, and further preferably a hydrocarbon group optionally containing at least one hetero atom selected from the group consisting of nitrogen, oxygen and sulfur having 1 to 10 carbons.

Among them, Y is particularly preferably a hydrocarbon group containing sulfur. The length of the linear chain portion connecting the portions bonding to the silyl group in the hydrocarbon group and the alicyclic hydrocarbon moiety in the total number of carbon, nitrogen, oxygen, or sulfur atoms is preferably 3 to 8, more preferably 4 to 7, and further preferably 4 to 6 as.

Production of the compound represented by formula (1) above is possible by synthesizing by subjecting the compound represented by formula (44) and the compound represented by formula (45) to an addition reaction or a condensation reaction. As the addition reaction herein, it is possible to utilize a radical addition reaction, conjugate addition reaction, nucleophilic addition reaction, electrophilic addition reaction, or the like, and for example, it is possible to utilize a reaction similar to a pericyclic reaction, or hydrosilation reaction, hydroamination reaction, or the like. As the condensation reaction, for example, it is possible to utilize an esterification reaction, amidation reaction, thioesterification reaction, thioamidation reaction, Friedel-Crafts reaction, or the like.

The compound represented by the above-described formula (44) can be synthesized by a Diels-Alder reaction between the same or different conjugated diene compounds or a Diels-Alder reaction between a conjugated diene compound and an alkene compound based on the knowledge already known to those skilled in the art. The compound represented by formula (44) can be prepared by heat-denaturing, as required, and/or by purifying, as required, the compound synthesized by the Diels-Alder reaction.

The compound represented by formula (2) above can be produced by reacting a compound represented by formula (44):

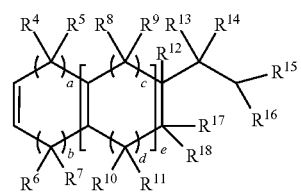

(44)

wherein
a is an integer of 0 or 1;
b is an integer of 0 or 1;
c is each independently an integer of 0 or 1;
d is each independently an integer of 0 or 1;
e is an integer of 0 to 5;
$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —$(CH_2)_g$—, g is an integer from 1 to 5, $R^{16}$ is a hydrogen atom, a methyl group or an alkyl group having 2 to 8 carbons, $R^7$ is a hydrogen atom, a methyl group or an alkyl group having 2 to 10 carbons; where $R^{12}$ and $R^{13}$ bond to each other to form a double bond and $R^{14}$, $R^{15}$, and $R^{18}$ are a hydrogen atom, a methyl group or an alkyl group having 2 to 10 carbons, or $R^{14}$ and $R^{15}$ bond to each other to form a double bond and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are a hydrogen atom, a methyl group or an alkyl group having 2 to 10 carbons;

with a compound represented by formula (46):

(46)

wherein $R^1$, $R^2$, and $R^3$ each independently represents a hydrocarbon group optionally containing an oxygen atom or a nitrogen atom, or a hydrogen atom; and h represents an integer from 1 to 10.

In formulae (44) and (46) above, $R^1$ to $R^{18}$ and a to g are as described for the compound represented by formula (1). Further, h is as described for the compound represented by formula (2).

It is considered that by mixing the compound represented by formula (44) above and the compound represented by formula (46) above and heating the mixture, the mercapto group in the compound represented by formula (46) above and the carbon-carbon unsaturated bonding portion in the compound represented by formula (44) above react to synthesize the compound represented by formula (2) above. The compound represented by formula (46) above is preferably mixed in an amount of 0.1 to 4 moles, more preferably 0.3 to 3 moles per 1 mole of the compound represented by formula (44). The heating temperature is preferably 40 to 300° C., more preferably 50 to 200° C.

Examples of the compound represented by formula (46) above include an alkoxysilane compound having a mercapto group. Examples of the alkoxysilane compound having a mercapto group include mercaptotrimethoxysilane, mercaptotriethoxysilane, mercaptomethyltrimethoxysilane, mercaptomethyltriethoxysilane, mercaptomethyltripropoxysilane, 2-mercaptoethyltrimethoxysilane, 2-mercaptoethyltriethoxysilane, 3-mercaptopropyltrimethoxysilane, 4-mercaptobutyltrimethoxysilane, 3-mercaptopropyltriethoxysilane, 4-mercaptobutyltriethoxysilane, 2-mercaptoethyltripropoxysilane, 3-mercaptopropyltripropoxysilane, 4-mercaptobutyltripropoxysilane, 2-mercaptoethylmethyldimethoxysilane, 3-mercaptopropylmethyldimethoxysilane, 4-mercaptobutylmethyldimethoxysilane, 2-mercaptoethylmethyldiethoxysilane, 3-mercaptopropylmethyldiethoxysilane, 4-mercaptobutylmethyldiethoxysilane, and the like.

The compound represented by formula (2) above can also be synthesized by mixing the compound represented by formula (44) above with the compound represented by formula (11) to be described below and heating the mixture. It is considered that a polysulfide bond in the compound represented by formula (11) to be described below causes cleavage and this reacts with the carbon-carbon unsaturated bond moiety in the compound represented by formula (44) above, thereby synthesizing the compound represented by formula (2) above. The compound represented by formula (11) to be described below is preferably mixed in an amount of 0.1 to 4 mol, more preferably 0.3 to 3 mol per 1 mol of the compound represented by formula (44) above. The heating temperature is preferably 40 to 300° C., and more preferably 50 to 200° C.

If necessary, a radical initiator may be used in combination. Examples of the radical initiator include azo compounds such as azobisisobutyronitrile (AIBN) and 1,1'-azobis(cyclohexanecarbonitrile) (ABCN); peroxides such as di-tert-butyl peroxide (t-BuOOBu-t) and tert-butyl hydroperoxide (t-BuOOH), benzoyl peroxide (BPO, PhC(=O)OOC(=O)pH), methyl ethyl ketone peroxide, and dicumyl peroxide (DCP); dihalogen compounds such as chlorine molecules, and redox initiators of a combination of an oxidizing agent and a reducing agent such as hydrogen peroxide and iron(II)salt, persulfate and sodium hydrogen sulfite; triethylborane ($Et_3B$); and diethylzinc ($Et_2Zn$).

Further, it is also possible to adopt a method of sequentially adding a synthetic raw material as required. When the compound represented by formula (2) above is synthesized, all or a part of the compounds to be used is added to the reactor in multiple times as in Example 1(1)-2 or 1(1)-3, to be described below, or it is possible to adopt a method for controlling the actual reaction rate by adding at any rate.

Among the compounds represented by formula (11) to be described later, bis[3-(triethoxysilyl)propyl]tetrasulfide may be one commercially available, for example, Si-69 manufactured by Evonik Corporation. Bis[3-(triethoxysilyl)propyl]disulfide may also be one commercially available, for example, Si-75 manufactured by Evonik Corporation.

(3) Usefulness of Silane Compound

A cross-linked product exhibiting excellent viscoelastic properties can be obtained when the silane compound of the present invention is contained in a rubber composition. In addition, the cross-linked product as obtained can improve its tensile properties. In addition, the rubber composition can improve its scorch resistance. When the silane compound of the present invention is contained in a sealing polymer or an adhesive, it is possible to improve adhesion between the sealant composition or the adhesive composition and the inorganic material.

3. Composition Comprising Silane Compound

The composition of the present invention comprises a silane compound represented by formula (1) above and a polymer capable of reacting with the silane compound. Examples of the composition of the present invention include a rubber composition in which the polymer is an elastomer having a glass transition point of 25° C. or lower, comprising an inorganic material, a sealant composition in which the polymer is a sealing polymer, and an adhesive composition in which the polymer is an adhesive, and the like.

(1) Rubber Composition

One preferred embodiment of the composition of the present invention comprises a silane compound represented by formula (1) above, an elastomer having a glass transition point of 25° C. or lower, and an inorganic material. One more preferred embodiment of the composition of the present invention comprises a silane compound represented by formula (1) above, an elastomer with a glass transition point of 25° C. or lower having a double bond in the main chain, and an inorganic material. These compositions can provide a rubber composition for obtaining a crosslinked product that hardly generates poor mixing or dispersion between the elastomer and an inorganic material such as silica and exhibits excellent viscoelastic properties. Also, it is possible to improve tensile properties of the cross-linked product (rubber product) such as a tyre obtained by molding and cross-linking the rubber composition. Also, it is possible to improve scorch resistance of the rubber composition.

Conventionally, reaction of a silane coupling agent with an elastomer required a substituent with high polarity such as a polysulfide group, mercapto group, epoxy group, and amino group. However, there was a problem that polarity increases as these functional groups are introduced, and in the case of a material with low polarity, affinity is impaired, causing poor dispersibility and mixing. Although not bound to a specific theory, the silane compound of formula (1) above have an allyl hydrogen with high reactivity in its alicyclic olefin moiety and can co-cross-link with the elastomer. The silyl group portion reacts with a silanol group of the silica surface. It is considered that addition of the compound represented by formula (1) above mediates the reaction between the elastomer and glass or silica, whereby reinforcement properties are exhibited. As a result, a rubber composition containing the compound represented by formula (1) above has an excellent dispersibility and a rubber product obtained from the rubber composition is considered to exhibit excellent viscoelastic properties.

Also, it is known in the art that impurities of natural rubber (proteins, phospholipids, etc.) inhibit coupling reaction, which causes poor mixing and dispersibility of the organic polymeric material including the natural rubber and the inorganic material such as silica, and reduction in viscoelasticity of the rubber product molded and vulcanized by using the natural rubber (Sarkawi S. S. et al., European Polymer Journal vol. 49 p. 3199 (2013)). Although not bound to a specific theory, it is considered that coupling reaction occurs efficiently since the silane compound of formula (1) above has low polarity and is less affected by the highly-polar impurities (proteins, phospholipids, etc.) in the natural rubber.

(i) Elastomer

The elastomer contained in the rubber composition of the present invention includes an elastomer having a glass transition temperature (Tg) of 25° C. or lower. According to one preferred embodiment of the present invention, the elastomer in the rubber composition of the present invention includes an elastomer having a glass transition temperature (Tg) of 0° C. or lower. The glass transition temperature (Tg) of the elastomer in the rubber composition of the present invention within this range is preferable because the rubber composition exhibits rubber-like elasticity at room temperature. In the present invention, the glass transition temperature (Tg) is a glass transition point measured by differential scanning calorimetry (DSC-Differential Scanning Calorimetry). The heating rate is preferably 10° C./min.

The elastomer included in the rubber composition of the present invention include natural rubber, butadiene rubber, nitrile rubber, silicone rubber, isoprene rubber, styrene-butadiene rubber, isoprene-butadiene rubber, styrene-isoprene-butadiene rubber, ethylene-propylene-diene rubber, halogenated butyl rubber, halogenated isoprene rubber, halogenated isobutylene copolymer, chloroprene rubber, butyl rubber and halogenated isobutylene-p-methylstyrene rubber, among which natural rubber, butadiene rubber, isoprene rubber, styrene-butadiene rubber, isoprene-butadiene rubber, styrene-isoprene-butadiene rubber, ethylene-propylene-diene rubber, halogenated butyl rubber, halogenated isoprene rubber, halogenated isobutylene copolymer, butyl rubber, and halogenated isobutylene-p-methylstyrene rubber, which are preferred, and amongst these, natural rubber, butadiene rubber, isoprene rubber, styrene-butadiene rubber, isoprene-butadiene rubber, styrene-isoprene-butadiene rubber, halogenated butyl rubber, butyl rubber, and halogenated isobutylene-p-methylstyrene rubber are further preferred, and amongst these, natural rubber, styrene-butadiene rubber and butadiene rubber are more preferred. The elastomer in the rubber composition of the present invention may be one or two or more of the above-mentioned rubbers.

The elastomer contained in the rubber composition of the present invention is preferably an elastomer with a glass transition point of 25° C. or lower, having a double bond in the main chain. The elastomer is more preferably an elastomer containing at least one monomer unit selected from the group consisting of styrene, butadiene, isoprene and isobutylene, and more preferably an elastomer selected from the group consisting of styrene butadiene rubber, butadiene rubber, isoprene rubber, butyl rubber, nitrile butadiene rubber and natural rubber.

The elastomer with a glass transition point of 25° C. or lower, having a double bond in the main chain, contained in the rubber composition of the present invention is preferably selected from the group consisting of styrene-butadiene rubber, butadiene rubber, isoprene rubber, butyl rubber, nitrile-butadiene rubber and natural rubber, more preferably styrene-butadiene rubber, butadiene rubber, isoprene rubber, butyl rubber and natural rubber, further preferably styrene-butadiene rubber, butadiene rubber, isoprene rubber and natural rubber, even more preferably styrene-butadiene rubber and butadiene rubber, and particularly preferably emulsion-polymerized styrene butadiene rubber having a high trans content and a low vinyl content in the microstructure. The elastomer contained in the rubber composition of the present invention may be one or two or more of the above-mentioned styrene-butadiene rubber, butadiene rubber, isoprene rubber, butyl rubber, nitrile-butadiene rubber, and natural rubber.

As the above-described emulsion-polymerized styrene butadiene rubber having a high trans content and a low vinyl content in the butadiene portion in the microstructure, one with a butadiene component having a trans content of 50 to 85%, a cis content of 3 to 25%, a vinyl content of 10 to 25%, and a styrene content of 1 to 50% by mass is more preferable, and even more preferred is one having a trans content of 60 to 75%, a cis content of 10 to 20%, a vinyl content of 12 to 20%, and a styrene content of 20 to 40%.

The elastomer contained in the rubber composition of the present invention may include one or more known synthetic elastomers other than the elastomer with a glass transition point of 25° C. or lower, having a double bond in the main chain, and these may be liquid or solid. Specific examples thereof include synthetic elastomers selected from the group consisting of chloroprene rubber (CR), ethylene-propylene rubber (EPM, EPDM), chlorosulfonated polyethylene rubber (CSM), acrylic rubber (ACM), urethane rubber (U), silicone rubber (VMQ, PVMQ, FVMQ), fluororubber (FKM), and polysulfide rubber (T), among which chloroprene rubber (CR) and ethylene-propylene rubber (EPM, EPDM) are preferred. They can be used as any blend with an elastomer with a glass transition point of 25° C. or lower, having a double bond in the main chain.

The weight average molecular weight of the elastomer in the rubber composition of the present invention is preferably 1,000 to 3,000,000, and further preferably 10,000 to 1,000,000.

In the present invention, the weight average molecular weight is a weight average molecular weight (in terms of polystyrene) as measured by gel permeation chromatography (GPC). It is preferable to use tetrahydrofuran (THF), N,N-dimethylformamide (DMF), and chloroform as solvents for the measurement.

The content of the compound represented by formula (1) in the rubber composition of the present invention is preferably 0.1 to 30 parts by mass, more preferably 0.3 to 20 parts by mass, further preferably 0.4 to 15 parts by mass, further more preferably 0.7 to 10 parts by mass, particularly preferably 0.7 to 6.9 parts by mass, particularly more preferably 1 to 5.0 parts by mass, and particularly further preferably 1 to 3.4 parts by mass, with respect to 100 parts by mass of the elastomer. The content of the compound represented by formula (1) is preferably 0.1 to 30 parts by mass, more preferably 0.5 to 20 parts by mass, and further preferably 1.0 to 15 parts by mass, with respect to 100 parts by mass of the total amount of the inorganic material contained in the rubber composition.

By including the compound represented by formula (1) above in the rubber composition of the present invention, it is possible to improve viscoelastic properties of the cross-linked product to be obtained. Also, tensile properties of the cross-linked product to be obtained can be improved. Further, scorch resistance of the rubber composition can be improved.

(ii) Silane Compounds Other than the Compound Represented by Formula (1)

The rubber composition of the present invention may further include a silane compound other than the compound represented by formula (1) (also referred to as "other silane compound" in the present specification). When a rubber composition containing a silane compound other than the compound represented by formula (1) is subjected to a vulcanization reaction, the silane compound other than the compound represented by formula (1) is incorporated into the vulcanization reaction, so that the silane compound other than the compound represented by formula (1) functioning as a silane coupling agent and the compound represented by formula (1) react with each other. This reaction is considered to generate a synergistic effect of increasing coupling efficiency. In the present invention, the silane compound other than the compound represented by formula (1) is preferably a sulfur-containing silane compound other than the compound represented by formula (1) (other sulfur-containing silane compound).

The content of the silane compound other than the compound represented by formula (1) is preferably 0.01 to 27 parts by mass and more preferably 0.03 to 18 parts by mass with respect to 100 parts by mass of the elastomer. The content of the silane compound other than the compound represented by formula (1) is preferably 0.01 to 27 parts by mass, more preferably 0.05 to 18 parts by mass, further preferably 0.1 to 13.5 parts by mass with respect to 100 parts by mass of the total amount of the inorganic material contained in the rubber composition.

The total amount of the content of the compound represented by formula (1) and the silane compound other than the compound represented by formula (1) in the rubber composition of the present invention is preferably 0.1 to 30 parts by mass, more preferably 0.3 to 20 parts by mass, further preferably 0.4 to 15 parts by mass, further more preferably 0.7 to 10 parts by mass, particularly preferably 0.7 to 6.9 parts by mass, particularly more preferably 1 to 5.0 parts by mass, particularly further preferably 1 to 3.4 parts by mass with respect to 100 parts by mass of the elastomer. Also, the total amount of the content of the compound represented by formula (1) and the silane compound other than the compound represented by formula (1) is preferably 0.1 to 30 parts by mass, more preferably 0.5 to 20 parts by mass, further preferably 1.0 to 15 parts by mass, based on the total of 100 parts by mass of the inorganic material contained in the rubber composition.

In the rubber composition of the present invention, the proportion of the content of the silane compound other than the compound represented by formula (1) to the total amount of the content of the compound represented by formula (1) and the silane compound other than the compound represented by formula (1) is preferably 0.1 to 0.9 and more preferably 0.2 to 0.8 on a mass basis.

As for the silane compound other than the compound represented by formula (1), use can be made to, for example, a compound represented by formula (11):

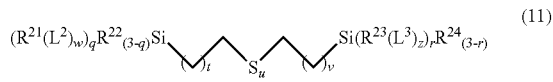

wherein
t and v are each independently an integer of 0 to 10;
u is an integer of 2 to 10;
q and r are each independently an integer of 1 to 3;
w and z are each independently an integer of 0 or 1;
$L^2$ and $L^3$ are each independently a hydrocarbon group optionally containing at least one heteroatom selected from the group consisting of nitrogen, oxygen and sulfur;
$R^{21}$ and $R^{23}$ are each independently an alkoxy group or an amino group substituted with one or more alkyl groups; and
$R^{22}$ and $R^{24}$ are each independently a hydrogen atom or an alkyl group.

In formula (11) above, t and v each independently represent an integer of 0 to 10, preferably an integer of 0 to 5, more preferably an integer of 1 to 3, and further preferably 2.

u represents an integer of 2 to 10 and more preferably an integer of 2 to 8.

g and r each independently represents an integer of 1 to 3, preferably an integer of 2 to 3, and more preferably 3.

w and z each independently represents an integer of 0 or 1 and preferably 0. $L^2$ and $L^3$ are each independently a hydrocarbon group optionally containing at least one heteroatom selected from the group consisting of nitrogen, oxygen, and sulfur, preferably a hydrocarbon group having 1 to 30 carbons, optionally containing at least one heteroatom selected from the group consisting of nitrogen, oxygen, and sulfur, more preferably a hydrocarbon group having 1 to 20 carbons, optionally containing at least one heteroatom selected from the group consisting of nitrogen, oxygen, and sulfur, and further preferably a hydrocarbon group having 1 to 10 carbons, optionally containing at least one heteroatom selected from the group consisting of nitrogen, oxygen, and sulfur.

$R^{21}$ and $R^{23}$ each independently represents a hydrolyzable group, and an alkoxy group, more preferably an alkoxy group having 1 to 30 carbons, more preferably an alkoxy group having 1 to 20 carbons, or an amino group substituted with one or more alkyl groups, more preferably an amino group substituted with one or more alkyl groups having 1 to 30 carbons, and more preferably an amino group substituted with one or more alkyl groups having 1 to 20 carbons. Specifically, examples of the alkoxy group include a methoxy group, ethoxy group, propoxy group, isopropoxy group, butoxy group, and isobutoxy group, and among these, a methoxy group or an ethoxy group is preferable. Examples of the amino group substituted with one or more alkyl groups include an N-methylamino group, N,N-dimethylamino group, N-ethylamino group, N,N-diethylamino group, and N-isopropylamino group, and among these, an N-methylamino group or an N-ethylamino group is preferable. Note that, the alkoxy group and the amino group may be bonded to silicon (Si) via a connecting group consisted of a hydrocarbon group optionally containing at least one heteroatom selected from the group consisting of nitrogen, oxygen, and sulfur.

In addition, $R^{22}$ and $R^{24}$ each independently represents a hydrogen atom or an alkyl group, more preferably an alkyl group having 1 to 30 carbons, further preferably an alkyl group having 1 to 20 carbons, and specific examples thereof include a methyl group, ethyl group, propyl group, isopropyl group, butyl group, isobutyl group, tert-butyl group, pentyl group, cyclopentyl group, hexyl group, and cyclohexyl group, among which a methyl group and an ethyl group are preferable.

The content of the compound represented by formula (11) above in the rubber composition of the present invention is preferably 0.01 to 27 parts by mass and more preferably 0.03 to 18 parts by mass with respect to 100 parts by mass of the elastomer. The content of the compound represented by formula (11) above in the rubber composition of the present invention is preferably 0.01 to 27 parts by mass, more preferably 0.05 to 18 parts by mass, further preferably 0.1 to 13.5 parts by mass with respect to 100 parts by mass of the total amount of the inorganic material contained in the rubber composition.

As for the silane compound other than the compound represented by the formula (1), a compound represented by formula (46), particularly a silane compound having the following structure can be used in addition to the compound represented by the formula (11) above.

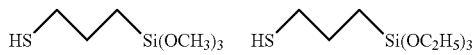

(iii) Inorganic Material

Examples of the inorganic material contained in the rubber composition of the present invention include silica, carbon black, calcium carbonate, titanium oxide, clay and talc, among which silica or carbon black is preferably used because the mechanical properties and heat resistance can be further improved.

Silica is not particularly limited, and examples thereof include dry process silica, wet process silica, colloidal silica, precipitated silica, and the like. Among these, wet process silica mainly constituted of hydrated silicic acid is preferable. These silicas may be each used alone, or two or more of those in combination is possible, in an amount of 10 to 300 parts by mass based on 100 parts by mass of the elastomer. The specific surface area of these silicas is not particularly limited, and it is preferable when the nitrogen adsorption specific surface area (BET method) is usually in the range from 10 to 400 m$^2$/g, preferably from 20 to 300 m$^2$/g, and further preferably from 120 to 190 m$^2$/g, because improvements are sufficiently achieved in reinforcing properties, abrasion resistance, heat generation and the like. Here, the nitrogen adsorption specific surface area is a value measured by the BET method in accordance with ASTMD 3037-81.

Carbon black is appropriately selected and used according to the application. In general, carbon black is classified into hard carbon and soft carbon based on the particle size. Soft carbon has low reinforcing properties against rubber, and hard carbon has high reinforcing properties against rubber. In the rubber composition of the present invention, it is preferable to specifically use hard carbon with high reinforcing properties. Preferably, the content is 10 to 300 parts by mass, preferably 20 to 200 parts by mass, more preferably 30 to 150 parts by mass, based on 100 parts by mass of the elastomer.

The amount of the inorganic material added is preferably 0.1 to 500 parts by mass and more preferably 1 to 300 parts by mass based on 100 parts by mass of the elastomer.

(iv) Other Processing Aids

The rubber composition of the present invention may contain other processing aids as long as the function is not impaired such as a vulcanizing agent such as sulfur and zinc oxide, crosslinking agent, vulcanization accelerator, crosslinking accelerator, vulcanization acceleration aid, anti-aging agent, softening agent, various oils, antioxidant, anti-aging agent, filler, and a plastic material.

Examples of the anti-aging agent include compounds such as hindered phenol compounds, aliphatic compounds and aromatic hindered amine compounds, and they are added in an amount of 0.1 to 10 parts by mass, more preferably 1 to 5 parts by mass, based on 100 parts by mass of the elastomer. Examples of the antioxidant include butyl hydroxy toluene (BHT), butyl hydroxy anisole (BHA), and the like. They are preferably added in an amount of 0.1 to 10 parts by mass, more preferably 1 to 5 parts by mass, based on 100 parts by mass of the elastomer.

Examples of a colorant include inorganic pigments such as titanium dioxide, zinc oxide, ultramarine, red iron oxide, lithopone, lead, cadmium, iron, cobalt, aluminum, hydrochloride, and sulfate, azo pigment, copper phthalocyanine pigment, and the like. They are added in an amount from 0.1 to 10 parts by mass, more preferably 1 to 5 parts by mass, based on 100 parts by mass of the elastomer.

Examples of the vulcanizing agent include sulfur-based vulcanizing agents such as powder sulfur, precipitated sulfur, highly dispersible sulfur, surface-treated sulfur, insoluble sulfur, dimorpholin disulfide, and alkylphenol disulfide, and zinc oxide, magnesium oxide, litharge, p-quinone dioxam, p-dibenzoylquinonedioxime, tetrachloro-p-benzoquinone, poly-p-dinitrobenzene, methylenedianiline, phenol resin, brominated alkylphenol resin, chlorinated alkylphenol resin, and the like.

Examples of the vulcanization accelerator include fatty acids such as acetyl acid, propionic acid, butane acid, stearic acid, acrylic acid, and maleic acid; fatty acid zincs such as zinc acetylate, zinc propionate, zinc butanoate, zinc stearate, zinc acrylate, and zinc maleate; and fatty acid zinc, and zinc oxide.

Examples of the vulcanization acceleration aid include thiurams such as tetramethylthiuram disulfide (TMTD), tetraethylthiuram disulfide (TETD), and tetramethylthiuram monosulfide (TMTM); aldehyde/ammonias such as hexamethylenetetramine; guanidines such as diphenylguanidine; thiazoles such as 2-mercaptobenzothiazole (MBT) and dibenzothiazyl disulfide (DM); sulfenamides such as N-cyclohexyl-2-benzothiazyl sulfenamide (CBS) and N-t-butyl-2-benzothiazyl sulfenamide (BBS); and dithiocarbamates such as dimethyl dithiocarbamic acid (ZnPDC).

In the present invention, other processing aids can be used as a rubber composition by kneading with a known rubber kneading machine, for example, a roller, Banbury mixer, kneader, and the like, and vulcanizing under any conditions. The amount of these other processing aids to be added can also be set to a conventional general amount as long as it does not detract from the purpose of the present invention.

(V) Method for Producing Rubber Composition

The method for producing a rubber composition of the present invention comprises a step of kneading the silane compound, the elastomer having a glass transition point of 25° C. or lower, and the inorganic material. The process for producing a rubber composition of the present invention preferably comprises a step of kneading the silane compound, the elastomer having a glass transition point of 25° C. or lower, the inorganic material, and the vulcanization acceleration aid.

The method for producing the rubber composition described above may preferably further comprise a step of kneading the vulcanizing agent. More preferably, the method for producing the rubber composition may further comprise a step of kneading the vulcanizing agent and the vulcanization accelerator.

The total content of the compound represented by formula (1) and the silane compound other than the compound represented by formula (1) in the rubber composition is preferably 0.1 to 30 parts by mass, more preferably 0.3 to 20 parts by mass, further preferably 0.4 to 15 parts by mass, further more preferably 0.7 to 10 parts by mass, particularly preferably 0.7 to 6.9 parts by mass, particularly more preferably 1 to 5.0 parts by mass, and particularly further preferably 1 to 3.4 parts by mass, based on 100 parts by mass of the elastomer. When the rubber composition contains a silane compound other than the compound represented by formula (1), the proportion of the content of the silane compound other than the compound represented by formula (1) to the sum of the content of the compound represented by formula (1) and the content of the silane compound other than the compound represented by formula (1) is preferably 0.1 to 0.9 and more preferably 0.2 to 0.8 on a mass basis.

In each of the above-mentioned steps, the above-mentioned other processing aids may be appropriately blended within a range not impairing the function of the rubber composition.

(vi) Cross-Linked Product of the Rubber Composition of the Present Invention

Using the rubber composition of the present invention, a cross-linked product of the rubber composition can be produced according to conventionally known methods and common general knowledge widely known to those skilled in the art. For example, the rubber composition is extruded, then molded using a molding machine, subsequently heated and pressurized using a vulcanizing machine, thereby forming a cross-link to give a cross-linked product.

(vii) Tire

Using the rubber composition, a tire can be produced by a conventionally known method and common general knowledge widely known to a person skilled in the art. For example, the rubber composition is extruded and then molded using a tire molding machine, subsequently heated and pressurized using a vulcanizing machine, thereby forming a cross-link to give a tire. In one embodiment, the tire of the present invention is a tire comprising the cross-linked product.

By producing a tire using the rubber composition of the present invention, viscoelastic properties of the produced tire can be improved. In addition, tensile properties can be improved.

(2) Sealant Composition

Another preferred embodiment of the composition of the present invention comprises a compound represented by formula (1) above and a sealing polymer (sealing agent). These compositions can improve the adhesion between the sealing agent composition and the inorganic material.

Conventionally, reaction of a silane coupling agent with an elastomer required a substituent with high polarity such as a polysulfide group, mercapto group, epoxy group, and amino group. However, there was a problem that polarity increases as these functional groups are introduced, and in the case of a material with low polarity, affinity is impaired, causing poor dispersibility and mixing. Although not bound to a specific theory, the silane compound of formula (1) above have an allyl hydrogen with high reactivity in its alicyclic olefin moiety and can co-cross-link with polyurethane, etc. The silyl group portion reacts with a silanol group of the silica surface. It is considered that addition of the compound represented by formula (1) above mediates the reaction between the polyurethane and glass or silica, whereby reinforcement properties are exhibited. As a result, a sealant composition containing the compound represented by formula (1) above or an adhesive composition has excellent tensile properties, the sealant composition or the adhesive composition is considered to exhibit excellent adhesion properties.

The content of the compound represented by formula (1) above in the sealant composition of the present invention is preferably 0.1 to 30 parts by mass, more preferably 1 to 20 parts by mass, based on 100 parts by mass of the sealant composition.

The sealing polymer is not particularly limited, and may be a one-part curing type (moisture curing, oxygen curing, drying curing, non-curing type) or a two-part curing type (reaction curing type), and examples thereof include acrylic polymers, acrylic urethane polymers, polyurethane polymers, silicone polymers, modified silicone polymers, polysulfide polymers, SBR polymers, butyl rubber polymers, and oil-based caulking polymers, which preferred among these are the one-part curing type polyurethane polymers, silicon polymers, modified silicon polymers, polysulfide polymers, and butyl rubber polymers. The sealant composition of the present invention may include one or two or more of the above-described sealing polymers.

The weight average molecular weight of the sealing polymer is preferably 300 to 500,000, more preferably 1,000 to 300,000.

The sealant composition of the present invention may contain a silane compound other than the compound represented by formula (1) above.

The sealant composition of the present invention may contain additives such as an antioxidant, anti-aging agent, antistatic agent, thermal stabilizer, ultraviolet absorber, light stabilizer, flame retardant, nucleating agent, clearing agent, processing improver, lubricant, filler, plasticizer, filler, anti-blocking agent, crosslinking agent, dye and pigment, etc., as long as the effect is not impaired.

The material of the adherend is not particularly limited, and examples thereof include metals such as stainless steel, aluminum, copper, and iron; plastics such as nylon, styrol, acryl, vinyl chloride, ABS, FRP, and polycarbonate; rubbers such as natural rubber, synthetic rubber, and silicone rubber; inorganic materials such as concrete, mortar, natural stone, tile, glass, and ceramic; natural materials such as wood, plywood, leather, and thick paper; and polyethylene, polypropylene, fluorine resin, and polyacetal.

(3) Adhesive Composition

In yet another preferred embodiment of the composition of the present invention, the adhesive composition of the present invention comprises a compound represented by formula (1) above and an adhesive (adhesive polymer). By virtue of these compositions, adhesion between the adhesive composition and the inorganic material can be improved.

The content of the compound represented by formula (1) above in the adhesive composition of the present invention is preferably 0.1 to 30 parts by mass and more preferably 1 to 20 parts by mass, based on 100 parts by mass of the adhesive composition.

The adhesive may be of a one-part curing type or a two-part curing type, and may be any of a water dispersion type, solution type, reaction type, solid type, and tape type. In addition, the adhesive may be an organic adhesive or an inorganic adhesive.

Examples of organic adhesives include synthetic adhesives such as vinyl acetate adhesives, vinyl acetate resin emulsion adhesives, vinyl resin adhesives, ethylene-vinyl acetate resin emulsion adhesives, polyvinyl resin acetate solution-based adhesives, ethylene-vinyl acetate resin hot-melt adhesives, epoxy resin adhesives, epoxy resin emulsion adhesives, polyvinyl alcohol adhesives, ethylene-vinyl acetate adhesives, vinyl chloride adhesives, vinyl chloride resin solvent-based adhesives, aqueous polymer-isocyanate adhesives, α-olefin adhesives, acrylic resin adhesives, acrylic resin anaerobic adhesives, acrylic resin emulsion adhesives, acrylic resin adhesive tapes, polyamide adhesives, polyamide resin hot-melt adhesives, polyimide adhesives, cellulose adhesives (ether cellulose, nitrocellulose, etc.), polyvinylpyrrolidone adhesives, polystyrene adhesives, polystyrene resin solvent-based adhesives, cyanoacrylate adhesives, polyvinyl acetal adhesives, urethane resin adhesives, urethane resin solvent-based adhesives, urethane resin emulsion adhesives, polyurethane resin hot-melt adhesives, polyolefin resin hot-melt adhesives, polyvinyl butyral resin adhesives, polyaromatic adhesives, structural acrylic resin adhesives, urea resin adhesives, melamine resin adhesives, phenol resin adhesives, resorcinol adhesives, ester adhesives, chloroprene rubber-based adhesives, nitrile rubber-based adhesives, styrene butadiene rubber adhesives, styrene-butadiene rubber-based latex adhesives, polybenzimidazole adhesives, polymethacrylate resin solution-based adhesives, thermoplastic elastomer adhesives, butyl rubber adhesives, silicone adhesives, modified silicone adhesives, silylated urethane adhesives, urethane rubber adhesives, polysulfite adhesives, acrylic rubber adhesives; natural adhesives such as starch adhesives, natural rubber adhesives, natural rubber latex adhesives, asphalt, cement, gum arabic, Japanese lacquer, casein, soybean protein, and pine tar; and reactive hot-melt adhesives.

Examples of inorganic adhesives include silica adhesives, solder, water glass (soda silicate, sodium silicate), cement (Portland cement, cement plaster, gypsum, magnesium cement, litharge cement, dental cement, etc.) and ceramics.

Among the adhesives above, when the material of the adherend is thick paper or wood, cellulose adhesives, vinyl acetate adhesives, vinyl acetate resin emulsion adhesives, starch adhesives, polyvinyl alcohol adhesives and polyvinyl pyrrolidone adhesives are preferable. When the material of the adherend is plastic, vinyl adhesives, styrene resin adhesives, epoxy resin adhesives and cyanoacrylate adhesives are preferable. When the material of the adherend is rubber or leather, chloroprene rubber adhesives, nitrile rubber adhesives and styrene butadiene rubber adhesives are preferable. When the material of the adherend is metal, ceramic, or concrete, epoxy resin adhesives, silicone adhesives and vinyl acetate adhesives are preferable. From the viewpoint of compatibility and stability, epoxy adhesives are preferable. The adhesive composition of the present invention may include one or two or more of the above-described adhesives.

The adhesive preferably has a weight average molecular weight of 300 to 500,000, more preferably 1,000 to 300,000.

The adhesive composition of the present invention may contain a silane compound other than the compound represented by formula (1) above.

The adhesive composition of the present invention may contain additives such as an antioxidant, anti-aging agent, antistatic agent, thermal stabilizer, ultraviolet absorber, light stabilizer, flame retardant, nucleating agent, clearing agent, processing improver, lubricant, etc., as long as the effect is not impaired.

4. Surface Treatment Method for Inorganic Material

The compound represented by formula (1) above can be used for surface treatment of an inorganic material. Examples of the surface treatment method include (1) a dry method, (2) a wet method, and (3) an integral blend method.

The dry method is suitable for surface treatment of a large amount of inorganic material by spraying or blowing in a vapor state of a silane compound while stirring the inorganic material well.

The dry process also includes a heat treatment step as necessary. This method is excellent in workability because a diluent is not used.

The wet method is performed by dispersing an inorganic material in a solvent, diluting a silane compound in water or an organic solvent, and adding in a slurry state while vigorously stirring. According to this method, a uniform surface treatment can be achieved.

The integral blending method is performed by adding a silane compound directly to an organic resin while mixing the inorganic material with the organic resin. This method is widely used in industry because of its simplicity. When the silane compound acts on the inorganic material in this method, there are three steps to go through, of transfer of the silane compound to the filler surface, hydrolysis, and condensation. Therefore, in this method, it is necessary to pay attention to the reactivity of the silane compound with the organic resin.

The addition amount of the silane compound can be generally calculated by the following formula.

$$\text{Addition amount (g)} = [\text{mass of inorganic material (g)} \times \text{specific surface area of inorganic material } (m^2/g)] / \text{minimum coating area of silane compound } (m^2/g).$$

Note that, the minimum coating area of the silane compound can be calculated from the following formula.

$$\text{Minimum coating area } (m^2/g) = 6.02 \times 10^{23} \times 13 \times 10^{20} / \text{molar weight of silane compound } (m^2/g)$$

Note that, when the specific surface area of the inorganic material is unknown, the formula is calculated by finding out the amount for obtaining the optimal result from treating with 1 mass % of the silane compound and appropriately increasing/decreasing the amount as needed.

Examples of the inorganic material include, E-glass (specific surface area 0.1 to 0.12 $m^2/g$), mica (specific surface area 0.2 to 03 $m^2/g$), quartz powder (specific surface area 10 to 2.0 $m^2/g$), calcium silicate (specific surface area 1.0 to 3.0 $m^2/g$), magnetic powder (specific surface area 1.0 to 3.0 $m^2/g$), calcium carbonate (specific surface area 2.0 to 5.0 $m^2/g$), clay (specific surface area 6.0 to 15.0 $m^2/g$), kaolin (specific surface area 7.0 to 30.0 $m^2/g$), talc (specific surface area 830 to 20.0 m²/g), synthesized silica (specific surface area 200.0 to 300.0 m²/g), etc.

5. Others

The compound represented by formula (1) above can be applied as power train related products, to automobile related products such as hybrid/electric vehicle products, diesel engine related products, starters, alternators, engine cooling products, and drive system products.

More specifically, for example:

(1) any parts of a tire such as tire tread, carcass, sidewall, inner liner, under tread, belt, etc.;

(2) exterior radiator grill, side molding, garnish (pillar, rear, cowl top), aero parts (air dam, spoiler), wheel cover, weather strip, cow belt grill, air outlet louver, air scoop, hood bulge, ventilation opening parts, anti-contact parts (over fender, side seal panel, molding (window, hood, door belt)), marks; interior window frame parts such as door, light, wiper weather strips, glass run, glass run channel, etc.;

(3) air duct hose, radiator hose, brake hose;

(4) lubricating oil system parts such as crankshaft seal, valve stem seal, head cover gasket, A/T oil cooler hose, mission oil seal, P/S hose, P/S oil seal, etc.;

(5) fuel system parts such as fuel hose, emission control hose, inlet filler hose, diaphragms, etc. and anti-vibration parts such as engine mount, in-tank pump mount, etc.;

(6) boots such as CVJ boots, rack & pinion boots, etc.;

(7) air-conditioning parts such as A/C hose, A/C seal, etc.;

(8) belt parts such as timing belt, auxiliary belt, etc.;

(9) sealers such as wind shield sealer, vinyl plastizol sealer, anaerobe sealer, body sealer, spot weld sealer, etc.

Further, the compound can be applied to air conditioning-related products such as air conditionings for passenger automobiles, air conditioning for buses, refrigerators and the like. Further, it can be applied to body-related products such as combination meters, head-up displays, body products, relays and the like. It can also be applied to running safety products such as inter-vehicular distance cruise control/pre-crash safety/lane keeping assist system, steering system, lamp control system, air bag related sensor & ECU, brake control and the like. It can also be applied to information and communication products such as car navigation system, ETC, data communication module, CAN-Gateway ECU and the like. Further, it can be applied to automobile parts, hose, belt, sheet, anti-vibration rubber, roller, lining, rubber lining cloth, sealant, gloves, fender material, medical rubber (syringe gasket, tube, catheter), gasket (for home electronics and architecture), asphalt modifier, hot-melt adhesive, boots, grips, toys, shoes, sandals, keypads, gears elastomers such as pet bottle cap liner, rubber shoes, belt, hose, anti-vibration rubber, rubber roll, printing blanket, rubber/resin lining, rubber plate (rubber sheet), conductive rubber product, sealant, sheet water-resistant, urethane coat-film water-resistant, water-shielding sheet for civil engineering, sealing device, extruded rubber product, sponge rubber product, fender material, gasket for architecture, seismic isolation rubber, pavement rubber block, non-metallic chain, medical/sanitary rubber product, rubber lining cloth product, rubber/vinyl gloves, and the like. It can also be applied to coating agents such as anti-fingerprint coating for a touch panel, lubricating coating for metal surface, primer for metal coating and the like.

By applying the compound represented by formula (1) above to a coating or a coating agent, it is possible to improve adhesion, weather resistance, durability, abrasion resistance and chemical resistance, as well as filler and pigment dispersibility.

In addition, by applying the compound represented by formula (1) above to a glass fiber reinforced resin, it is possible to improve impact strength, water resistance, electrical insulation, and long-term stability in a wet environment. In addition, it is possible to improve strength retention capability and elastic force of a heat insulating mat. Further, it is possible to prevent frays in glass fiber bundles.

By applying the compound represented by the above formula (1) to a printing ink, it is possible to improve adhesiveness and releasing property as well as wettability.

By applying the compound represented by formula (1) above to a thermoplastic resin, dispersibility of a filler and a pigment can be improved, as well as crosslinking properties of an olefin resin and the like. In addition, one can also expect high functionality and flame retardancy are provided.

When the compound represented by formula (1) above is added to an organic material or an organic solvent, the addition amount can be generally 0.2 to 2.0 mass %.

When the compound represented by formula (1) above is used as a primer, it is preferable to first prepare a 1 to 2% solution of an alcohol-based solvent, for example, isopropyl alcohol (IPA), and apply the solution to an adherend. After that, it is preferable to volatilize the IPA and apply the desired adhesive or coating material.

EXAMPLES

Herein under, the present invention will be described in more details with reference to the Examples; however, the present invention shall not be limited to these Examples.

1. Example 1: Preparation of Silane Compounds 1 to 5 and Preparation and Evaluation of Rubber Composition and Rubber Sheet Containing Silane Compounds 1 to 5 and Emulsion-Polymerized Styrene Butadiene Rubber (1)-1: Synthesis of Silane Compound 1 (C-80) (Part 1)

A 100 mL two-necked flask was equipped with a ball plug and a three-way cock connected to a vacuum line, and a stirrer bar was placed in the flask, and by using a vacuum line, the system was subjected to repetitive degassing-nitrogen replacement for 10 times while heating, thereby bringing the flask into a normal pressure nitrogen atmosphere. Into the flask was added 38.65 g (0.317 mol) of 5-vinyl-2-norbornene (VNB), and then 71.93 g of toluene solvent was injected using a syringe. Thereafter, the mixture was stirred with a stirrer to dissolve. Next, 68.6 g of 3-mercaptopropyltriethoxysilane was injected using a syringe. Finally, 0.4725 g (2.88 mmol) of azobisisobutyronitrile was added while flowing nitrogen, and then nitrogen bubbling was performed for 20 minutes. The flask was immersed in an oil bath, and the temperature of the bath was gradually increased to 70° C. to allow the reaction to proceed. 8 hours after the temperature reached 70° C., the oil bath was removed from the flask, and the flask was allowed to stand at room temperature (25° C.). Next, toluene and unreacted 5-vinyl-2-norbornene (VNB) were distilled off under reduced pressure, and 98.64 g (95% yield) of the target silane-modified 5-vinyl-2-norbornene (VNB-SSi) (C-80) was obtained. The measurement result of ¹H-NMR of the obtained compound is shown in FIG. 1. The measurement results of $^1$H-NMR and $^{13}$C-NMR show that the introduction ratio of silane is 100% and that the double bond of the norbornene ring disappeared.

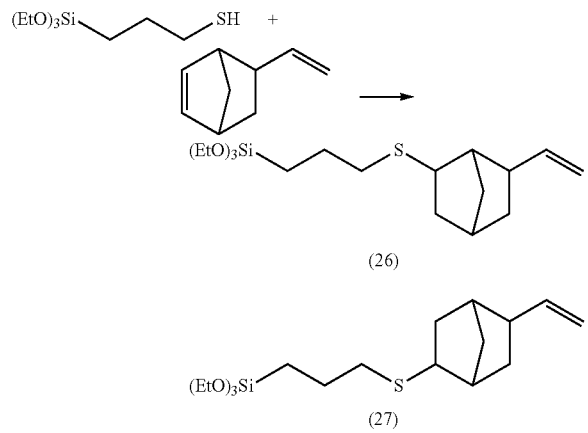

(1)-2: Synthesis of Silane Compound 1 (C-105) (Part 2)

A 50 mL two-necked flask was equipped with a ball plug and a three-way cock connected to a vacuum line, and a stirrer bar was placed in the flask, and by using a vacuum line, the system was subjected to repetitive degassing-nitrogen replacement for 10 times while heating, thereby bringing the flask into a normal pressure nitrogen atmosphere. Into the flask was added 5.50 g (0.045 mol) of 5-vinyl-2-norbornene (VNB), and then 2.367 g of ethanol solvent was injected using a syringe. Thereafter, the mixture was stirred with a stirrer to dissolve. Next, 10.73 g (0.045 mol) of 3-mercaptopropyltriethoxysilane was injected using a syringe, and then nitrogen bubbling was performed for 20 minutes. To another container, 0.0370 g (0.23 mmol) of azobisisobutyronitrile was introduced, and then 2.071 g of ethanol solvent was added to prepare an ethanol solution of azobisisobutyronitrile. The flask was immersed in an oil bath, and the temperature of the bath was gradually increased to 70° C. to achieve the reaction temperature, and then the prepared azobisisobutyronitrile solution was injected in one thirds of the entire amount every two hours using a syringe for reaction. After 2 hours from the 3$^{rd}$ injection, the oil bath was removed from the flask, and the flask was allowed to stand until it reached room temperature (25° C.). Next, ethanol and unreacted 5-vinyl-2-norbornene (VNB) were distilled off under reduced pressure, and 15.58 g (96% yield) of the target silane-modified 5-vinyl-2-norbornene (VNB-SSi) (C-105) was obtained.

(1)-3: Synthesis of Silane Compound 1 (C-109) (Part 3)

A 50 mL two-necked flask was equipped with a ball plug and a three-way cock connected to a vacuum line, and a stirrer bar was placed in the flask, and by using a vacuum line, the system was subjected to repetitive degassing-nitrogen replacement for 10 times while heating, thereby bringing the flask into a normal pressure nitrogen atmosphere. Into the flask was injected 28.61 g (0.12 mol) of 3-mercaptopropyltriethoxysilane using a syringe, and then nitrogen bubbling was performed for 20 minutes. To another container, 0.0197 g (0.12 mmol) of azobisisobutyronitrile was introduced, and then 14.65 g (0.12 mol) of 5-vinyl-2-norbornene was added to prepare a mixture solution of azoisobutyronitrile and VNB. Next, the flask was immersed in an oil bath, and the temperature of the bath was gradually increased to 50° C. to achieve the reaction temperature, and then the prepared mixed solution of azoisobutyronitrile and VNB was injected sequentially in a quantity of about 0.1 g in 1 minute using a syringe for reaction. After 1 hour from the completion of injection, the bath temperature was increased to 70° C. for further reaction. After 1 hour from the temperature increase, the oil bath was removed from the flask, and the flask was allowed to stand until it reached room temperature (25° C.), and thereafter, 42.39 g (98% yield) of the target silane-modified 5-vinyl-2-norbornene (VNB-SSi) (C-109) was obtained.

Detection of Stereoisomers of Silane Compound 1 (C-80)

Figure 2:
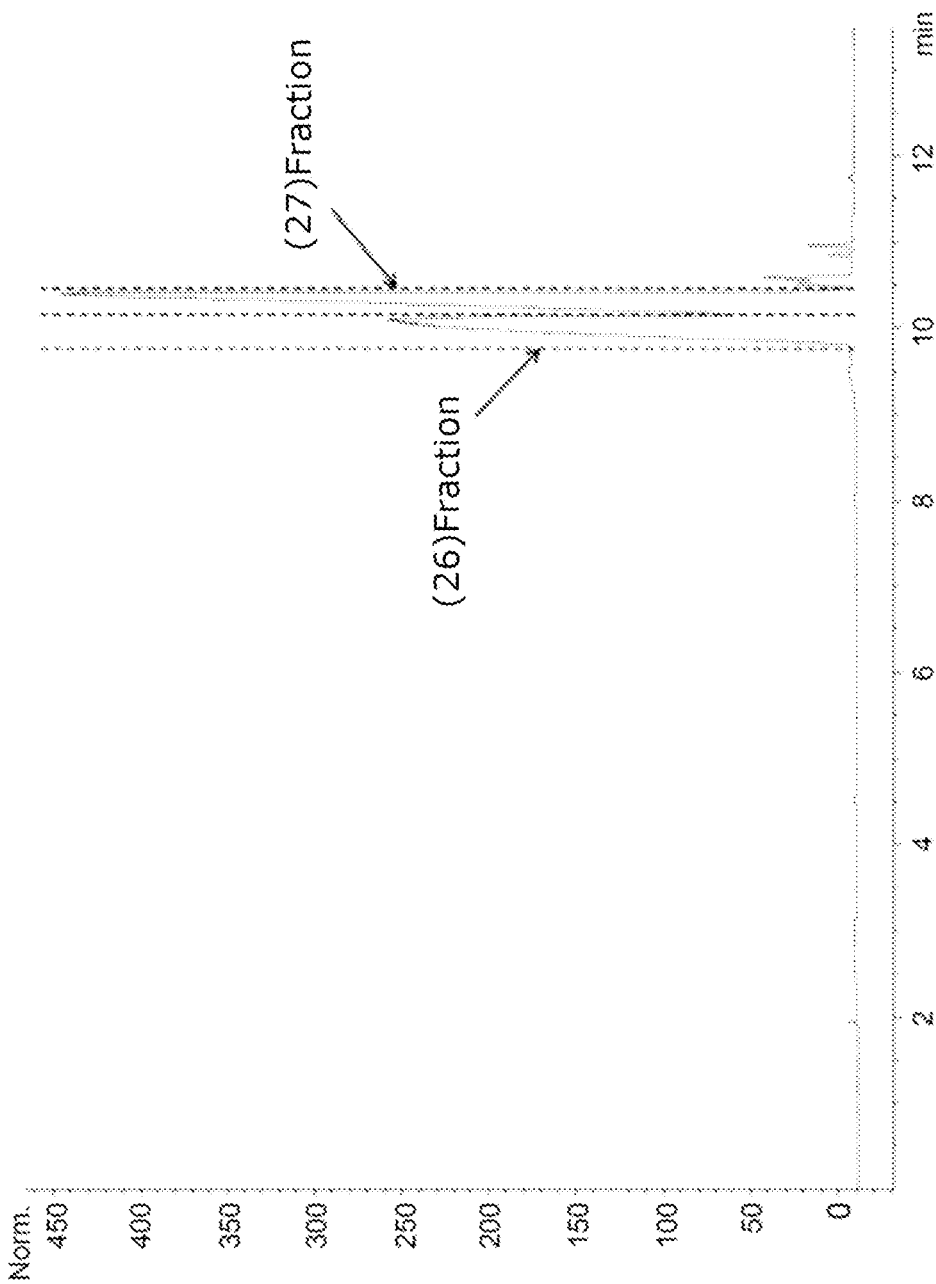
FIG. 2 is a chromatogram showing that the Silane Compound 1 (C-80) synthesized in Example 1 (1)-1 was fractionated into fractions (26) and (27) by gas chromatography, and each fraction was collected.
Figure 3:
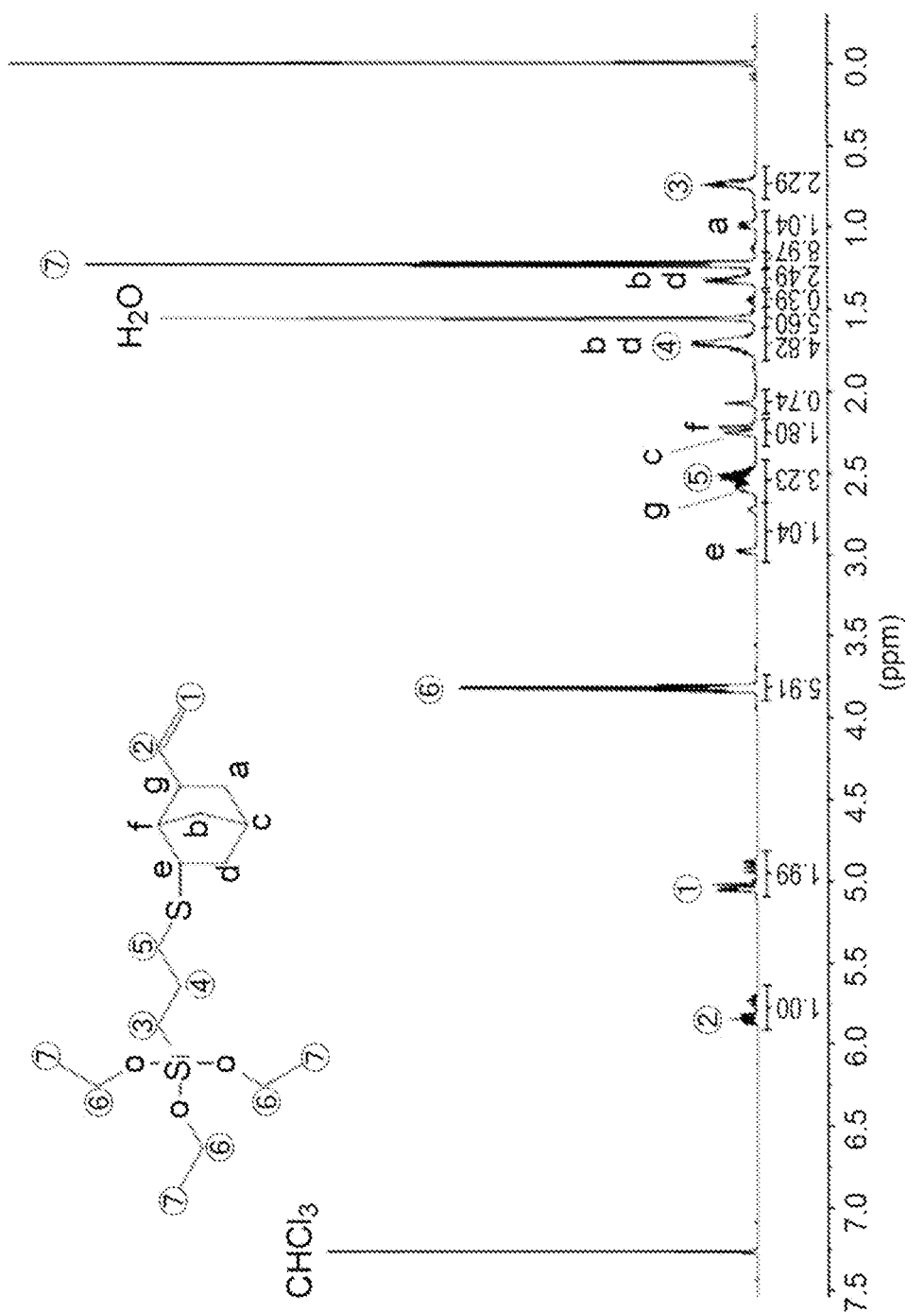
FIG. 3 is a $^1$H-NMR chart showing the fraction (26) of the Silane Compound 1 (C-80) synthesized in Example 1 (1)-1. Peaks indicated by a to g and circled integers 1 to 7 represent peaks of protons bonded to each carbon atom (shown in FIG. 3) of the compound of formula (26).
Figure 4:
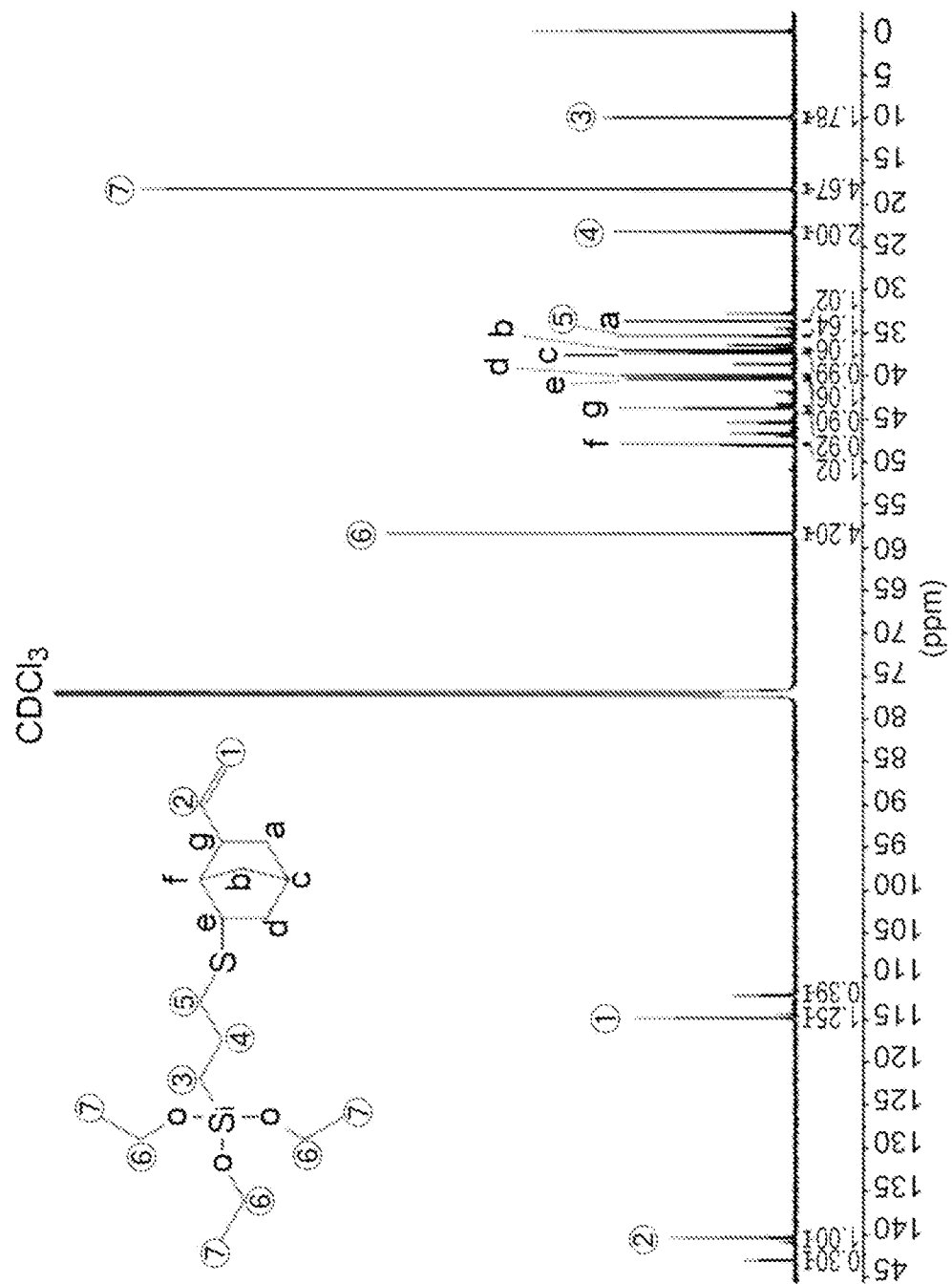
FIG. 4 shows a $^{13}$C-NMR chart of the (26) fraction of Silane Compound 1 (C-80) synthesized in Example 1 (1)-1. Peaks indicated by a to g and circled integers 1 to 7 represent peaks of each carbon atom (shown in FIG. 4) of the compound represented by formula (26).
Figure 5:
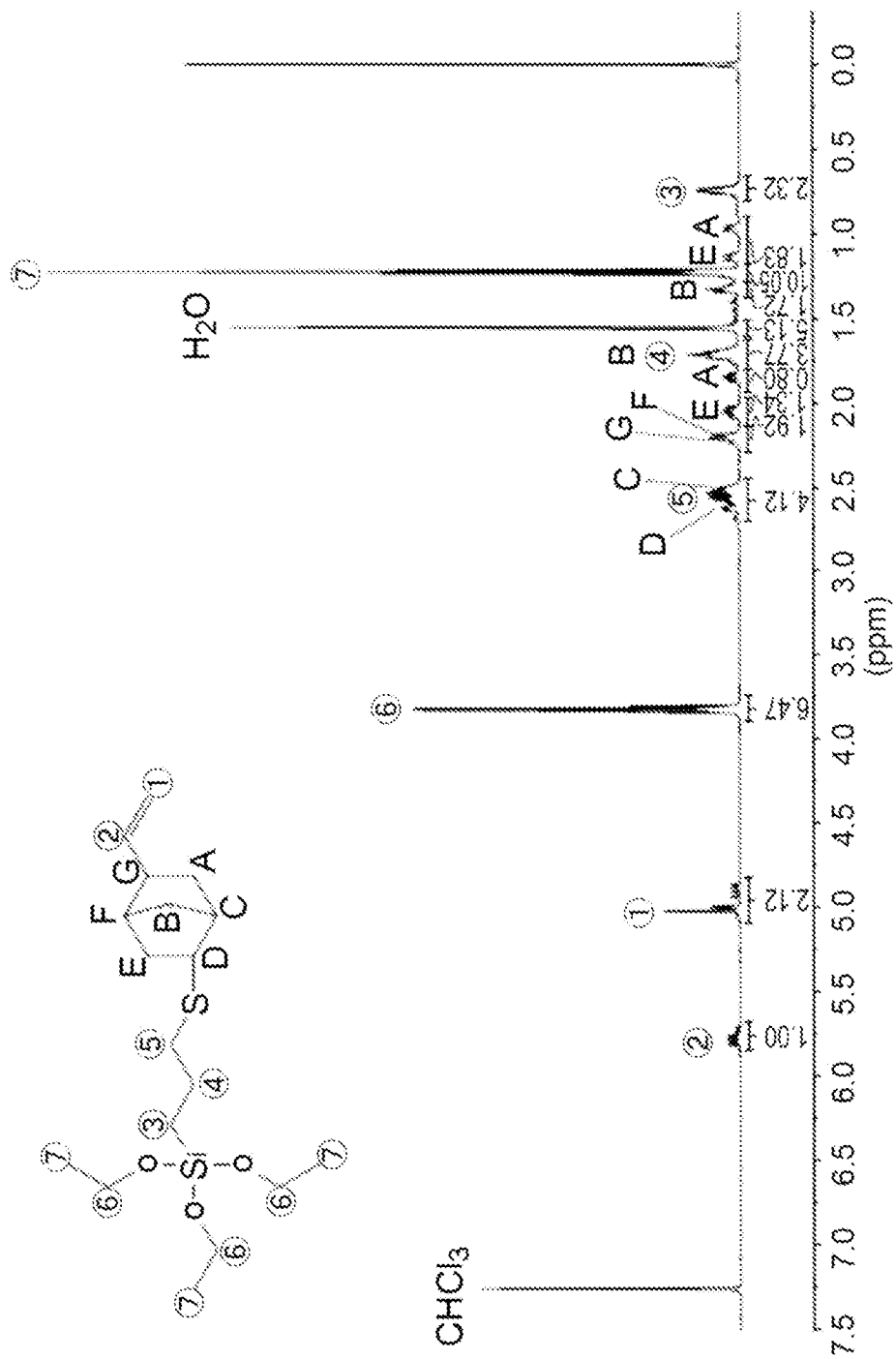
FIG. 5 shows a $^1$H-NMR chart of the (27) fraction of the Silane Compound 1 (C-80) synthesized in Example 1 (1)-1. Peaks indicated by A to G and circled integers 1 to 7 represent peaks of protons bonded to each carbon atom (shown in FIG. 5) of the compound of formula (27).
Figure 6:
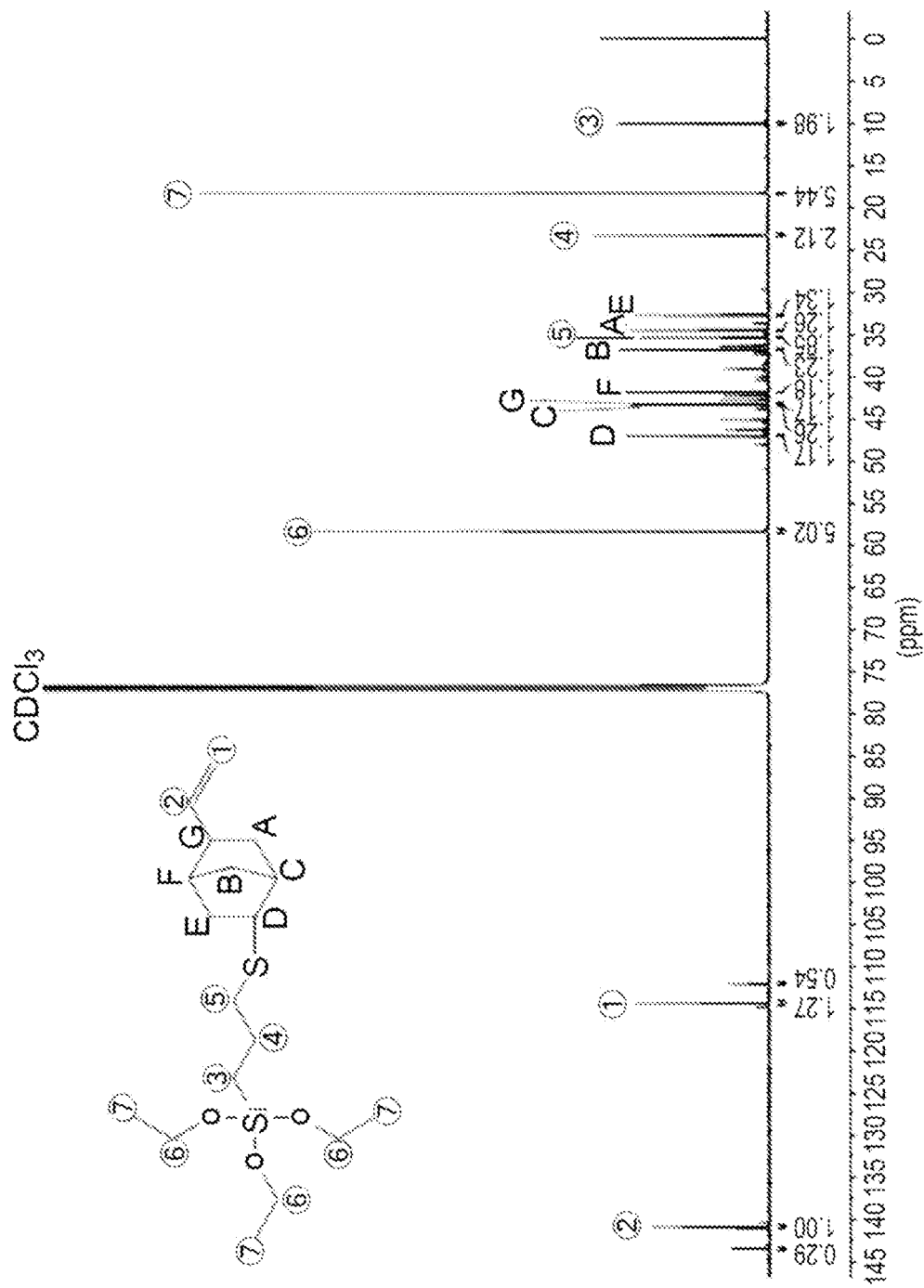
FIG. 6 shows a $^{13}$C-NMR chart of the (27) fraction of the Silane Compound 1 (C-80) synthesized in Example 1 (1)-1. Peaks indicated by A to G and circled integers 1 to 7 represent peaks of protons bonded to each carbon atom (shown in FIG. 6) of the compound of formula (27).
Figure 7:
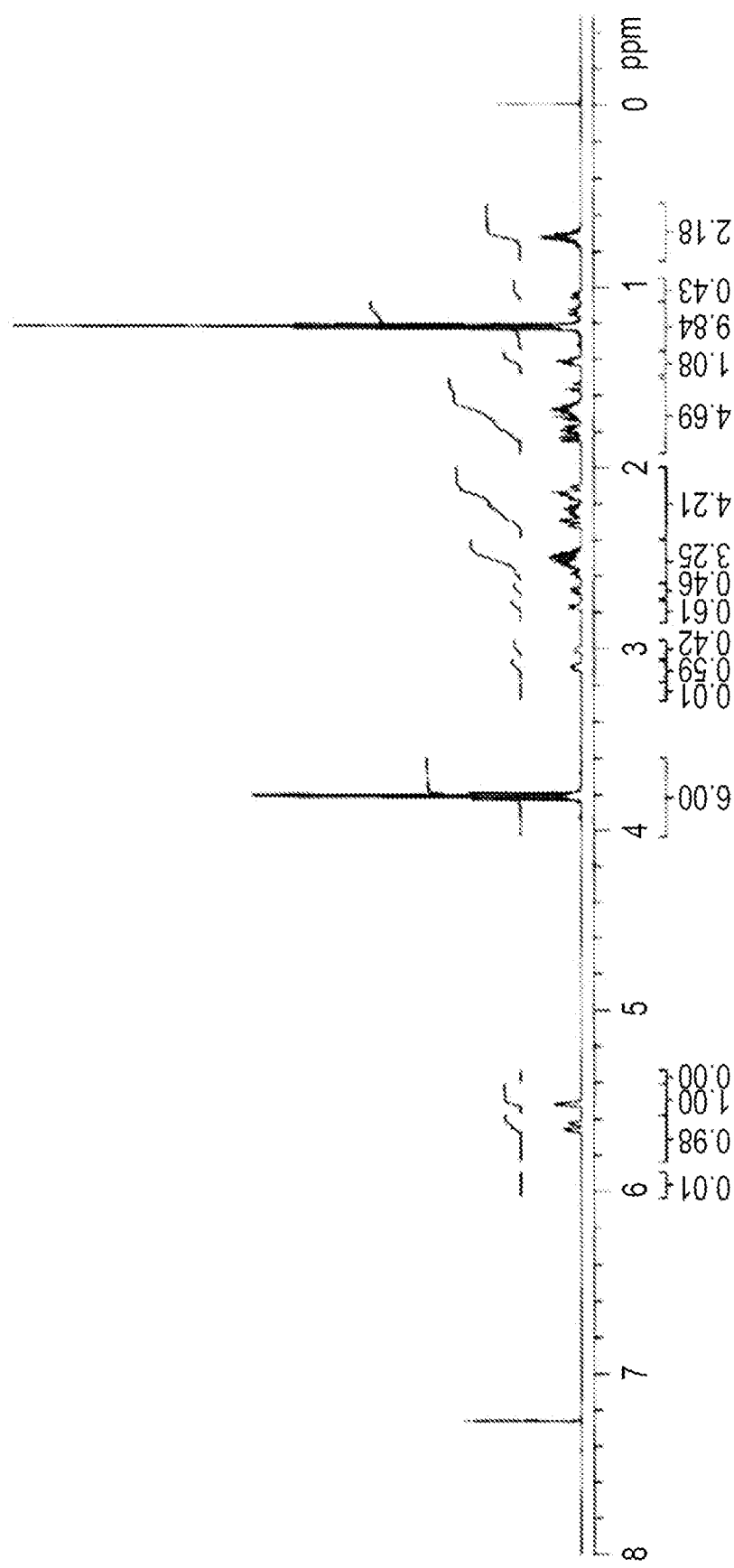
FIG. 7 shows a $^1$H-NMR chart of Silane Compound 4 synthesized in Example 1 (4).

Silane Compound 1 obtained in the above-described Example (1)-1: Synthesis of Silane Compound 1 (C-80) (Part 1) was fractionated by gas chromatography into a fraction containing a large amount of the compound represented by formula (26) ("fraction (26)") and a fraction containing a large amount of the compound represented by formula (27) ("fraction (27)"), and separated (FIG. 2). The result of $^1$H-NMR measurement of fraction (26) is shown in FIG. 3, and the result of $^{13}$C-NMR measurement of fraction (26) is shown in FIG. 4. The result of $^1$H-NMR measurement of the fraction (27) is shown in FIG. 5, and the result of $^{13}$C-NMR measurement of the fraction (27) is shown in FIG. 6. In the chemical structures represented by formulae (26) and (27), it was found that the peak of the proton bonded to the carbon atom directly bonded to the norbornene ring of the double bond of the vinyl group (the carbon atom indicated by a circled integer 2 in FIG. 3 or 5) was split. From this data, it was inferred that there are two stereoisomers: an isomer (syn isomer) in which the vinyl group bonded to the norbornene ring extends forward toward the paper face as like a cross-linked structure of the norbornene ring, and an isomer (anti isomer) in which the vinyl group bonded to the norbornene ring extends backward toward the paper face opposite to the cross-linked structure of the norbornene ring. Similarly, it was inferred that there are two stereoisomers: an isomer (syn isomer) in which the sulfur atom bonded to the norbornene ring extends forward toward the paper face as like a crosslinked structure of the norbornene ring, and an isomer (anti isomer) in which the sulfur atom bonded to the norbornene ring extends backward toward the paper face opposite to the crosslinked structure of the norbornene ring. From the above, the silane compound 1 (C-80) thus obtained is inferred to be a mixture of 8 stereoisomers represented by the following formulae.

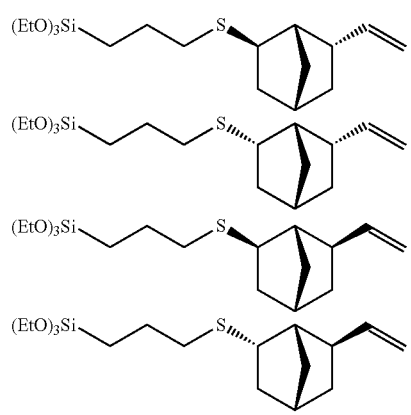

-continued

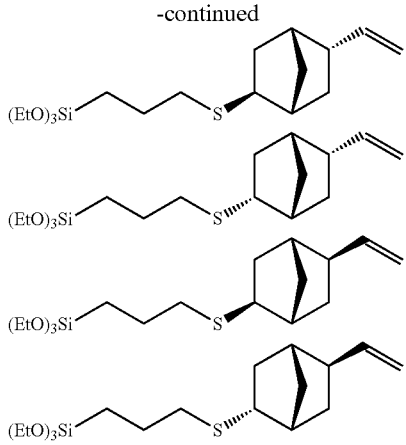

(2) Synthesis of Silane Compound 2

A silane compound was synthesized in the same manner as in Example 1(1)-1, except that 3-mercaptopropyltriethoxysilane was changed to 80.76 g (0.288 mol) of 6-mercaptohexyltriethoxysilane. $^1$H-NMR measurement confirmed that the introduction rate of silane was 100% and the double bond group of the norbornene ring had disappeared.

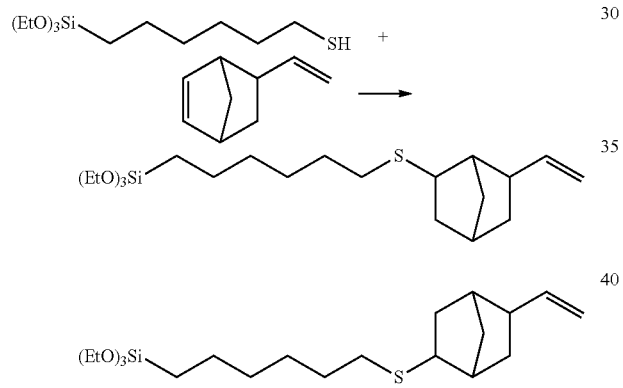

(3) Synthesis of Silane Compound 3

A 100 mL two-necked flask was equipped with a ball plug and a three-way cock connected to a vacuum line, and a stirrer bar was placed in the flask, and by using a vacuum line, the system was subjected to repetitive degassing-nitrogen replacement for 10 times while heating with a dryer, thereby bringing the flask into a normal pressure nitrogen atmosphere. Into the flask was introduced 6.73 g (0.0551 mol) of 5-ethylidene-2-norbornene (ENB) and subsequently, 4.33 g of toluene solvent was injected using a syringe. Then, the mixture was stirred with a stirrer to dissolve. Next, 11.9 g (0.0498 mol) of 3-mercaptopropyl triethoxysilane was injected using a syringe. Finally, 0.123 g (0.746 mmol) of azobisisobutyronitrile was added while nitrogen flow, and then nitrogen bubbling was performed for 20 minutes. The flask was immersed in an oil bath, and the temperature of the bath was gradually increased to 70° C. to conduct reaction. After 6 hours from reaching 70° C., the oil bath was removed from the flask, and the flask was allowed to stand until it reached room temperature. Next, toluene and unreacted 5-ethylidene-2-norbornene (ENB) were distilled off with reduced pressure to obtain 17.1 g (95% yield) of the target silane-modified 5-ethylidene-2-norbornene (ENB-SSi). From the measurement of $^1$H-NMR and $^{13}$C-NMR, it was confirmed that the introduction rate of silane was 100% and the double bond of the norbornene ring had disappeared.

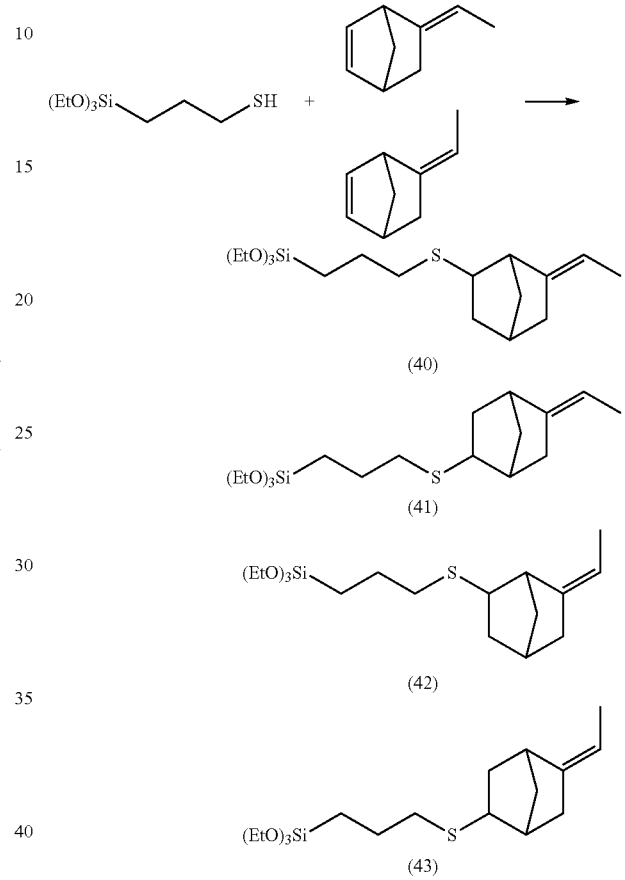

The Silane Compound 3 as obtained is assumed to be a mixture of the eight isomers represented by the following formulae.

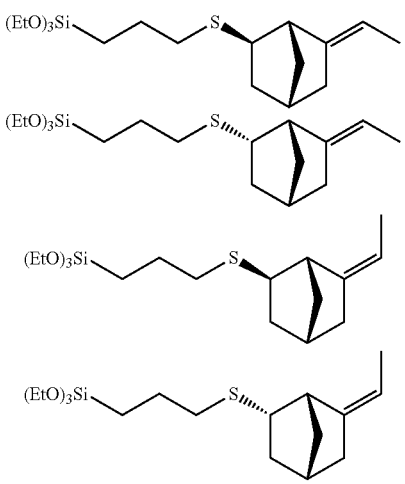

-continued

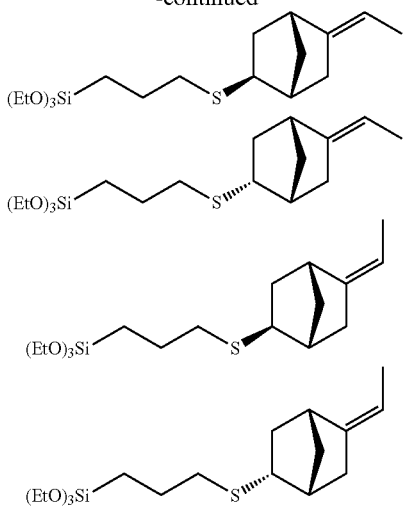

(4) Synthesis of Silane Compound 4

A 100 mL two-necked flask was equipped with a ball plug and a three-way cock connected to a vacuum line, and a stirrer bar was placed in the flask, and by using a vacuum line, the system was subjected to repetitive degassing-nitrogen replacement for 10 times while heating with a dryer, thereby bringing the flask into a normal pressure nitrogen atmosphere. Into the flask was introduced 6.62 g (0.0501 mol) of dicyclopentadiene (DCPD) and subsequently, 4.33 g of toluene solvent was injected using a syringe. Then, the mixture was stirred with a stirrer to dissolve. Next, 11.9 g (0.0500 mol) of 3-mercaptopropyl triethoxysilane was injected using a syringe. Finally, 0.125 g (0.761 mmol) of azobisisobutyronitrile was added while nitrogen flow, and then nitrogen bubbling was performed for 20 minutes. The flask was immersed in an oil bath, and the temperature of the bath was gradually increased to 70° C. to conduct reaction. After 6 hours from reaching 70° C., the oil bath was removed from the flask, and the flask was allowed to stand until it reached room temperature. Next, toluene and unreacted dicyclopentadiene (DCPD) were distilled off with reduced pressure to obtain 17.6 g (95% yield) of the target silane-modified dicyclopentadiene (DCPD-SSi). Measurement result of $^1$H-NMR of the obtained compound is shown in FIG. 6. Measurement of $^1$H-NMR and $^{13}$C-NMR confirmed that the introduction rate of silane was 100% and the double bond of the norbornene ring had disappeared.

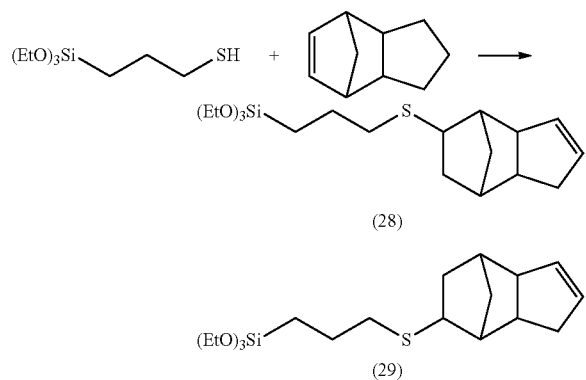

The Silane Compound 4 as obtained is assumed to be a mixture of the eight isomers represented by the following formulae.

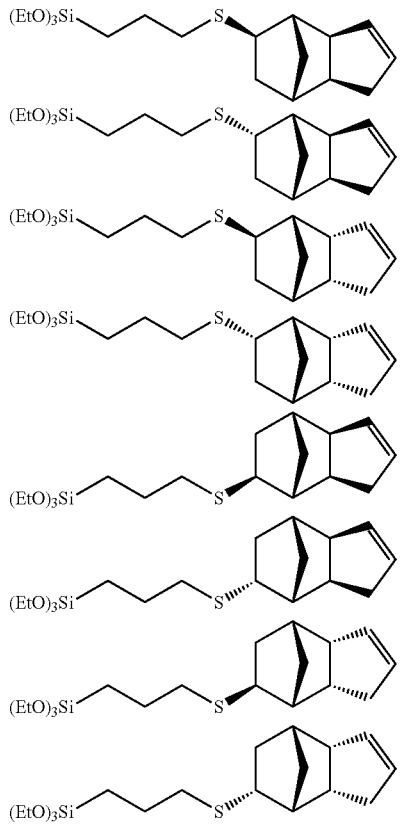

(5) Synthesis of Silane Compound 5

A 100 mL two-necked flask was equipped with a ball plug and a three-way cock connected to a vacuum line, and a stirrer bar was placed in the flask, and by using a vacuum line, the system was subjected to repetitive degassing-nitrogen replacement for 10 times while heating with a dryer, thereby bringing the flask into a normal pressure nitrogen atmosphere. Into the flask was introduced 5.73 g (0.0308 mol) of vinyl dimethanooctahydronaphthalene (VDMON) and subsequently, 2.68 g of ethanol solvent was injected using a syringe. Then, the mixture was stirred with a stirrer to dissolve. Next, 7.34 g (0.0308 mol) of 3-mercaptopropyl triethoxysilane was injected using a syringe. Finally, 0.077 g (0.468 mmol) of azobisisobutyronitrile was added while nitrogen flow, and then nitrogen bubbling was performed for 20 minutes. The flask was immersed in an oil bath, and the temperature of the bath was gradually increased to 70° C. to conduct reaction. After 6 hours from reaching 70° C., the oil bath was removed from the flask, and the flask was allowed to stand until it reached room temperature. Next, ethanol was distilled off with reduced pressure to obtain 12.55 g (96% yield) of the target silane-modified VDMON (VDMON-SSi). From the measurement of $^1$H-NMR and $^{13}$C-NMR, it was confirmed that the introduction rate of silane was 100% and the double bond of the norbornene ring had disappeared.

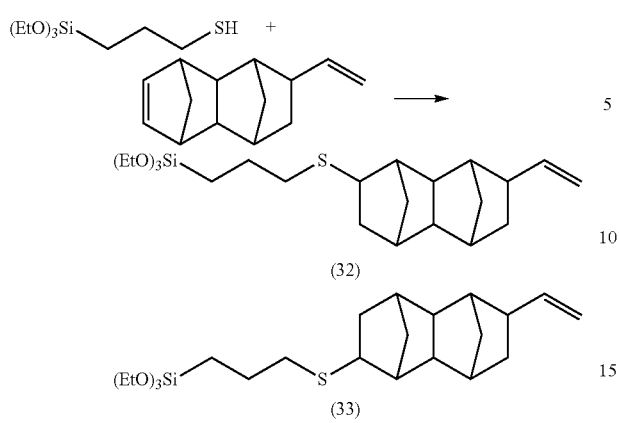

(32)

(33)

The Silane Compound 5 as obtained is assumed to be a mixture of a plurality of isomers including the 16 isomers represented by at least the following formulae.

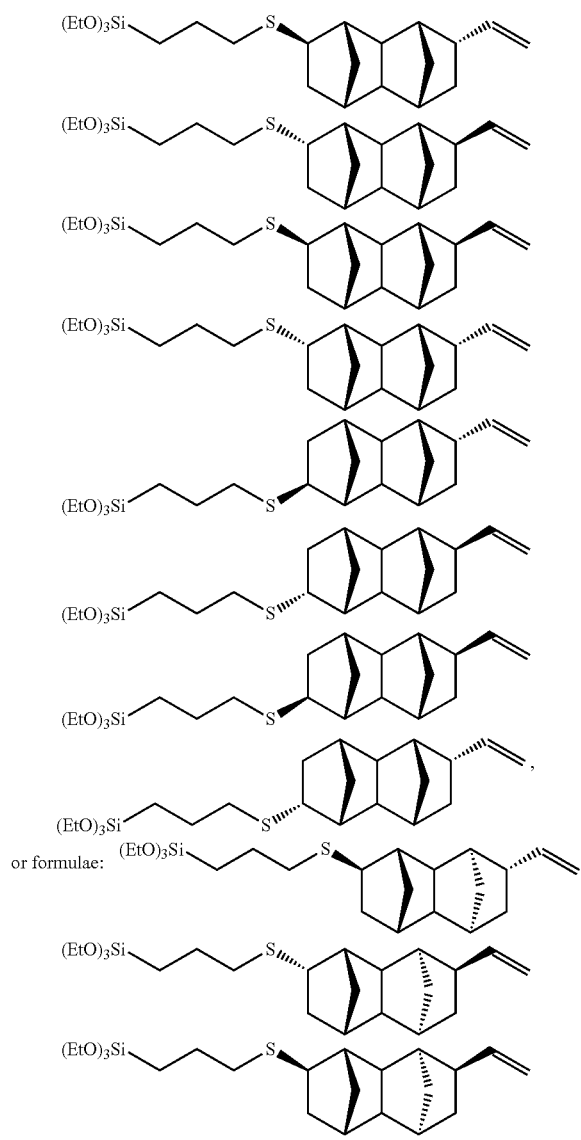

or formulae:

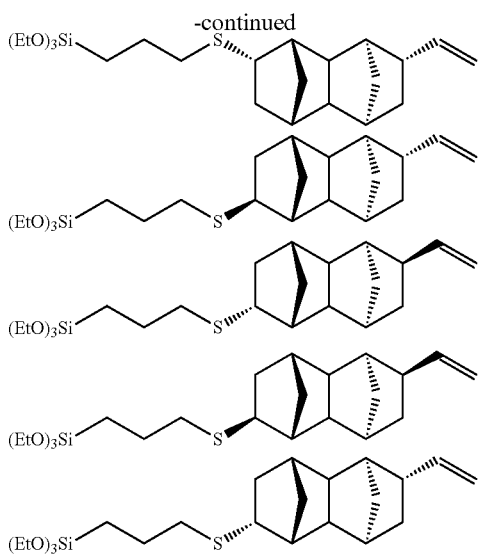

(6) Synthesis of Organic Silane 3 Disclosed in Japanese Patent Application Laid-Open Publication No. 2014-177432 (Comparative Example)

Organic silane 3 was synthesized by a method disclosed in Japanese Patent Application Laid-Open Publication No. 2014-177432, paragraphs 0052 to 0053. It was confirmed that the obtained compound was the Organic silane 3 as disclosed in Japanese Patent Application Laid-Open Publication No. 2014-177432 by comparing the measurement result of $^1$H-NMR with the NMR results of paragraphs 0055 and 0056 of Japanese Patent Application Laid-Open Publication No. 2014-177432.

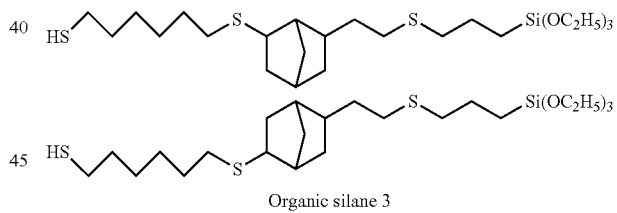

Organic silane 3

(7) Example 1-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Emulsified polymerization styrene butadiene rubber (SBR: manufactured by ZEON Corporation., 1502) (24% styrene, 16% vinyl, 11% Cis) (Tg=−52° C.)
  100 parts by mass
Silane compound 1 (C-80) (Example 1(1)-1)
  0.8 parts by mass
Another silane compound (product name: Si69, manufactured by Evonik Corporation)
  2.4 parts by mass Silica AQ (product name: Nip Seal AQ, manufactured by Tosoh Corporation)
  40 parts by mass
Zinc oxide No. 3 (product name: Ginrei R, manufactured by Toho Zinc Co., Ltd.)
  3 parts by mass
Stearic acid (product name: Stearic acid 300, manufactured by New Japan Chemical Co., Ltd.)
  1 part by mass
Anti-aging agent (product name: NOCRAC 6C, manufactured by Ouchi Shinko Chemical Industrial Co., Ltd.)
  1 part by mass
Sulfur (oil treated sulfur, manufactured by Hosoi Chemical Industry Co., Ltd.)
  2 parts by mass
Vulcanization accelerator (product name NOCCELER CZ manufactured by Ouchi Shinko Chemical Industrial Co., Ltd,)
  1 part by mass
Vulcanization accelerator (product name: NOCCELER D manufactured by Ouchi Shinko Chemical Industrial Co., Ltd.)
  0.5 part by mass (8) Example 1-2

A rubber composition and a rubber sheet were obtained in the same manner as in Example 1-1 except that the amount of the Silane Compound 1 (C-80) added was 1.6 parts by mass and the amount of the other silane compound (Si69) added was 1.6 parts by mass.

(9) Example 1-3

A rubber composition and a rubber sheet were obtained in the same manner as in Example 1-1, except that no other silane compound (Si69) was contained and the amount of Silane Compound 1 (C-80) added was 3.2 parts by mass.

(10) Example 1-4

A rubber composition and a rubber sheet were obtained in the same manner as in Example 1-1, except that neither the Silane Compound 1 (C-80) nor the other silane compound (Si69) was contained, and the amount of the Silane Compound 2 synthesized in Example 1 (2) added was set to 3.2 parts by mass.

(11) Example 1-5

A rubber composition and a rubber sheet were obtained in the same manner as in Example 1-1, except that neither the Silane Compound 1 (C-80) nor the other silane compound (Si69) was contained, and the amount of the Silane Compound 3 synthesized in Example 1 (3) added was set to 3.2 parts by mass.

(12) Example 1-6

A rubber composition and a rubber sheet were obtained in the same manner as in Example 1-1, except that neither the Silane Compound 1 (C-80) nor the other silane compound (Si69) was contained, and the amount of the Silane compound 4 synthesized in Example 1 (4) added was set to 3.2 parts by mass.

(13) Example 1-7

A rubber composition and a rubber sheet were obtained in the same manner as in Example 1-1, except that neither the Silane Compound 1 (C-80) nor the other silane compound (Si69) was contained, and the amount of the Silane compound 5 synthesized in Example 1 (5) added was set to 3.2 parts by mass.

(14) Comparative Example 1-1

A rubber composition and a rubber sheet were obtained in the same manner as in Example 1-1 except that the Silane Compound 1 (C-80) was not contained and the addition amount of the other silane compound (Si69) was set to 3.2 parts by mass.

(15) Comparative Example 1-2

A rubber composition and a rubber sheet were obtained in the same manner as in Example 1-1, except that neither the Silane Compound 1 (C-80) nor the other silane compound (Si69) was contained, and the amount of the Organic Silane 3 synthesized in Example 1 (6) added was set to 3.2 parts by mass.

(16) Physical Property Evaluation

The physical properties of the rubber sheets obtained in Examples 1-1 to 1-7 and Comparative Examples 1-1 and 1-2 were measured by the following method.
(JIS-A Hardness)
Three rubber sheets obtained in Examples 1-1 to 1-3 or Comparative Example 1-1 were stacked, and the JIS-A strength was measured in accordance with JIS K6353 (published in 2012).
(Tensile Properties)
No. 3 dumbbell-shaped test pieces were punched out from the rubber sheets obtained in Examples 1-1 to 1-3 or Comparative Example 1-1, and a tensile test at a tensile speed of 500 mm/min was conducted in accordance with JIS K6251 (published in 2010), and tensile strength at break (TB) [MPa] and elongation at break (EB) [%] were measured at room temperature (25° C.).
(Viscoelasticity)
Using a viscoelastic measuring device (REOGELE-4000, manufactured by UBM Co., Ltd.) in accordance with JIS K 6394, the tan δ at the measurement temperatures of 0° C. and 60° C. of the rubber sheets obtained in Examples 1-1 to 1-7 and Comparative Examples 1-1 and 1-2 was determined under the conditions of deformation 20 μm, about 0.1%, frequency 10 Hz, and initial deformation 2%, and the tan δ balance (=tan δ (0° C.)/tan δ (60° C.) was calculated from this value.
(Scorch Resistance)
Using a rotor-less Mooney measuring machine manufactured by Toyo Seiki Co., Ltd. in accordance with JIS K6300, the time t5 required to increase the minimum viscosity Vm by 5 Mooney units after preheating the unvulcanized composition at 125° C. for 1 minute was measured, and the value of Comparative Example was expressed by an index of 100. The larger the index means the longer the scorch time and the better the scorch resistance are.
Table 1 shows the measurement results and calculation results (tan δ balance) of the above physical property evaluation items. Tan δ (0° C.), tan δ (60° C.), and tan δ balance are shown as relative values when each value in Comparative Example 1-1 is set 10 to 100.0.

TABLE 1

|  |  | Ex. 1-1 | Ex. 1-2 | Ex. 1-3 | Ex. 1-4 | Ex. 1-5 | Ex. 1-6 | Ex. 1-7 | Comp. Ex 1-1 | Comp. Ex 1-2 |
|---|---|---|---|---|---|---|---|---|---|---|
| Composition of Rubber Composition (parts by mass) | SBR (1502) | 100 | 100 | 100 | 100 | 100 | 100 | 100 | 100 | 100 |
|  | Silica AQ | 40 | 40 | 40 | 40 | 40 | 40 | 40 | 40 | 40 |
|  | Zinc oxide No. 3 |  |  |  | 3 | 3 | 3 | 3 | 3 | 3 |
|  | Stearic acid | 1 | 1 |  | 1 | 1 | 1 | 1 | 1 | 1 |
|  | Anti-ageing agent (NOCRAC 6C) | 1 |  | 1 | 1 | 1 | 1 | 1 | 1 | 1 |
|  | Other silane compound (Si69) | 2.4 | 1.6 |  |  |  |  |  | 3.2 |  |
|  | Silane Compound 1 (C-80) | 0.8 | 1.6 | 3.2 |  |  |  |  |  |  |
|  | Silane Compound 2 |  |  |  | 3.2 |  |  |  |  |  |
|  | Silane Compound 3 |  |  |  |  | 3.2 |  |  |  |  |
|  | Silane Compound 4 |  |  |  |  |  | 3.2 |  |  |  |
|  | Silane Compound 5 |  |  |  |  |  |  | 3.2 |  |  |
|  | Organic Silane 3 |  |  |  |  |  |  |  |  | 3.2 |
|  | Sulfur | 2 | 2 | 2 | 2 | 2 | 2 | 2 | 2 | 2 |
|  | Vulcanization accelerator (NOCCELER CZ) | 1 | 1 | 1 | 1 | 1 | 1 | 1 |  | 1 |
|  | Vulcanization accelerator (NOCCELER D) | 0.5 | 0.5 | 0.5 | 0.5 | 0.5 | 0.5 | 0.5 | 0.5 | 0.5 |
| Hardness | JIS-A hardness | 52 | 53 | 53 | n.d. | n.d. | n.d. | n.d. | 53 | n.d. |
| Tensile properties | tensile strength at break (MPa) | 34.7 | 31.3 | 29.6 | n.d. | n.d. | n.d. | n.d. | 29.3 | n.d. |
|  | Elongation at break (%) | 732 | 711 | 807 | n.d. | n.d. | n.d. | n.d. | 623 | n.d. |
| Viscoelasticity | tan δ (0° C.) (index) | 103.6 | 106.0 | 104.0 | 103.4 | 104.2 | 103.5 | 103.9 | 100.0 | 102.1 |
|  | tan δ (60° C.) (index) | 98.9 | 91.1 | 89.3 | 90.5 | 91.1 | 94.2 | 93.2 | 100.0 | 95.1 |
|  | tan δ (0° C.)/tan δ (60° C.) (index) | 104.7 | 116.4 | 116.5 | 114.3 | 114.4 | 109.9 | 111.5 | 100.0 | 107.4 |
| Vulcanization properties | Scorch resistance performance (index) | 112 | 121 | 138 | 142 | 136 | 113 | 122 | 100 | 83 |

A comparison between Examples 1-1 to 1-7 and Comparative Example 1-1 reveals that the rubber sheets obtained in Examples 1-1 to 1-7 have higher tan δ (0° C.) than the rubber sheet obtained in Comparative Example 1-1. It can be seen that the rubber sheets obtained in Examples 1-1 to 1-7 have lower tan δ (60° C.) than the rubber sheet obtained in Comparative Example 1-1. Further it can be seen that the rubber sheets obtained in Examples 1-1 to 1-7 have higher tan δ balance than the rubber sheet obtained in Comparative Example 1-1. From the above results, it can be seen that the rubber sheets obtained in Examples 1-1 to 1-7 have better viscoelasticity than the rubber sheet obtained in Comparative Example 1-1.

Further, when Examples 1-1 to 1-3 are compared with Comparative Example 1-1, it is understood that the rubber sheets obtained in Examples 1-1 to 1-3 have higher tensile strength at break and elongation at break than the rubber sheet obtained in Comparative Example 1-1. From this, it is understood that the rubber sheets obtained in Examples 1-1 to 1-3 are superior in tensile properties (mechanical properties) compared with the rubber sheet obtained in Comparative Example 1-1.

Further, when Example 1-3 is compared with Examples 1-4 to 1-7, it is understood that the rubber sheet obtained in Example 1-3 and the rubber sheets obtained in Examples 1-4 to 1-7 are substantially equivalent in terms of viscoelasticity.

Further, when Examples 1-3 to 1-7 are compared with Comparative Example 1-2, it is found that the rubber compositions obtained in Examples 1-3 to 1-7 are significantly superior in terms of scorch resistance to the rubber compositions obtained in Comparative Example 1-2.

2. Example 2: Preparation and Evaluation of Rubber Composition and Rubber Sheet Containing Silane Compounds 1 and 3-5 and Solution Polymerized Styrene Butadiene Rubber (1) Example 2-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Solution polymerized styrene butadiene rubber (SBR: SL552 manufactured by JSR Corporation)
(styrene 23%, vinyl 31%, Cis35%) (Tg=−53° C.)
  100 parts by mass
Silane compound 1 (C-80) (Example 1(1)-1)
  3.2 parts by mass
Silica AQ (product name: Nip Seal AQ, manufactured by Tosoh Corporation)
  40 parts by mass
Zinc oxide No. 3 (product name: Ginrei R, manufactured by Toho Zinc Co., Ltd.)
  3 parts by mass
Stearic acid (product name: Stearic acid 300, manufactured by New Japan Chemical Co., Ltd.)
  1 part by mass
Anti-aging agent (product name: NOCRAC 6C, manufactured by Ouchi Shinko Chemical Industrial Co., Ltd.)
  1 part by mass
Sulfur (oil treated sulfur, manufactured by Hosoi Chemical Industry Co., Ltd.)
  2 parts by mass Vulcanization accelerator (product name: NOCCELER CZ manufactured by Ouchi Shinko Chemical Industrial Co., Ltd.)
1 part by mass
Vulcanization accelerator (product name: NOCCELER D manufactured by Ouchi Shinko Chemical Industrial Co., Ltd.)
0.5 part by mass (2) Example 2-2

A rubber composition and a rubber sheet were obtained in the same manner as in Example 2-1, except that the Silane Compound 1 (C-80) was not contained and the amount of the Silane Compound 3 synthesized in Example 1(3) added was set to 3.2 parts by mass.

(3) Example 2-3

A rubber composition and a rubber sheet were obtained in the same manner as in Example 2-1, except that the Silane Compound 1 (C-80) was not contained and the amount of the Silane Compound 4 synthesized in Example 1(4) added was set to 3.2 parts by mass.

(4) Example 2-4

A rubber composition and a rubber sheet were obtained in the same manner as in Example 2-1, except that the Silane Compound 1 (C-80) was not contained and the amount of the Silane Compound 5 synthesized in Example 1(5) added was set to 3.2 parts by mass.

(5) Comparative Example 2-1

A rubber composition and a rubber sheet were obtained in the same manner as in Example 2-1, except that the silane compound 1 (C-80) was not contained and the addition amount of the other silane compound (product name: Si69, manufactured by Evonik) was set to 3.2 parts by mass.

(6) Physical Property Evaluation

The physical properties (viscoelasticity and scorch resistance performance) of the rubber sheets obtained in Examples 2-1 to 2-4 and Comparative Example 2-1 were measured by the method described in Example 1 (16).

Table 2 shows the measurement results and calculation results (tan δ balance) of the above physical property evaluation items. Tan δ (0° C.), tan δ (60° C.), and tan δ balance are shown as relative values when each value in Comparative Example 2-1 is set to 100.0.

TABLE 2

| | | Ex. 2-1 | Ex. 2-2 | Ex. 2-3 | Ex. 2-4 | Comp. Ex 2-1 |
|---|---|---|---|---|---|---|
| Composition of Rubber Composition (parts by mass) | SBR (SL552) | 100 | 100 | 100 | 100 | 100 |
| | Silica AQ | 40 | 40 | 40 | 40 | 40 |
| | Zinc oxide No. 3 | 3 | 3 | 3 | 3 | 3 |
| | Stearic acid | 1 | 1 | 1 | 1 | 1 |
| | Anti-ageing agent (NOCRAC 6C) | 1 | 1 | 1 | 1 | 1 |
| | Other silane compound (Si69) | | | | | 3.2 |
| | Silane Compound 1 (C-80) | 3.2 | | | | |
| | Silane Compound 3 | | 3.2 | | | |
| | Silane Compound 4 | | | 3.2 | | |
| | Silane Compound 5 | | | | 3.2 | |
| | Sulfur | 2 | 2 | 2 | 2 | 2 |
| | Vulcanization accelerator (NOCCELER CZ) | 1 | 1 | 1 | 1 | 1 |
| | Vulcanization accelerator (NOCCELER D) | 0.5 | 0.5 | 0.5 | 0.5 | 0.5 |
| Viscoelasticity | tan δ (0° C.) (index) | 102.5 | 106.2 | 104.3 | 105.5 | 100.0 |
| | tan δ (60° C.) (index) | 93.4 | 97.5 | 95.4 | 96.2 | 100.0 |
| | tan δ (0° C.)/tan δ (60° C.) (index) | 109.7 | 108.9 | 109.3 | 109.7 | 100.0 |
| Vulcanization properties | Scorch resistance performance (index) | 135 | 126 | 135 | 128 | 100 |

Comparison between Examples 2-1 to 2-4 and Comparative Example 2-1 shows that Examples 2-1 to 2-4 exhibit superior viscoelasticity and scorch resistance performance than Comparative Example 2-1.

3. Example 3: Preparation and Evaluation of Rubber Composition and Rubber Sheet Containing Silane Compound 2 and Butadiene Rubber (1) Example 3-1

Preparation of Rubber Composition and Rubber Sheet
Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.
Butadiene rubber (BR1220, manufactured by ZEON Corporation)
100 parts by mass
Silane compound 2 (Example 1 (2))
3.2 parts by mass
Silica AQ (product name: Nip Seal AQ, manufactured by Tosoh Corporation)
40 parts by mass
Zinc oxide No, 3 (product name: Ginrei R, manufactured by Toho Zinc Co., Ltd.)
3 parts by mass
Stearic acid (product name: Stearic acid 300, manufactured by New Japan Chemical Co., Ltd.)
1 part by mass
Anti-aging agent (product name: NOCRAC 6C, manufactured by Ouchi Shinko Chemical Industrial Co., Ltd.)
1 part by mass
Sulfur (oil treated sulfur, manufactured by Hosoi Chemical Industry Co., Ltd.)
2 parts by mass
Vulcanization accelerator (product name: NOCCELER CZ manufactured by Ouchi Shinko Chemical Industrial Co., Ltd.)
1 part by mass
Vulcanization accelerator (product name: NOCCELER D manufactured by Ouchi Shinko Chemical Industrial Co., Ltd.)
0.5 part by mass (2) Comparative Example 3-1

A rubber composition and a rubber sheet were obtained in the same manner as in Example 3-1, except that the silane compound 2 was not contained and the addition amount of the other silane compound (product name: Si69, manufactured by Evonik was set to 3.2 parts by mass.

(3) Physical Property Evaluation

The physical properties (viscoelasticity and scorch resistance performance) of the rubber sheets obtained in Example 3-1 and Comparative Example 3-1 were measured by the method described in Example 1 (16).

Table 3 shows the measurement results and calculation results (tan δ balance) of the above physical property evaluation items. Tan δ (0° C.), tan δ (60° C.), and tan δ balance are shown as relative values when each value in Comparative Example 3-1 is set to 100.0.

TABLE 3

|  |  | Ex. 3-1 | Comp. Ex 3-1 |
|---|---|---|---|
| Composition of Rubber Composition (parts by mass) | Butadiene rubber (BR1220) | 100 | 100 |
|  | Silica AQ | 40 | 40 |
|  | Zinc oxide No. 3 | 3 | 3 |
|  | Stearic acid | 1 | 1 |
|  | Anti-ageing agent (NOCRAC 6C) | 1 | 1 |
|  | Other silane compound (Si69) |  | 3.2 |
|  | Silane Compound 2 | 3.2 |  |
|  | Sulfur | 2 | 2 |
|  | Vulcanization accelerator (NOCCELER CZ) | 1 | 1 |
|  | Vulcanization accelerator (NOCCELER D) | 0.5 | 0.5 |
| Viscoelasticity | tan δ (0° C.) (index) | 103.2 | 100.0 |
|  | tan δ (60° C.) (index) | 92.3 | 100.0 |
|  | tan δ (0° C.)/tan δ (60° C.) (index) | 111.8 | 100.0 |
| Vulcanization properties | Scorch resistance performance (index) | 139 | 100 |

A comparison between Example 3-1 and Comparative Example 3-1 shows that Example 3-1 exhibits superior viscoelasticity and scorch resistance performance than Comparative Example 3-1.

4. Example 4: Preparation and Evaluation of Rubber Composition and Rubber Sheet Containing Silane Compound 2 and Styrene Butadiene Rubber (1) Example 4-1

Preparation of Rubber Composition and Rubber Sheet
Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.
  Emulsified polymerization styrene butadiene rubber (SBR: manufactured by ZEON Corporation., 1502) (24% styrene, 16% vinyl, 11% Cis) (Tg=−52° C.)
  70 parts by mass
  Butadiene rubber (BR1220, manufactured by ZEON Corporation)
  30 parts by mass
  Silane compound 2 (Example 1 (2))
  3.2 parts by mass
  Silica AQ (product name: Nip Seal AQ, manufactured by Tosoh Corporation)
  40 parts by mass
  Zinc oxide No. 3 (product name: Ginrei R, manufactured by Toho Zinc Co., Ltd.)
  3 parts by mass
  Stearic acid (product name: Stearic acid 300, manufactured by New Japan Chemical Co., Ltd,)
  1 part by mass
  Anti-aging agent (product name: NOCRAC 6C, manufactured by Ouchi Shinko Chemical Industrial Co., Ltd.)
  1 part by mass
  Sulfur (oil treated sulfur, manufactured by Hosoi Chemical Industry Co., Ltd.)
  2 parts by mass
  Vulcanization accelerator (product name: NOCCELER CZ manufactured by Ouchi Shinko Chemical Industrial Co., Ltd.)
  1 part by mass
  Vulcanization accelerator (product name: NOCCELER. D manufactured by Ouchi Shinko Chemical Industrial Co., Ltd,)
  0.5 part by mass (2) Comparative Example 4-1

A rubber composition and a rubber sheet were obtained in the same manner as in Example 4-1, except that the silane compound 2 was not contained and the addition amount of the other silane compound (product name: Si69, manufactured by Evonik) was set to 3.2 parts by mass.

(3) Physical Property Evaluation

The physical properties (viscoelasticity and scorch resistance performance) of the rubber sheets obtained in Example 4-1 and Comparative Example 4-1 were measured by the method described in Example 1 (16).

Table 4 shows the measurement results and calculation results (tan δ balance) of the above physical property evaluation items. Tan δ (0° C.), tan δ (60° C.), and tan δ balance are shown as relative values when each value in Comparative Example 4-1 is set to 100.0.

TABLE 4

|  |  | Ex. 4-1 | Comp. Ex 4-1 |
|---|---|---|---|
| Composition of Rubber Composition (parts by mass) | Butadiene rubber (BR1220) | 100 | 100 |
|  | Silica AQ | 40 | 40 |
|  | Zinc oxide No. 3 | 3 | 3 |
|  | Stearic acid | 1 | 1 |
|  | Anti-ageing agent (NOCRAC 60) | 1 | 1 |
|  | Other silane compound (Si69) |  | 3.2 |
|  | Silane Compound 2 | 3.2 |  |
|  | Sulfur | 2 | 2 |
|  | Vulcanization accelerator (NOCCELER CZ) | 1 | 1 |
|  | Vulcanization accelerator (NOCCELER D) | 0.5 | 0.5 |
| Viscoelasticity | tan δ (0° C.) (index) | 106.3 | 100.0 |
|  | tan δ (60° C.) (index) | 91.3 | 100.0 |
|  | tan δ (0° C.)/tan δ (60° C.) (index) | 116.4 | 100.0 |
| Vulcanization properties | Scorch resistance performance (index) | 136 | 100 |

A comparison between Example 4-1 and Comparative Example 4-1 shows that Example 4-1 exhibits superior viscoelasticity and scorch resistance performance than Comparative Example 4-1.

5. Example 5: Preparation and Evaluation of Rubber Composition and Rubber Sheet Containing Silane Compound 1 and Isoprene Rubber (1) Example 5-1

Preparation of Rubber Composition and Rubber Sheet
Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Isoprene rubber (IR2200, manufactured by ZEON Corporation)
  100 parts by mass
Silane compound 1 (C-80) (Example 1 (1)-1)
  3.2 parts by mass
Silica AQ (product name: Nip Seal AQ, manufactured by Tosoh Corporation)
  40 parts by mass
Zinc oxide No, 3 (product name: Ginrei R, manufactured by Toho Zinc Co., Ltd.)
  3 parts by mass
Stearic acid (product name: Stearic acid 300, manufactured by New Japan Chemical Co., Ltd.)
  1 part by mass
Anti-aging agent (product name: NOCRAC 6C, manufactured by Ouchi Shinko Chemical Industrial Co., Ltd.)
  1 part by mass
Sulfur (oil treated sulfur, manufactured by Hosoi Chemical Industry Co., Ltd.)
  2 parts by mass
Vulcanization accelerator (product name: NOCCELER CZ manufactured by Ouchi Shinko Chemical Industrial Co., Ltd.)
  1 part by mass
Vulcanization accelerator (product name: NOCCELER D manufactured by Ouchi Shinko Chemical Industrial Co., Ltd.)
  0.5 part by mass (2) Comparative Example 5-1

A rubber composition and a rubber sheet were obtained in the same manner as in Example 5-1, except that the silane compound 1 (C-80) was not contained and the addition amount of the other silane compound (product name: Si69, manufactured by Evonik) was set to 3.2 parts by mass.

(3) Physical Property Evaluation

The physical properties (viscoelasticity and scorch resistance performance) of the rubber sheets obtained in Example 5-1 and Comparative Example 5-1 were measured by the method described in Example 1 (16).
Table 5 shows the measurement results and calculation results (tan δ balance) of the above physical property evaluation items. Tan δ (0° C.), tan δ (60° C.), and tan δ balance are shown as relative values when each value in Comparative Example 5-1 is set to 100.0.

TABLE 5

| | | Ex. 5-1 | Comp. Ex 5-1 |
|---|---|---|---|
| Composition of Rubber Composition (parts by mass) | Isoprene rubber (IR2200) | 100 | 100 |
| | Silica AQ | 40 | 40 |
| | Zinc oxide No. 3 | 3 | 3 |
| | Stearic acid | 1 | 1 |
| | Anti-ageing agent (NOCRAC 6C) | 1 | 1 |
| | Other silane compound (Si69) | | 3.2 |
| | Silane Compound 1 (C-80) | 3.2 | |
| | Sulfur | 2 | 2 |
| | Vulcanization accelerator (NOCCELER CZ) | 1 | 1 |
| | Vulcanization accelerator (NOCCELER D) | 0.5 | 0.5 |
| Viscoelasticity | tan δ (0° C.) (index) | 103.5 | 100.0 |
| | tan δ (60° C.) (index) | 93.4 | 100.0 |
| | tan δ (0° C.)/tan δ (60° C.) (index) | 110.8 | 100.0 |
| Vulcanization properties | Scorch resistance performance (index) | 130 | 100 |

A comparison between Example 5-1 and Comparative Example 5-1 shows that Example 5-1 exhibits superior viscoelasticity and scorch resistance performance than Comparative Example 5-1.

6. Example 6: Preparation and Evaluation of Rubber Composition and Rubber Sheet Containing Silane Compound 2 and Butyl Rubber (1) Example 6-1

Preparation of Rubber Composition and Rubber Sheet
Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Butyl rubber (IIR365, manufactured by JSR)
  100 parts by mass
Silane compound 2 (Example 1 (2))
  3.2 parts by mass
Silica AQ (product name: Nip Seal AQ, manufactured by Tosoh Corporation)
  40 parts by mass
Zinc oxide No. 3 (product name: Ginrei R, manufactured by Toho Zinc Co., Ltd,)
  3 parts by mass
Stearic acid (product name: Stearic acid 300, manufactured by New Japan Chemical Co., Ltd.)
  1 part by mass
Anti-aging agent (product name: NOCRAC 6C, manufactured by Ouchi Shinko Chemical Industrial Co., Ltd.)
  1 part by mass
Sulfur (oil treated sulfur, manufactured by Hosoi Chemical Industry Co., Ltd.)
  2 parts by mass
Vulcanization accelerator (product name: NOCCELER CZ manufactured by Ouchi Shinko Chemical Industrial Co., Ltd,)
  1 part by mass
Vulcanization accelerator (product name: NOCCELER D manufactured by Ouchi Shinko Chemical Industrial Co., Ltd.)
  0.5 part by mass

(2) Comparative Example 6-1

A rubber composition and a rubber sheet were obtained in the same manner as in Example 6-1, except that the silane compound 2 was not contained and the addition amount of the other silane compound (product name: Si69, manufactured by Evonik) was set to 3.2 parts by mass.

(3) Physical Property Evaluation

The physical properties (viscoelasticity and scorch resistance performance) of the rubber sheets obtained in Example 6-1 and Comparative Example 6-1 were measured by the method described in Example 1 (16).

Table 6 shows the measurement results and calculation results (tan δ balance) of the above physical property evaluation items. Tan δ (0° C.), tan δ (60° C.), and tan δ balance are shown as relative values when each value in Comparative Example 6-1 is set to 100.0.

TABLE 6

| | | Ex. 6-1 | Comp. Ex 6-1 |
|---|---|---|---|
| Composition of Rubber Composition (parts by mass) | Butyl rubber (IIR365) | 100 | 100 |
| | Silica AQ | 40 | 40 |
| | Zinc oxide No. 3 | 3 | 3 |
| | Stearic acid | 1 | 1 |
| | Anti-ageing agent (NOCRAC 6C) | 1 | 1 |
| | Other silane compound (Si69) | | 3.2 |
| | Silane Compound 2 | 3.2 | |
| | Sulfur | 2 | 2 |
| | Vulcanization accelerator (NOCCELER CZ) | 1 | 1 |
| | Vulcanization accelerator (NOCCELER D) | 0.5 | 0.5 |
| Viscoelasticity | tan δ (0° C.) (index) | 103.5 | 100.0 |
| | tan δ (60° C.) (index) | 98.2 | 100.0 |
| | tan δ (0° C.)/tan δ (60° C.) (index) | 105.4 | 100.0 |
| Vulcanization properties | Scorch resistance performance (index) | 138 | 100 |

A comparison between Example 6-1 and Comparative Example 6-1 shows that Example 6-1 exhibits superior viscoelasticity and scorch resistance performance than Comparative Example 6-1.

7. Example 7: Preparation and Evaluation of Rubber Composition and Rubber Sheet Containing Silane Compound 1 and Natural Rubber

(1) Example 7-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 15 minutes to obtain a rubber sheet having a thickness of 1 mm composed of the rubber composition.

Natural rubber (RSS #3)
  100 parts by mass
Silane compound 1 (C-80) (Example 1 (1)-1)
  0.8 part by mass
Another silane compound (product name: Si69, manufactured by Evonik)
  2.4 parts by mass
Silica AQ (product name: Nip Seal AQ, manufactured by Tosoh Corporation)
  40 parts by mass
Zinc oxide No. 3 (product name: Ginrei R, manufactured by Toho Zinc Co., Ltd,)
  3 parts by mass
Stearic acid (product name: Stearic acid 300, manufactured by New Japan Chemical Co., Ltd.)
  1 part by mass
Anti-aging agent (product name: NOCRAC 224, manufactured by Ouchi Shinko Chemical Industrial Co., Ltd.)
  2 parts by mass
Sulfur (oil treated sulfur, manufactured by Hosoi Chemical Industry Co., Ltd.)
  2 parts by mass
Vulcanization accelerator (product name: NOCCELER CZ manufactured by Ouchi Shinko Chemical Industrial Co., Ltd,)
  1 part by mass
Vulcanization accelerator (product name: NOCCELER D manufactured by Ouchi Shinko Chemical Industrial Co., Ltd.)
  0.5 part by mass

(2) Example 7-2

A rubber composition and a rubber sheet were obtained in the same manner as in Example 7-1, except that the amount of the Silane Compound 1 (C-80) added was set to 1.6 parts by mass and the other silane Compound (Si-69) was set to 1.6 parts by mass.

(3) Example 7-3

A rubber composition and a rubber sheet were obtained in the same manner as in Example 7-1, except that the amount of the Silane Compound 1 (C-80) added was set to 3.2 parts by mass and the other silane Compound (Si-69) was not contained.

(4) Comparative Example 7-1

A rubber composition and a rubber sheet were obtained in the same manner as in Example 7-1, except that the silane compound was not contained and the addition amount of the other silane compound (Si-69) was set to 3.2 parts by mass.

(3) Physical Property Evaluation

The physical properties (hardness, tensile properties and viscoelasticity) of the rubber sheets obtained in Examples 7-1 to 7-3 and Comparative Example 7-1 were measured by the method described in Example 1 (16).

Table 7 shows the measurement results and calculation results (tan δ balance) of the above physical property evaluation items. Tan δ (0° C.), tan δ (60° C.), and tan δ balance are shown as relative values when each value in Comparative Example 7-1 is set to 100.0.

TABLE 7

|  |  | Ex. 7-1 | Ex. 7-2 | Ex. 7-3 | Comp. Ex 7-1 |
|---|---|---|---|---|---|
| Composition of Rubber Composition (parts by mass) | Natural rubber (RSS #3) | 100 | 100 | 100 | 100 |
|  | Silica AQ | 40 | 40 | 40 | 40 |
|  | Zinc oxide No. 3 | 3 | 3 | 3 | 3 |
|  | Stearic acid | 1 | 1 | 1 | 1 |
|  | Anti-ageing agent (NOCRAC 224) | 1 | 1 | 1 | 1 |
|  | Other silane compound (Si69) | 2.4 | 1.6 |  | 3.2 |
|  | Silane Compound 1 (C-80) | 0.8 | 1.6 | 3.2 |  |
|  | Total | 148.2 | 148.2 | 148.2 | 148.2 |
|  | Sulfur | 2 | 2 | 2 | 2 |
|  | Vulcanization accelerator (NOCCELER CZ) | 1 | 1 | 1 | 1 |
|  | Vulcanization accelerator (NOCCELER D) | 0.5 | 0.5 | 0.5 | 0.5 |
| Hardness | JIS-A hardness | 51 | 51 | 49 | 49 |
| Tensile properties | 100% Mod | 1.64 | 1.68 | 1.62 | 1.63 |
|  | tensile strength at break (MPa) | 29.7 | 29.3 | 28.2 | 28.1 |
|  | Elongation at break (%) | 715 | 704 | 724 | 669 |
| Viscoelasticity | tan δ (0° C.) (index) | 109.8 | 109.9 | 108.0 | 100.0 |
|  | tan δ (60° C.) (index) | 105.5 | 108.1 | 104.0 | 100.0 |
|  | tan δ (0° C.)/tan δ (60° C.) (index) | 104.1 | 101.7 | 103.8 | 100.0 |

A comparison between the rubber sheets obtained in Examples 7-1 to 7-3 and Comparative Example 7-1 shows that the rubber sheets obtained in Examples 7-1 to 7-3 have better tan δ (0° C.), tan δ (60° C.), and tan δ balance and are superior in viscoelasticity.

When the rubber sheets obtained in Examples 7-1 to 7-3 and the rubber sheet obtained in Comparative Example 7-1 are compared only in terms of tan δ (0° C.), the results of Examples 7-1 to 7-3 are greatly improved over Comparative Example 7-1, making one understand that wet grip performance is excellent.

Further, comparing the rubber sheets obtained in Examples 7-1 to 7-3 with the rubber sheet obtained in Comparative Example 7-1, it is found that the rubber sheets obtained in Examples 7-1 to 7-3 have higher elongation at break and 100/o modulus and tensile strength at break are equivalent to the rubber sheet obtained in Comparative Example 7-1, indicating that they are excellent in mechanical properties as a whole.

8. Example 8: Preparation and Evaluation of Sealant Composition Containing Silane Compound

(1) Example 8-1

The Silane Compound 1 (C-80) was mixed with a single-component urethane sealant (Urethane Seal S700NB, manufactured by CEMEDINE CO., LTD.) in an amount shown in Table 8 below, and the mixture was degassed with a vacuum drier to obtain a composition. The obtained composition was applied to a glass plate (a micro slide glass of 76 mm×26 mm×1.0 mm, manufactured by Matsunami Glass Ind., Ltd.) and allowed to stand at room temperature (25° C.) for 1 week to cure.

(2) Comparative Example 8-1

A one component urethane sealant (Urethane Seal S700NB, manufactured by CEMEDINE CO., LTD.) was applied to a glass plate (a micro slide glass of 76 mm×26 mm×1.0 mm, manufactured by Matsunami Glass Ind., Ltd.) and allowed to stand at room temperature (25° C.) for 1 week to cure.

(3) Comparative Example 8-2

A one component urethane sealant (Urethane Seal S700NB, manufactured by CEMEDINE CO., LTD.) was mixed with 3-glycidoxypropyltriethoxysilane (KBE-403, manufactured by Shin-Etsu Chemical Co., Ltd.) in an amount shown in Table 8 below, and the mixture was degassed with a vacuum drier to obtain a composition. The resulting composition was applied to a glass plate (a micro slide glass of 76 mm×26 mm×1.0 mm, manufactured by Matsunami Glass Ind., Ltd.) and allowed to stand at room temperature (25° C.) for 1 week to cure.

(4) Evaluation of Adhesive Strength

The adhesive strength (N/in) of the composition cured in Example 8-1 and Comparative Examples 8-1 and 8-2 was measured by a 90° peel test (tensile speed 300 mm/min, room temperature (25° C.)) in accordance with JIS K6854-1. The results are shown in Table 8.

TABLE 8

|  |  | Ex. 8-1 | Comp. Ex 8-1 | Comp. Ex 8-2 |
|---|---|---|---|---|
| Composition (parts by mass) | Urethane sealant (S700NB; CEMEDINE CO., LTD.) | 97 | 100 | 97 |
|  | Silane Compound 1 (C-80) | 3 |  |  |
|  | 3-glycidoxypropyltriethoxysilane (KBE-403, manufactured by Shin-Etsu Chemical Co., Ltd.) |  |  | 3 |
| Adhesion strength | Peeling strength (N/m) | 1498 | 1265 | 1388 |

A comparison of Example 8-1 and Comparative Examples 8-1 and 8-2 shows that the composition obtained in Example 8-1 has higher adhesive strength than the compositions obtained in Comparative Examples 8-1 and 8-2.

9. Example 9: Preparation and Evaluation of Rubber Composition and Rubber Sheet Containing Silane Compound 1 and Styrene Butadiene Rubber

(1) Example 9-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Emulsified polymerization styrene butadiene rubber (SBR: manufactured by ZEON Corporation., 1502) (24% styrene, 16% vinyl, 11% Cis) (Tg=−52° C.)
100 parts by mass
Silane compound 1 (C-80) (Example 1 (1)-1)
3.2 parts by mass
Silica AQ (product name: Nip Seal AQ, manufactured by Tosoh Corporation)
40 parts by mass
Zinc oxide No. 3 (product name: Ginrei R, manufactured by Toho Zinc Co., Ltd.)
3 parts by mass
Stearic add (product name: Stearic add 300, manufactured by New Japan Chemical Co., Ltd.)
1 part by mass
Anti-aging agent (product name: NOCRAC 224, manufactured by Ouchi Shinko Chemical Industrial Co., Ltd.)
1 part by mass
Sulfur (oil treated sulfur, manufactured by Hosoi Chemical Industry Co., Ltd.)
2.76 parts by mass
Vulcanization accelerator (product name: NOCCELER CZ manufactured by Ouchi Shinko Chemical Industrial Co., Ltd,)
1 part by mass
Vulcanization accelerator (product name: NOCCELER D manufactured by Ouchi Shinko Chemical Industrial Co., Ltd.)
0.5 part by mass (2) Example 9-2

A rubber composition and a rubber sheet were obtained in the same manner as in Example 9-1, except that the Silane Compound 1 (C-80) was not contained and the amount of the Silane Compound 3 synthesized in Example 1(3) added was set to 3.2 parts by mass.

(3) Example 9-3

A rubber composition and a rubber sheet were obtained in the same manner as in Example 9-1, except that the Silane Compound 1 (C-80) was not contained and the amount of the Silane Compound 4 synthesized in Example 1(4) added was set to 3.2 parts by mass.

(4) Example 9-4

A rubber composition and a rubber sheet were obtained in the same manner as in Example 9-1, except that the amount of the vulcanization accelerator, NOCCELER CZ, added was set to 1.38 parts by mass and the vulcanization accelerator, NOCCELER D, was set to 0.69 parts by mass.

(5) Example 9-5

A rubber composition and a rubber sheet were obtained in the same manner as in Example 9-1, except that the amount of the vulcanization accelerator, NOCCELER CZ, added was set to 1.38 parts by mass and the vulcanization accelerator, NOCCELER D, was set to 0.69 parts by mass, and further, the Silane Compound 1 (C-80) was not contained and the amount of the Silane Compound 3 synthesized in Example 1(3) added was set to 3.2 parts by mass.

(6) Example 9-6

A rubber composition and a rubber sheet were obtained in the same manner as in Example 9-1, except that the amount of the vulcanization accelerator, NOCCELER CZ, added was set to 1.38 parts by mass and the vulcanization accelerator, NOCCELER D, was set to 0.69 parts by mass, and further, the Silane Compound 1 (C-80) was not contained, and the amount of the Silane Compound 4 synthesized in Example 1(4) added was set to 3.2 parts by mass.

(7) Example 9-7

A rubber composition and a rubber sheet were obtained in the same manner as in Example 9-1, except that the amount of the Silane Compound 1 (C-80) added was set to 4.3 parts by mass.

(8) Comparative Example 9-1

A rubber composition and a rubber sheet were obtained in the same manner as in Example 9-1, except that the Silane Compound 1 (C-80) was not contained, the amount of the other silane compound (Si69) added was set to 3.2 parts by mass, and the addition amount of sulfur was set to 2 parts by mass.

(9) Physical Property Evaluation

The physical properties (viscosity and viscoelasticity) of the rubber sheets obtained in Examples 9-1 to 9-7 and Comparative Example 9-1 were measured by the following method.

(Viscosity)

Mooney viscosity of the obtained rubber compositions was measured by a Mooney viscometer in accordance with JIS K6300 using an L-shaped rotor (38.1 mm in diameter, 5.5 mm thick) under conditions of a preheating time of 1 minute, a rotor rotation time of 4 minutes, 100° C., and 2 rpm. The obtained results were expressed by an index with the value of the Comparative Example set to 100. The smaller this index means that the viscosity is small and workability is excellent.

(Viscoelasticity)

Viscoelasticity was measured by the method described in Example 1 (16).

Table 9 shows the measurement results and calculation results (tan δ balance) of the above physical property evaluation items. Tan δ (0° C.), tan δ (60° C.), and tan δ balance are shown as relative values when each value in Comparative Example 9-1 is set to 100.0.

TABLE 9

|  |  | Ex. 9-1 | Ex. 9-2 | Ex. 9-3 | Ex. 9-4 | Ex. 9-5 | Ex. 9-6 | Ex. 9-7 | Comp. Ex 9-1 |
|---|---|---|---|---|---|---|---|---|---|
| Composition of Rubber Composition (parts by mass) | SBR (1502) | 100 | 100 | 100 | 100 | 100 | 100 | 100 | 100 |
|  | Silica AQ | 40 | 40 | 40 | 40 | 40 | 40 | 40 | 40 |
|  | Zinc oxide No. 3 | 3 | 3 | 3 | 3 | 3 | 3 | 3 | 3 |
|  | Stearic acid | 1 | 1 | 1 | 1 | 1 | 1 | 1 | 1 |
|  | Anti-ageing agent | 1 | 1 | 1 | 1 | 1 | 1 | 1 | 1 |

TABLE 9-continued

|  |  | Ex. 9-1 | Ex. 9-2 | Ex. 9-3 | Ex. 9-4 | Ex. 9-5 | Ex. 9-6 | Ex. 9-7 | Comp. Ex 9-1 |
|---|---|---|---|---|---|---|---|---|---|
|  | (NOCRAC 224) |  |  |  |  |  |  |  |  |
|  | Other silane compound (Si69) |  |  |  |  |  |  |  | 3.2 |
|  | Silane Compound 1 (C-80) | 3.2 |  |  | 3.2 |  |  | 4.3 |  |
|  | Silane Compound 3 |  | 3.2 |  |  | 3.2 |  |  |  |
|  | Silane Compound 4 |  |  | 3.2 |  |  | 3.2 |  |  |
|  | Sulfur | 2.76 | 2.76 | 2.76 | 2.76 | 2.76 | 2.76 | 2.76 | 2 |
|  | Vulcanization accelerator (NOCCELER CZ) | 1 | 1 | 1 | 1.38 | 1.38 | 1.38 | 1.38 | 1 |
|  | Vulcanization accelerator (NOCCELER D) | 0.5 | 0.5 | 0.5 | 0.69 | 0.69 | 0.69 | 0.69 | 0.5 |
| Viscosity | ML1 + 4 100° C. (index) | 68 | 67 | 66 | 66 | 67 | 67 | 61 | 100 |
| Viscoelasticity | tan δ (0° C.) (index) | 109 | 109 | 115 | 112 | 112 | 118 | 118 | 100 |
|  | tan δ (60° C.) (index) | 90 | 92 | 91 | 77 | 78 | 79 | 78 | 100 |
|  | tan δ (0° C.)/tan δ (60° C.) (index) | 121 | 118 | 127 | 145 | 143 | 150 | 152 | 100 |

A comparison between Examples 9-1 to 9-7 and Comparative Example 9-1 reveals that the rubber sheets obtained in Examples 9-1 to 9-7 had higher tan δ (0° C.) than the rubber sheet obtained in Comparative Example 9-1. Also, it was revealed that the rubber sheets obtained in Examples 9-1 to 9-7 had lower tan δ (60° C.) than the rubber sheet obtained in Comparative Example 9-1. Further, it was revealed that the rubber sheets obtained in Examples 9-1 to 9-7 had higher tan δ balance than the rubber sheet obtained in Comparative Example 9-1. From these results, it can be understood that the rubber sheets obtained in Examples 9-1 to 9-7 had better viscoelasticity than the rubber sheet obtained in Comparative Example 9-1.

Further, a comparison between Examples 9-1 to 9-7 and Comparative Example 9-1 reveals that the rubber sheets obtained in Examples 9-1 to 9-7 had lower viscosity (ML1+4 100° C. (index)) than the rubber sheet obtained in Comparative Example 9-1. Therefore, it is understood that the rubber sheets obtained in Examples 9-1 to 9-7 are superior to the rubber sheet obtained in Comparative Example 9-1 in the dispersion state of silica in an unvulcanized state.

10. Example 10: Preparation and Evaluation of Rubber Composition and Rubber Sheet Containing Silane Compounds 1 and 4 and Solution Polymerized Styrene Butadiene Rubber

(1) Example 10-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Solution polymerized styrene-butadiene rubber (NS116R, manufactures by ZS elastomer)
  100 parts by mass
Silane compound 1 (C-80) (Example 1(1)-1)
  3.2 parts by mass
Silica AQ (product name: Nip Seal AQ, manufactured by Tosoh Corporation)
  40 parts by mass
Zinc oxide No. 3 (product name: Ginrei R, manufactured by Toho Zinc Co., Ltd.)
  3 parts by mass
Stearic add (product name: Stearic add 300, manufactured by New Japan Chemical Co., Ltd.)
  1 part by mass
Anti-aging agent (product name: NOCRAC 224, manufactured by Ouchi Shinko Chemical Industrial Co., Ltd.)
  1 part by mass
Sulfur (oil treated sulfur, manufactured by Hosoi Chemical Industry Co., Ltd.)
  2.76 parts by mass
Vulcanization accelerator (product name: NOCCELER CZ manufactured by Ouchi Shinko Chemical Industrial Co., Ltd.)
  1.38 part by mass
Vulcanization accelerator (product name: NOCCELER D manufactured by Ouchi Shinko Chemical Industrial Co., Ltd.)
  0.69 part by mass

(2) Example 10-2

A rubber composition and a rubber sheet were obtained in the same manner as in Example 10-1, except that the Silane Compound 1 (C-80) was not contained and the amount of the Silane Compound 4 synthesized in Example 1(4) added was set to 3.2 parts by mass.

(3) Comparative Example 10-1

A rubber composition and a rubber sheet were obtained in the same manner as in Example 10-1, except that the Silane Compound 1 (C-80) was not contained, the amount of the other silane compound (Si69) added was set to 3.2 parts by mass, sulfur was set to 2 parts by mass, and further the amount of the vulcanization accelerator, NOCCELER CZ, added was set to 1 part by mass and the vulcanization accelerator, NOCCELER D, was set to 0.5 parts by mass.

(4) Example 10-3

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Solution polymerized styrene-butadiene rubber (NS116R, manufactured by ZS elastomer)
  70 parts by mass
Butadiene rubber (UBEPOL BR150L, manufactured by UBE INDUSTRIES, LTD.)
  30 parts by mass
Silane compound 1 (C-80) (Example 1(1)-1)
  3.2 parts by mass
Silica AQ (product name: Nip Seal AQ, manufactured by Tosoh Corporation)
  40 parts by mass
Zinc oxide No. 3 (product name: Ginrei R, manufactured by Toho Zinc Co., Ltd.)
  3 parts by mass
Stearic acid (product name: Stearic acid 300, manufactured by New Japan Chemical Co., Ltd.)
  1 part by mass
Anti-aging agent (product name: NOCRAC 224, manufactured by Ouchi Shinko Chemical Industrial Co., Ltd.)
  1 part by mass
Sulfur (oil treated sulfur, manufactured by Hosoi Chemical Industry Co., Ltd.)
  2.76 parts by mass
Vulcanization accelerator (product name: NOCCELER CZ manufactured by Ouchi Shinko Chemical Industrial Co., Ltd,)
  1.38 part by mass
Vulcanization accelerator (product name: NOCCELER D manufactured by Ouchi Shinko Chemical Industrial Co., Ltd.)
  0.69 part by mass

(5) Example 10-4

A rubber composition and a rubber sheet were obtained in the same manner as in Example 10-3, except that the Silane Compound 1 (C-80) was not contained and the amount of the Silane Compound 4 synthesized in Example 1(4) added was set to 3.2 parts by mass, and the amount of sulfur added was set to 2 parts by mass.

(6) Comparative Example 10-2

A rubber composition and a rubber sheet were obtained in the same manner as in Example 10-3, except that the Silane Compound 1 (C-80) was not contained, the amount of the other silane compound (Si69) added was set to 3.2 parts by mass, sulfur was set to 2 parts by mass, and further the amount of the vulcanization accelerator, NOCCELER CZ, added was set to 1 part by mass and the vulcanization accelerator, NOCCELER D, was set to 0.5 parts by mass.

(7) Example 10-5

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Solution polymerized styrene-butadiene rubber (NS116R, manufactured by ZS Corporation)
  30 parts by mass
Butadiene rubber (UBEPOL BR150L, manufactured by UBE INDUSTRIES, LTD.)
  70 parts by mass
Silane compound 1 (C-80) (Example 1(1)-1)
  3.2 parts by mass
Silica AQ (product name: Nip Seal AQ, manufactured by Tosoh Corporation)
  40 parts by mass
Zinc oxide No. 3 (product name: Ginrei R, manufactured by Toho Zinc Co., Ltd.)
  3 parts by mass
Stearic add (product name: Stearic add 300, manufactured by New Japan Chemical Co., Ltd.)
  1 part by mass
Anti-aging agent (product name: NOCRAC 224, manufactured by Ouchi Shinko Chemical Industrial Co., Ltd.)
  1 part by mass
Sulfur (oil treated sulfur, manufactured by Hosoi Chemical Industry Co., Ltd.)
  2.76 parts by mass
Vulcanization accelerator (product name: NOCCELER CZ manufactured by Ouchi Shinko Chemical Industrial Co., Ltd.)
  1.38 part by mass
Vulcanization accelerator (product name: NOCCELER D manufactured by Ouchi Shinko Chemical Industrial Co., Ltd.)
  0.69 part by mass

(8) Example 10-6

A rubber composition and a rubber sheet were obtained in the same manner as in Example 10-5, except that the Silane Compound 1 (C-80) was not contained and the amount of the Silane Compound 4 synthesized in Example 1(4) added was set to 3.2 parts by mass, and the amount of sulfur added was set to 2 parts by mass.

(9) Comparative Example 10-3

A rubber composition and a rubber sheet were obtained in the same manner as in Example 10-5, except that the Silane Compound 1 (C-80) was not contained, the amount of the other silane compound (Si69) added was set to 3.2 parts by mass, sulfur was set to 2 parts by mass, and further the amount of the vulcanization accelerator, NOCCELER CZ, added was set to 1 part by mass and the vulcanization accelerator, NOCCELER D, was set to 0.5 parts by mass.

(10) Physical Property Evaluation

The physical properties (viscosity and viscoelasticity) of the rubber sheets obtained in Examples 10-1 to 10-6 and Comparative Examples 10-1 to 10-3 were measured by the method described below.

(Viscosity)

Viscosity is measured by the method described in Example 9(9) above.

(Viscoelasticity)

Viscoelasticity is measured by the method described in Example 1(16) above.

Table 10 shows the measurement results and calculation results (tan δ balance) of the above physical property evaluation items. ML1+4 100° C. (index), tan δ (0° C.), tan δ (60° C.), and tan δ balance are shown as relative values when each value in Comparative Examples 10-1 to 10-3 is set to 100.0.

TABLE 10

|  |  | Ex. 10-1 | Ex. 10-2 | Comp. Ex 10-1 | Ex. 10-3 | Ex. 10-4 | Comp. Ex 10-2 | Ex. 10-5 | Ex 10-6 | Comp. Ex 10-3 |
|---|---|---|---|---|---|---|---|---|---|---|
| Composition of Rubber Composition (parts by mass) | Solution polymerized styrene-butadiene rubber (NS116R, manufactured by ZS elastomer) | 100 | 100 | 100 | 70 | 70 | 70 | 30 | 30 | 30 |
|  | Butadiene rubber (UBEPOL BR150L, manufactured by UBE INDUSTRIES, LTD.) |  |  |  | 30 | 30 | 30 | 70 | 70 | 70 |
|  | Silica AQ | 40 | 40 | 40 | 40 | 40 | 40 | 40 |  | 40 |
|  | Zinc oxide No. 3 | 3 | 3 | 3 | 3 | 3 | 3 | 3 | 3 | 3 |
|  | Stearic acid | 1 | 1 | 1 | 1 | 1 | 1 | 1 | 1 | 1 |
|  | Anti-ageing agent (NOCRAC 224) | 1 | 1 | 1 | 1 | 1 | 1 | 1 | 1 | 1 |
|  | Other silane compound (Si69) |  |  | 3.2 |  |  | 3.20 |  |  | 3.2 |
|  | Silane Compound 1 (C-80) | 3.2 |  |  | 3.2 |  |  | 3.2 |  |  |
|  | Silane Compound 4 |  |  |  | 3.2 |  |  |  | 3.2 |  |
|  | Sulfur | 2.76 | 2 | 2 | 2.76 | 2 | 2 | 2.76 | 2 | 2 |
|  | Vulcanization accelerator (NOCCELER CZ) | 1.38 | 1.38 | 1 | 1.38 | 1.38 | 1 | 1.38 | 1.38 | 1 |
|  | Vulcanization accelerator (NOCCELER D) | 0.69 | 0.69 | 0.5 | 0.69 | 0.69 | 0.5 | 0.69 | 0.69 | 0.5 |
| Viscosity | ML1 + 4 100° C. (index) | 71 | 72 | 100 | 81 | 80 | 100 | 71 | 70 | 100 |
| Viscoelasticity | tan δ (0° C.) (index) | 108 | 113 | 100 | 104 | 109 | 100 | 101 | 106 | 100 |
|  | tan δ (60° C.) (index) | 89 | 91 | 100 | 88 | 90 | 100 | 93 | 95 | 100 |
|  | tan δ (0° C.)/tan δ (60° C.) (index) | 121 | 124 | 100 | 118 | 121 | 100 | 107 | 112 | 100 |

A comparison between Examples 10-1 to 10-6 and Comparative Examples 10-1 to 10-3 reveals that the rubber sheets obtained in Examples 10-1 to 10-6 have higher tan δ (0° C.) than the rubber sheets obtained in Comparative Examples 10-1 to 10-3. It is also revealed that the rubber sheets obtained in Examples 10-1 to 10-6 have lower tan δ (60° C.) than the rubber sheets obtained in Comparative Examples 10-1 to 10-3. It is further revealed that the rubber sheets obtained in Examples 10-1 to 10-6 have higher tan δ balance than the rubber sheets obtained in Comparative Examples 10-1 to 10-3. From the above results, it is understood that all the cases where the blend ratio of the solution polymerized styrene-butadiene rubber and the butadiene rubber changed exhibited excellent viscoelastic properties without depending on the microstructure. The rubber sheets obtained in Examples 10-1 to 10-6 are understood as having superior viscoelasticity to the rubber sheets obtained in Comparative Examples 10-1 to 10-3.

Further, a comparison between Examples 10-1 to 10-6 and Comparative Examples 10-1 to 10-3 reveals that the viscosity (ML1+4 100° C. (index)) can be kept low regardless of the microstructure in all the cases where the blend ratio of the solution polymerized styrene-butadiene rubber and the butadiene rubber was changed. It is also revealed that the rubber sheets obtained in Examples 10-1 to 10-6 have lower viscosity than the rubber sheets obtained in Comparative Examples 10-1 to 10-3.

Therefore, it is understood that the rubber sheets obtained in Examples 10-1 to 10-6 are superior to the rubber sheet obtained in Comparative Examples 10-1 to 10-3 in the dispersion state of silica in an unvulcanized state.

11. Example 11: Preparation and Evaluation of Rubber Composition and Rubber Sheet Containing Silane Compounds 1 and 4 and Solution Polymerized Styrene Butadiene Rubber (1) Example 11-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Solution polymerized styrene-butadiene rubber (NS522, manufactured by ZS elastomer, 37.5 phr oil-extended)
  137.5 parts by mass
Silane compound 1 (C-80) (Example 1(1)-1)
  3.2 parts by mass
Silica AQ (product name: Nip Seal AQ, manufactured by Tosoh Corporation)
  40 parts by mass
Zinc oxide No. 3 (product name: Ginrei R, manufactured by Toho Zinc Co., Ltd.)
  3 parts by mass
Stearic acid (product name: Stearic acid 300, manufactured by New Japan Chemical Co., Ltd.)
  1 part by mass
Anti-aging agent (product name: NOCRAC 224, manufactured by Ouchi Shinko Chemical Industrial Co., Ltd.)

1 part by mass
T-DAE oil (manufactured by JXTG Nippon Oil & Energy Corporation)
   10 parts by mass
Sulfur (oil treated sulfur, manufactured by Hosoi Chemical Industry Co., Ltd.)
   2.26 parts by mass
Vulcanization accelerator (product name: NOCCELER CZ manufactured by Ouchi Shinko Chemical Industrial Co., Ltd.)
   1.5 parts by mass
Vulcanization accelerator (product name: NOCCELER D manufactured by Ouchi Shinko Chemical Industrial Co., Ltd.)
   2 parts by mass (2) Example 11-2

A rubber composition and a rubber sheet were obtained in the same manner as in Example 11-1, except that the Silane Compound 1 (C-80) was not contained and the amount of the Silane Compound 4 synthesized in Example 1(4) added was set to 3.2 parts by mass.

(3) Comparative Example 11-1

A rubber composition and a rubber sheet were obtained in the same manner as in Example 11-1, except that the Silane Compound 1 (C-80) was not contained, the amount of the other silane compound (Si69) added was set to 3.2 parts by mass, and sulfur was set to 1.5 parts by mass.

(4) Example 11-3

Preparation of Rubber Composition and Rubber Sheet
Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.
Solution polymerized styrene-butadiene rubber (NS522, manufactured by ZS elastomer, 37.5 phr oil-extended)
   137.5 parts by mass
Silane compound 1 (C-80) (Example 1(1)-1)
   4.8 parts by mass
Silica AQ (product name: Nip Seal AQ, manufactured by Tosoh Corporation)
   60 parts by mass
Zinc oxide No. 3 (product name: Ginrei R, manufactured by Toho Zinc Co., Ltd.)
   3 parts by mass
Stearic acid (product name: Stearic acid 300, manufactured by New Japan Chemical Co., Ltd.)
   1 part by mass
Anti aging agent (product name: NOCRAC 224, manufactured by Ouchi Shinko Chemical Industrial Co., Ltd.)
   1 part by mass
T-DAE oil (manufactured by JXTG Nippon Oil & Energy Corporation)
   10 parts by mass
Sulfur (oil treated sulfur, manufactured by Hosoi Chemical Industry Co., Ltd.)
   2.64 parts by mass
Vulcanization accelerator (product name: NOCCELER CZ manufactured by Ouchi Shinko Chemical Industrial Co., Ltd.)
   1.5 parts by mass
Vulcanization accelerator (product name: NOCCELER D manufactured by Ouchi Shinko Chemical Industrial Co., Ltd,)
   2 parts by mass (5) Example 11-4

A rubber composition and a rubber sheet were obtained in the same manner as in Example 11-3, except that the Silane Compound 1 (C-80) was not contained and the amount of the Silane Compound 4 synthesized in Example 1(4) added was set to 4.8 parts by mass.

(6) Comparative Example 11-2

A rubber composition and a rubber sheet were obtained in the same manner as in Example 11-3, except that the Silane Compound 1 (C-80) was not contained, the amount of the other silane compound (Si69) added was set to 4.8 parts by mass, and sulfur was set to 1.5 parts by mass.

(7) Physical Property Evaluation

The physical properties (viscosity and viscoelasticity) of the rubber sheets obtained in Examples 11-1 to 11-4 and Comparative Examples 11-1 to 11-2 were measured by the method described below.
(Viscosity)
Viscosity is measured by the method described in Example 9(9) above.
(Viscoelasticity)
Viscoelasticity is measured by the method described in Example 1(16) above.
Table 11 shows the measurement results and calculation results (tan δ balance) of the above physical property evaluation items. ML1+4 100° C. (index), tan δ (0° C.), tan δ (60° C.), and tan δ balance are shown as relative values when each value in Comparative Examples 11-1 to 11-2 is set to 100.0.

TABLE 11

|  |  | Ex. 11-1 | Ex. 11-2 | Comp. Ex 11-1 | Ex 11-3 | Ex. 11-4 | Comp. Ex 11-2 |
|---|---|---|---|---|---|---|---|
| Composition of Rubber Composition (parts by mass) | Solution polymerized styrene-butadiene rubber (NS522, manufactured by ZS elastomer, oil-extended) | 137.5 | 137.5 | 137.5 | 137.5 | 137.5 | 137.5 |
| | Silica AQ | 40 | 40 | 40 | 60 | 60 | 60 |
| | Zinc oxide No. 3 | 3 | 3 | 3 | 3 | 3 | 3 |
| | Stearic acid | 1 | 1 | 1 | 1 | 1 | 1 |
| | Anti-ageing agent (NOCRAC 224) | 1 | 1 | 1 | 1 | 1 | 1 |

TABLE 11-continued

|  |  | Ex. 11-1 | Ex. 11-2 | Comp. Ex 11-1 | Ex 11-3 | Ex. 11-4 | Comp. Ex 11-2 |
|---|---|---|---|---|---|---|---|
|  | T-DAE oil | 10 | 10 | 10 | 10 | 10 | 10 |
|  | Other silane compound (Si69) |  |  | 3.2 |  |  | 4.8 |
|  | Silane Compound 1 (C-80) | 3.2 |  |  | 4.8 |  |  |
|  | Silane Compound 4 |  | 3.2 |  |  | 4.8 |  |
|  | Sulfur | 2.26 | 2.26 | 1.5 | 2.64 | 2.64 | 1.5 |
|  | Vulcanization accelerator (NOCCELER CZ) | 1.5 | 1.5 | 1.5 | 1.5 | 1.5 | 1.5 |
|  | Vulcanization accelerator (NOCCELER D) | 2 | 2 | 2 | 2 | 2 | 2 |
| Viscosity | ML1 + 4 100° C. (index) | 94 | 92 | 100 | 61 | 60 | 100 |
| Viscoelasticity | tan δ (0° C.) (index) | 112 | 118 | 100 | 120 | 126 | 100 |
|  | tan δ (60° C.) (index) | 93 | 95 | 100 | 87 | 89 | 100 |
|  | tan δ (0° C.)/tan δ (60° C.) (index) | 121 | 124 | 100 | 138 | 142 | 100 |

A comparison between Examples 11-1 to 11-4 and Comparative Examples 11-1 to 11-2 reveals that the rubber sheets obtained in Examples 11-1 to 11-4 have higher tan δ (0° C.) than the rubber sheets obtained in Comparative Examples 11-1 to 11-2. It is also revealed that the rubber sheets obtained in Examples 11-1 to 11-4 have lower tan δ (60° C.) than the rubber sheets obtained in Comparative Examples 11-1 to 11-2. It is further revealed that the rubber sheets obtained in Examples 11-1 to 11-4 have higher tan δ balance than the rubber sheets obtained in Comparative Examples 11-1 to 11-2. From the above results, it is understood that in all the cases where the blending amount of silica was changed had excellent silica dispersion, and that the rubber sheets obtained in Examples 11-1 to 11-4 have superior viscoelasticity to the rubber sheets obtained in Comparative Examples 11-1 to 11-2.

Further, a comparison between Examples 11-1 to 11-4 and Comparative Examples 11-1 to 11-2 reveals that the rubber sheets obtained in Examples 11-1 to 11-4 in all the cases where the blending amount of silica was changed had lower viscosity (ML1+4 100° C. (index)) than the rubber sheets obtained in Comparative Examples 11-1 to 11-2. Therefore, it is understood that the rubber sheets obtained in Examples 11-1 to 11-4 are superior to the rubber sheet obtained in Comparative Examples 11-1 to 11-2 in the dispersion state of silica in an unvulcanized state.

12. Example 12: Preparation and Evaluation of Rubber Composition and Rubber Sheet Comprising Silane Compounds 1 and 4. Alkoxysilane Compound Having Mercapto Group, and Solution Polymerized Styrene-Butadiene Rubber (1) Example 12-1

Preparation of Rubber Composition and Rubber Sheet

Each of the following components was kneaded using a 100 mL kneader (Laboplast mill manufactured by Toyo Seiki Co., Ltd.) to obtain a rubber composition. The rubber composition was subjected to press vulcanization at 160° C. for 30 minutes to obtain a rubber sheet having a thickness of 2 mm composed of the rubber composition.

Solution polymerized styrene-butadiene rubber (NS616, manufactured by ZS elastomer)
70 parts by mass
Silane compound 1 (C-80) (Example 1(1)-1)
4.32 parts by mass
Other silane compound (3-mercaptopropyltriethoxysilane, product name: KBE803, manufactured by Shin-Etsu Chemical Co., Ltd.)
0.48 parts by mass
Silica AQ (product name: Nip Seal AQ, manufactured by Tosoh Corporation)
60 parts by mass
Zinc oxide No. 3 (product name: Ginrei R, manufactured by Toho Zinc Co., Ltd.)
3 parts by mass Stearic acid (product name: Stearic acid 300, manufactured by New Japan Chemical Co., Ltd.)
1 part by mass
Anti-aging agent (product name: NOCRAC 224, manufactured by Ouchi Shinko Chemical Industrial Co., Ltd.)
1 part by mass
Extended oil (T-DAE oil, manufactured by JXTG Nippon Oil & Energy Corporation)
25 parts by mass
Sulfur (oil treated sulfur, manufactured by Hosoi Chemical Industry Co., Ltd.)
2.08 parts by mass
Vulcanization accelerator (product name: NOCCELER CZ manufactured by Ouchi Shinko Chemical Industrial Co., Ltd.)
2.3 parts by mass
Vulcanization accelerator (product name: NOCCELER D manufactured by Ouchi Shinko Chemical Industrial Co., Ltd.)
1.1 parts by mass (2) Example 12-2

A rubber composition and a rubber sheet were obtained in the same manner as in Example 12-1, except that the Silane Compound 1 (C-80) was not contained and the amount of the Silane Compound 4 synthesized in Example 1(4) added was set to 4.32 parts by mass.

(3) Example 12-3

A rubber composition and a rubber sheet were obtained in the same manner as in Example 12-1, except that the amount of the Silane Compound 1 (C-80) added was set to 3.36 parts by mass, the amount of the other silane compound (KBE803) added was set to 1.44 parts by mass, and further, the amount of sulfur added was set to 1.95 parts by mass.

(4) Comparative Example 12-1

A rubber composition and a rubber sheet were obtained in the same manner as in Example 12-1, except that the Silane Compound 1 (C-80) and the other silane compound (KBE803) were not contained, the amount of the other silane compound (Si69) added was set to 4.8 parts by mass, and sulfur was set to 1 part by mass.

(5) Comparative Example 12-2

A rubber composition and a rubber sheet were obtained in the same manner as in Example 12-1, except that the Silane Compound 1 (C-80) was not contained and the amount of the other silane compound (KBE803) added was set to 4.8 parts by mass, and further sulfur was set to 1.5 parts by mass.

(6) Physical Property Evaluation

The physical properties (viscosity and viscoelasticity) of the rubber sheets obtained in Examples 12-1 to 12-3 and Comparative Examples 12-1 to 12-2 were measured by the method described below.
(Viscosity)
Viscosity is measured by the method described in Example 9(9) above.
(Viscoelasticity)
Viscoelasticity is measured by the method described in Example 1(16) above.

Table 12 shows the measurement results and calculation results (tan δ balance) of the above physical property evaluation items. ML1+4 100° C. (index), tan δ (0° C.), tan δ (60° C.), and tan δ balance are shown as relative values when each value in Comparative Examples 12-1 to 12-2 is set to 100.0.

TABLE 12

|  |  | Ex. 12-1 | Ex. 12-2 | Ex. 12-3 | Comp. Ex 12-1 | Comp. Ex 12-2 |
|---|---|---|---|---|---|---|
| Composition of Rubber Composition (parts by mass) | Solution polymerized styrene-butadiene rubber (NS616, manufactured by ZS elastomer, oil-extended) | 70 | 70 | 70 | 70 | 70 |
|  | Butadiene rubber (UBEPOL BR150L, manufactured by UBE INDUSTRIES, LTD.) | 30 | 30 | 30 | 30 | 30 |
|  | Silica AQ | 60 | 60 | 60 | 60 | 60 |
|  | Zinc oxide No. 3 | 3 | 3 | 3 | 3 | 3 |
|  | Stearic acid | 1 | 1 | 1 | 1 | 1 |
|  | Anti-ageing agent (NOCRAC 224) | 1 | 1 | 1 | 1 | 1 |
|  | Extended oil (T-DAE) | 25 | 25 | 25 | 25 | 25 |
|  | Other silane compound (Si69) |  |  |  | 4.8 |  |
|  | Other silane compound (KBE803) | 0.48 | 0.48 | 1.44 |  | 4.8 |
|  | Silane Compound 1 (C-80) | 4.32 |  | 3.36 |  |  |
|  | Silane Compound 4 |  | 4.32 |  |  |  |
|  | Sulfur | 2.08 | 2.08 | 1.95 | 1 | 1.5 |
|  | Vulcanization accelerator (NOCCELER CZ) | 2.3 | 2.3 | 2.3 | 2.3 | 2.3 |
|  | Vulcanization accelerator (NOCCELER D) | 1.1 | 1.1 | 1.1 | 1.1 | 1.1 |
| Viscosity | ML1 + 4 100° C. (index) | 95 | 92 | 96 | 100 | 201 |
| Viscoelasticity | tan δ (0° C.) (index) | 120 | 122 | 123 | 100 | 118 |
|  | tan δ (60° C.) (index) | 81 | 79 | 77 | 100 | 90 |
|  | tan δ (0° C.)/tan δ (60° C.) (index) | 148 | 154 | 160 | 100 | 131 |

A comparison between Examples 12-1 to 12-3 and Comparative Examples 12-1 to 12-2 reveals that the rubber sheets obtained in Examples 12-1 to 12-3 have higher tan δ (0° C.) than the rubber sheets obtained in Comparative Examples 12-1 to 12-2. It is also revealed that the rubber sheets obtained in Examples 12-1 to 12-3 have lower tan δ (60° C.) than the rubber sheets obtained in Comparative Examples 12-1 to 12-2. It is further revealed that the rubber sheets obtained in Examples 12-1 to 12-3 have higher tan δ balance than the rubber sheets obtained in Comparative Examples 12-1 to 12-2. From the above results, it is understood that the rubber sheets obtained in Examples 12-1 to 12-3 have superior viscoelasticity to the rubber sheets obtained in Comparative Example 12-1.

Further, a comparison between Examples 12-1 to 12-3 and Comparative Examples 12-1 to 12-2 reveals that the rubber sheets obtained in Examples 12-1 to 12-3 had lower viscosity (ML1+4 100° C. (index)) than the rubber sheets obtained in Comparative Examples 12-1 to 12-2. Therefore, it is understood that the rubber sheets obtained in Examples 12-1 to 12-3 are superior to the rubber sheet obtained in Comparative Examples 12-1 to 12-2 in the dispersion state of silica in an unvulcanized state.

The invention claimed is:
1. A silane compound represented by formula (1):

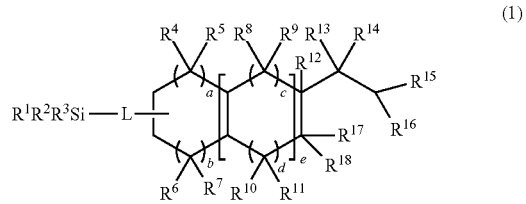

wherein
$R^1$, $R^2$, and $R^3$ each independently represents a hydrocarbon group optionally containing an oxygen atom or a nitrogen atom, or a hydrogen atom;
L represents a hydrocarbon group optionally containing at least one heteroatom selected from the group consisting of nitrogen, oxygen, and sulfur;
a is an integer of 0 or 1;
b is an integer of 0 or 1;
c is each independently an integer of 0 or 1;
d is each independently an integer of 0 or 1;

e is an integer from 0 to 5;

$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —(CH$_2$)$_f$—, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —(CH$_2$)$_g$—, g is an integer from 1 to 5, $R^{16}$ is a hydrogen atom, a methyl group or an alkyl group having 2 to 8 carbons and $R^{17}$ is a hydrogen atom, a methyl group or an alkyl group having 2 to 10 carbons, where $R^{12}$ and $R^{13}$ bond to each other to form a double bond and $R^{14}$, $R^{15}$, and $R^{18}$ are a hydrogen atom, a methyl group or an alkyl group having 2 to 10 carbons, or $R^{14}$ and $R^{15}$ bond to each other to form a double bond and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are a hydrogen atom, a methyl group or an alkyl group having 2 to 10 carbons.

2. The silane compound according to claim 1, represented by formula (2):

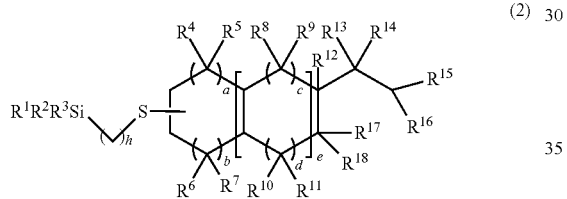

wherein $R^1$, $R^2$, and $R^3$ each independently represents a hydrocarbon group optionally containing an oxygen atom or a nitrogen atom, or a hydrogen atom;

h is an integer from 1 to 10;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —(CH$_2$)$_f$—, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —(CH$_2$)$_g$—, g is an integer from 1 to 5, $R^{16}$ is a hydrogen atom, a methyl group or an alkyl group having 2 to 8 carbons, $R^{17}$ is a hydrogen atom, a methyl group or an alkyl group having 2 to 10 carbons; where $R^{12}$ and $R^{13}$ bond to each other to form a double bond and $R^{14}$, $R^{15}$, and $R^{18}$ are a hydrogen atom, a methyl group or an alkyl group having 2 to 10 carbons, or $R^{14}$ and $R^{15}$ bond to each other to form a double bond and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond and $R^{12}$, $R^{13}$, and $R^{18}$ are a hydrogen atom, a methyl group or an alkyl group having 2 to 10 carbons.

3. The silane compound according to claim 1, represented by formula (3):

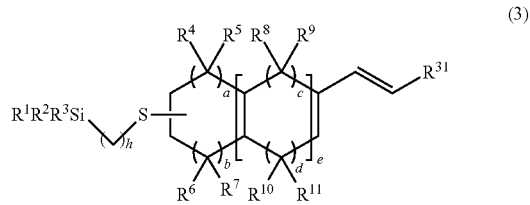

wherein $R^1$, $R^2$, and $R^3$ each independently represents a hydrocarbon group optionally containing an oxygen atom or a nitrogen atom, or a hydrogen atom;

h is an integer from 1 to 10;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —(CH$_2$)$_f$—, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —(CH$_2$)$_g$—, g is an integer from 1 to 5, and is a hydrogen atom, a methyl group or an alkyl group having 2 to 8 carbons.

4. The silane compound according to claim 1, represented by formula (4):

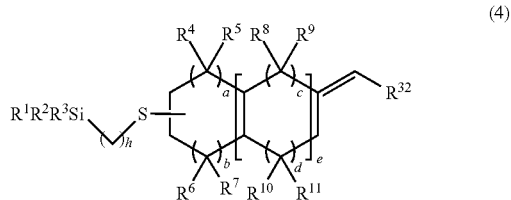

wherein $R^1$, $R^2$, and $R^3$ each independently represents a hydrocarbon group optionally containing an oxygen atom or a nitrogen atom, or a hydrogen atom;

h is an integer from 1 to 10;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —(CH$_2$)$_f$—, and f is an integer from 1 to 5;

$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —$(CH_2)_g$—, g is an integer from 1 to 5, and $R^{32}$ is a hydrogen atom, a methyl group or an alkyl group having 2 to 9 carbons.

5. The silane compound according to claim 1, represented by formula (5):

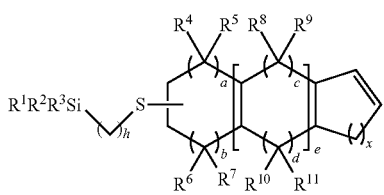

(5)

wherein
$R^1$, $R^2$, and $R^3$ each independently represents a hydrocarbon group optionally containing an oxygen atom or a nitrogen atom, or a hydrogen atom;
h is an integer from 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group, or an alkyl group having 2 to 10 carbons, or one of $R^4$ or $R^5$ and $R^6$ or $R^7$ may form a cross-linked structure represented by —$(CH_2)_f$—, and f is an integer from 1 to 5;
$R^8$, $R^9$, $R^{10}$ and $R^{11}$ represent a hydrogen atom, a methyl group or an alkyl group having 2 to 10 carbons, or one of $R^8$ or $R^9$ and $R^{10}$ or $R^{11}$ may form a cross-linked structure represented by —$(CH_2)_g$—, g is an integer from 1 to 5, and x is an integer from 0 to 5.

6. The silane compound according to claim 1, represented by formula (6):

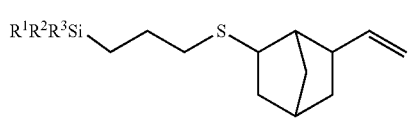

(6)

wherein $R^1$, $R^2$, and $R^3$ each independently represents a hydrocarbon group optionally containing an oxygen atom or a nitrogen atom, or a hydrogen atom; or by formula (7):

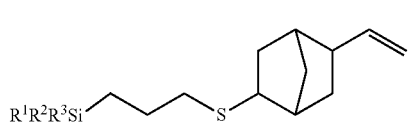

(7)

wherein $R^1$, $R^2$, and $R^3$ each independently represents a hydrocarbon group optionally containing an oxygen atom or a nitrogen atom, or a hydrogen atom; or by formula (8):

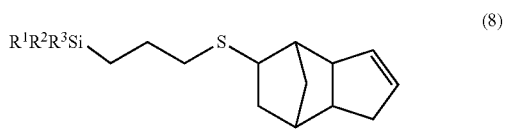

(8)

wherein $R^1$, $R^2$, and $R^3$ each independently represents a hydrocarbon group optionally containing an oxygen atom or a nitrogen atom, or a hydrogen atom; or by formula (9):

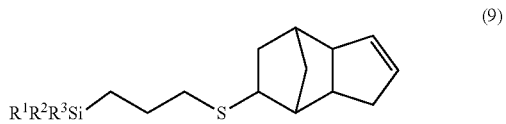

(9)

wherein $R^1$, $R^2$, and $R^3$ each independently represents a hydrocarbon group optionally containing an oxygen atom or a nitrogen atom, or a hydrogen atom.

7. The silane compound according to claim 1, wherein $R^1R^2R^3Si$ group in the silane compound has a chemical structure of formula (10):

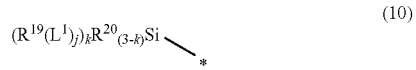

(10)

wherein
$R^{19}$ each independently represents an alkoxy group or an amino group substituted with one or more alkyl groups;
$R^{20}$ each independently represents a hydrogen atom or an alkyl group;
$L^1$ each independently represents a hydrocarbon group optionally including at least one hetero atom selected from the group consisting of nitrogen, oxygen, and sulfur;
j is independently an integer of 0 or 1;
k is an integer of 1 to 3; and
an asterisk (*) indicates a region bonded to a moiety other than a silyl group of the silane compound.

8. The silane compound according to claim 1, wherein $R^1R^2R^3Si$ group in the silane compound is a triethoxysilyl group.

9. A composition comprising the silane compound according to claim 1 and a polymer that is capable of reacting with the silane compound.

10. The composition according to claim 9, wherein the polymer is an elastomer having a glass transition point of 25° C. or lower and further comprises an inorganic material.

11. The composition according to claim 10, wherein the elastomer having a glass transition point of 25° C. or lower comprises at least one substance selected from the group consisting of natural rubber, butadiene rubber, nitrile rubber, silicone rubber, isoprene rubber, styrene-butadiene rubber, isoprene-butadiene rubber, styrene-isoprene-butadiene rubber, ethylene-propylene-diene rubber, halogenated butyl rubber, halogenated isoprene rubber, halogenated isobutyrene copolymer, chloroprene rubber, butyl rubber, and halogenated isobutyrene-p-methyl styrene rubber.

12. The composition according to claim 10, wherein the elastomer having a glass transition point of 25° C. or lower has a double bond in the main chain.

13. The composition according to claim 10, wherein the elastomer having a glass transition point of 25° C. or lower comprises at least one monomer unit selected from the group consisting of styrene, butadiene, isoprene, and isobutylene.

14. The composition according to claim 10, wherein the elastomer having a glass transition point of 25° C. or lower is selected from the group consisting of styrene butadiene rubber, butadiene rubber, isoprene rubber, butyl rubber, nitrile butadiene rubber, and natural rubber.

15. The composition according to claim 10, wherein the total content of the silane compound in the composition is 0.1 to 30 parts by mass with respect to 100 parts by mass of the elastomer.

16. The composition according to claim 10, further comprising a silane compound other than the compound represented by said formula (1).

17. The composition according to claim 16, wherein
the silane compound other than the compound represented by said formula (1) is a silane compound represented by formula (11):

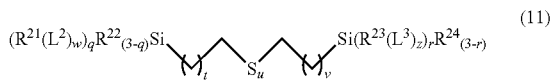 (11)

wherein t and v are each independently an integer from 0 to 10;

u is an integer from 2 to 10;

q and r are each independently an integer from 1 to 3;

w and z are each independently an integer of 0 or 1;

$L^2$ and $L^3$ are each independently a hydrocarbon group optionally containing at least one heteroatom selected from the group consisting of nitrogen, oxygen, and sulfur;

$R^{21}$ and $R^{23}$ are each independently an alkoxy group or an amino group substituted with one or more alkyl groups; and $R^{22}$ and $R^{24}$ are each independently a hydrogen atom or an alkyl group.

18. The composition according to claim 16, wherein the proportion of the content of the silane compound other than the compound represented by said formula (1) in the composition with respect to the total content of the silane compound in the composition is 0.1 to 0.9 on a mass basis.

19. A cross-linked product of the composition according to claim 10.

20. A tire comprising the cross-linked product according to claim 19.

* * * * *